United States Patent
Packard et al.

(10) Patent No.: US 10,419,830 B2
(45) Date of Patent: *Sep. 17, 2019

(54) GENERATING A CUSTOMIZED HIGHLIGHT SEQUENCE DEPICTING AN EVENT

(71) Applicant: Thuuz, Inc., Palo Alto, CA (US)

(72) Inventors: Warren Joseph Packard, Palo Alto, CA (US); Dan Lythcott-Haims, Palo Alto, CA (US); Alan Levin, Vancouver (CA); Dennis Kanygin, Sunnyvale, CA (US)

(73) Assignee: Thuuz, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,481

(22) Filed: Oct. 9, 2014

(65) Prior Publication Data
US 2016/0105733 A1 Apr. 14, 2016

(51) Int. Cl.
*H04N 21/8549* (2011.01)
*H04N 21/258* (2011.01)
(Continued)

(52) U.S. Cl.
CPC ....... *H04N 21/8549* (2013.01); *H04N 21/231* (2013.01); *H04N 21/23109* (2013.01);
(Continued)

(58) Field of Classification Search
CPC ........... H04N 21/231; H04N 21/23109; H04N 21/23418; H04N 21/23424; H04N 21/23439; H04N 21/278; H04N 21/8549
(Continued)

(56) References Cited

U.S. PATENT DOCUMENTS 6,005,562 A 12/1999 Shiga et al.
6,177,931 B1 1/2001 Alexander et al.
(Continued)

FOREIGN PATENT DOCUMENTS

CN 101650722 10/2011
CN 105912560 8/2016
(Continued)

OTHER PUBLICATIONS

Boxtish/TV's API; www.boxfish.com, retrieved Mar. 28, 2017, 8 pages.
(Continued)

*Primary Examiner* — Jeremy S Duffield
(74) *Attorney, Agent, or Firm* — Raubvogel Law Office

(57) ABSTRACT

A customized highlight sequence depicting an event, and based on a user's personal characteristics, interests, and/or preferences, is generated and presented. The event can be a sporting event, entertainment event, and/or the like. For example, in the context of sporting events, a determination is made as to what types of sports, teams, leagues, players, plays, and/or the like are of interest to the user. In at least one embodiment, the amount of time available to the user can be obtained, so that the length of the highlight sequence can be tailored to the available time. A customized highlight sequence is then generated and presented, containing those specific portions of the sporting event that are likely to be of interest, arranged in a manner that is likely to be entertaining to the user and comports with the time restrictions.

61 Claims, 28 Drawing Sheets

(51) Int. Cl.
  *H04N 21/234* (2011.01)
  *H04N 21/231* (2011.01)
  *H04N 21/2343* (2011.01)
  *H04N 21/278* (2011.01)
  *G11B 27/034* (2006.01)
  *H04N 21/2668* (2011.01)

(52) U.S. Cl.
  CPC . *H04N 21/23418* (2013.01); *H04N 21/23424* (2013.01); *H04N 21/23439* (2013.01); *H04N 21/25841* (2013.01); *H04N 21/25883* (2013.01); *H04N 21/25891* (2013.01); *H04N 21/278* (2013.01); *G11B 27/034* (2013.01); *H04N 21/2668* (2013.01)

(58) Field of Classification Search
  USPC ............... 725/86, 91–93, 109, 114–116
  See application file for complete search history.

(56) References Cited

U.S. PATENT DOCUMENTS

| | | |
|---|---|---|
| 6,185,527 B1 | 2/2001 | Petkovic et al. |
| 6,195,458 B1 | 2/2001 | Warnick et al. |
| 6,681,396 B1 | 1/2004 | Bates et al. |
| 6,721,490 B1 | 4/2004 | Yao et al. |
| 6,954,611 B2 | 10/2005 | Hashimoto et al. |
| 7,174,512 B2 | 2/2007 | Martin et al. |
| 7,197,715 B1 | 3/2007 | Valeria |
| 7,386,217 B2 | 6/2008 | Zhang |
| 7,543,322 B1 | 6/2009 | Bhogal et al. |
| 7,633,887 B2 | 12/2009 | Panwar et al. |
| 7,646,962 B1 | 1/2010 | Ellis et al. |
| 7,680,894 B2 | 3/2010 | Diot et al. |
| 7,742,111 B2 | 6/2010 | Shiu et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,831,112 B2 | 11/2010 | Wang et al. |
| 7,849,487 B1 | 12/2010 | Vosseller |
| 7,929,808 B2 | 4/2011 | Seaman et al. |
| 8,024,753 B1 | 9/2011 | Kummer et al. |
| 8,046,798 B1 | 10/2011 | Schlack et al. |
| 8,079,052 B2 | 12/2011 | Chen et al. |
| 8,099,315 B2 | 1/2012 | Amento |
| 8,104,065 B2 | 1/2012 | Aaby et al. |
| 8,140,570 B2 | 3/2012 | Ingrassia et al. |
| 8,196,168 B1 | 6/2012 | Bryan et al. |
| 8,209,713 B1 | 6/2012 | Lai et al. |
| 8,296,797 B2 | 10/2012 | Olstad et al. |
| 8,296,808 B2 | 10/2012 | Hardacker et al. |
| 8,312,486 B1 | 11/2012 | Briggs et al. |
| 8,320,674 B2 | 11/2012 | Guillou et al. |
| 8,424,041 B2 | 4/2013 | Candelore et al. |
| 8,427,356 B1 | 4/2013 | Satish |
| 8,457,768 B2 | 6/2013 | Hammer et al. |
| 8,535,131 B2 | 9/2013 | Packard et al. |
| 8,595,763 B1 | 11/2013 | Packard et al. |
| 8,627,349 B2 | 1/2014 | Kirby et al. |
| 8,688,434 B1 | 4/2014 | Birnbaum et al. |
| 8,689,258 B2 | 4/2014 | Kemo |
| 8,702,504 B1* | 4/2014 | Hughes ............... H04N 21/4781 725/41 |
| 8,713,008 B2 | 4/2014 | Negi |
| 8,752,084 B1 | 6/2014 | Lai et al. |
| 8,793,579 B2 | 7/2014 | Halliday et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,060,210 B2 | 6/2015 | Packard et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 9,451,202 B2 | 9/2016 | Beals |
| 9,565,474 B2 | 2/2017 | Petruzzelli et al. |
| 9,578,377 B1* | 2/2017 | Malik ............... H04N 21/47217 |
| 9,583,149 B2 | 2/2017 | Stieglitz |
| 9,648,379 B2 | 5/2017 | Howcroft |
| 9,715,902 B2 | 7/2017 | Coviello et al. |
| 9,788,062 B2 | 10/2017 | Dimov et al. |
| 2001/0013123 A1 | 8/2001 | Freeman et al. |
| 2001/0026609 A1 | 10/2001 | Weinstein et al. |
| 2002/0041752 A1 | 4/2002 | Abiko et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0136528 A1 | 9/2002 | Dagtas |
| 2002/0157095 A1* | 10/2002 | Masumitsu ......... H04N 21/252 725/46 |
| 2002/0157101 A1 | 10/2002 | Schrader et al. |
| 2002/0174430 A1 | 11/2002 | Ellis et al. |
| 2002/0178444 A1 | 11/2002 | Trajkovic et al. |
| 2002/0180774 A1 | 12/2002 | Errico et al. |
| 2002/0194095 A1* | 12/2002 | Koren ............... G06F 17/30893 705/35 |
| 2003/0012554 A1 | 1/2003 | Zeidler et al. |
| 2003/0023742 A1 | 1/2003 | Allen et al. |
| 2003/0056220 A1 | 3/2003 | Thornton et al. |
| 2003/0063798 A1* | 4/2003 | Li ..................... H04N 21/23418 382/165 |
| 2003/0066077 A1 | 4/2003 | Gutta |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0003403 A1 | 1/2004 | Marsh |
| 2004/0167767 A1 | 8/2004 | Xiong et al. |
| 2004/0181807 A1 | 9/2004 | Theiste et al. |
| 2005/0005308 A1 | 1/2005 | Logan et al. |
| 2005/0015712 A1 | 1/2005 | Plastina |
| 2005/0030977 A1 | 2/2005 | Casev et al. |
| 2005/0044570 A1 | 2/2005 | Poslinski |
| 2005/0071865 A1 | 3/2005 | Martins |
| 2005/0071881 A1* | 3/2005 | Deshpande ......... H04N 21/443 725/88 |
| 2005/0091690 A1 | 4/2005 | Delpuch et al. |
| 2005/0120368 A1 | 6/2005 | Goronzy et al. |
| 2005/0125302 A1 | 6/2005 | Brown et al. |
| 2005/0149965 A1 | 7/2005 | Neogi |
| 2005/0152565 A1 | 7/2005 | Jouppi et al. |
| 2005/0154987 A1 | 7/2005 | Otsuka et al. |
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 | 9/2006 | Proebstel |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |

(56) References Cited

U.S. PATENT DOCUMENTS

| | | |
|---|---|---|
| 2007/0157249 A1 | 7/2007 | Cordray et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0212023 A1 | 9/2007 | Whillock |
| 2007/0226766 A1 | 9/2007 | Poslinski et al. |
| 2007/0239856 A1 | 10/2007 | Abadir |
| 2007/0245379 A1 | 10/2007 | Agnihortri |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0064490 A1 | 3/2008 | Ellis |
| 2008/0086743 A1 | 4/2008 | Cheng et al. |
| 2008/0092168 A1 | 4/2008 | Logan et al. |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1 | 6/2008 | Collet et al. |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel |
| 2009/0055385 A1 | 2/2009 | Jeon et al. |
| 2009/0080857 A1 | 3/2009 | St. John-Larkin |
| 2009/0082110 A1* | 3/2009 | Relyea .............. A63F 13/00 463/42 |
| 2009/0102984 A1 | 4/2009 | Arlina et al. |
| 2009/0138902 A1 | 5/2009 | Kamen |
| 2009/0144777 A1 | 6/2009 | Mikami et al. |
| 2009/0158357 A1 | 6/2009 | Miller |
| 2009/0178071 A1 | 7/2009 | Whitehead |
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0293093 A1 | 11/2009 | Igarashi |
| 2009/0299824 A1 | 12/2009 | Barnes |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1* | 5/2010 | Vunic ................ H04N 21/4394 348/700 |
| 2010/0125864 A1 | 5/2010 | Dwyer et al. |
| 2010/0146560 A1 | 6/2010 | Bonfrer |
| 2010/0153856 A1* | 6/2010 | Russ ................ H04N 21/23412 715/753 |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue et al. |
| 2010/0251305 A1 | 9/2010 | Kimble et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0109801 A1 | 5/2011 | Thomas et al. |
| 2011/0161242 A1 | 6/2011 | Chung et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1* | 9/2011 | Packard ............... H04N 21/251 463/1 |
| 2011/0217024 A1 | 9/2011 | Schlieski et al. |
| 2011/0231887 A1 | 9/2011 | West |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis et al. |
| 2012/0052941 A1 | 3/2012 | Mo |
| 2012/0060178 A1 | 3/2012 | Minakuchi et al. |
| 2012/0082431 A1* | 4/2012 | Sengupta ........... H04N 21/8549 386/241 |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman et al. |
| 2012/0278834 A1 | 11/2012 | Richardson |
| 2012/0278837 A1 | 11/2012 | Gurtis et al. |
| 2012/0284745 A1 | 11/2012 | Strange |
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack et al. |
| 2013/0055304 A1 | 2/2013 | Kirby |
| 2013/0061313 A1 | 3/2013 | Cullimore et al. |
| 2013/0073473 A1 | 3/2013 | Heath |
| 2013/0074109 A1 | 3/2013 | Skelton et al. |
| 2013/0114940 A1 | 5/2013 | Merzon et al. |
| 2013/0128119 A1 | 5/2013 | Madathodivil et al. |
| 2013/0138435 A1 | 5/2013 | Weber |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1* | 8/2013 | Beining ............... H04N 21/252 709/201 |
| 2013/0251331 A1 | 9/2013 | Sambongi |
| 2013/0263189 A1 | 10/2013 | Garner |
| 2013/0268620 A1 | 10/2013 | Osminer |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |
| 2013/0325869 A1* | 12/2013 | Reiley ............... G06F 17/30035 707/741 |

(56) References Cited

U.S. PATENT DOCUMENTS

| | | |
|---|---|---|
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0023348 A1 | 1/2014 | O'Kelly et al. |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1 | 3/2014 | Archibong |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1 | 3/2014 | Shah |
| 2014/0082670 A1 | 3/2014 | Papish |
| 2014/0088952 A1 | 3/2014 | Fife et al. |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0130094 A1 | 5/2014 | Kirby et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0223479 A1 | 8/2014 | Krishnamoorthi et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0298378 A1* | 10/2014 | Kelley ............... H04N 21/8549 725/32 |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0082172 A1 | 3/2015 | Shakib et al. |
| 2015/0095932 A1 | 4/2015 | Ren |
| 2015/0110461 A1 | 4/2015 | Maisenbacher et al. |
| 2015/0110462 A1 | 4/2015 | Maisenbacher et al. |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0249803 A1 | 9/2015 | Tozer et al. |
| 2015/0249864 A1 | 9/2015 | Tang et al. |
| 2015/0281778 A1 | 10/2015 | Xhafa et al. |
| 2015/0310725 A1 | 10/2015 | Koskan et al. |
| 2015/0310894 A1 | 10/2015 | Stieglitz |
| 2015/0334461 A1 | 11/2015 | Yu |
| 2015/0358687 A1 | 12/2015 | Kummer |
| 2015/0358688 A1 | 12/2015 | Kummer |
| 2016/0066020 A1 | 3/2016 | Mountain |
| 2016/0066026 A1 | 3/2016 | Mountain |
| 2016/0066042 A1 | 3/2016 | Dimov et al. |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli |
| 2016/0198229 A1 | 7/2016 | Keipert |
| 2016/0309212 A1 | 10/2016 | Martch et al. |
| 2018/0014072 A1 | 1/2018 | Dimov et al. |

FOREIGN PATENT DOCUMENTS

| | | |
|---|---|---|
| EP | 1469476 | 10/2004 |
| EP | 1865716 | 12/2007 |
| EP | 2902568 | 12/2007 |
| EP | 2107477 | 10/2009 |
| EP | 2309733 | 4/2011 |
| EP | 2403239 | 1/2012 |
| EP | 2464138 | 6/2012 |
| JP | 10322622 | 12/1998 |
| JP | 2005-317165 | 11/2005 |
| JP | 2006-245745 | 9/2006 |
| JP | 2008167019 | 7/2008 |
| JP | 2012-029150 | 2/2012 |
| JP | 5034516 | 9/2012 |
| JP | 2013-175854 | 9/2013 |
| JP | 2014-157460 | 8/2014 |
| KR | 2004-0025073 | 3/2004 |
| KR | 2006-0128295 | 12/2006 |
| WO | 9837694 | 8/1998 |
| WO | 0243353 | 5/2002 |
| WO | 2005059807 | 6/2005 |
| WO | 2007064987 | 6/2007 |
| WO | 2007098067 | 8/2007 |
| WO | 2009073925 | 6/2009 |
| WO | 2011040999 | 4/2011 |
| WO | 2013016626 | 1/2013 |
| WO | 2013166456 | 11/2013 |
| WO | 2014072742 | 5/2014 |
| WO | 2014164782 | 10/2014 |
| WO | 2014179017 | 11/2014 |
| WO | 2016030380 | 3/2016 |
| WO | 2016030384 | 3/2016 |
| WO | 2016030477 | 3/2016 |
| WO | 2016033545 | 3/2016 |
| WO | 2016034899 | 3/2016 |
| WO | 2016055761 | 4/2016 |

OTHER PUBLICATIONS

International Search Report for PCT/US2014/080651 dated Jan. 19, 2015 (9 pages).

International Search Report for PCT/US2014/060649 dated Jan. 8, 2015 (9 pages).

Thuuz Sports, "Frequently Asked Questions", www.thuuz.com/faq/, retrieved Mar. 28, 2017, 7 pages.

Jin, S.H., et al., "Intelligent Broadcasting System and Services for Personalized Semantic Contents Consumption", Expert Systems with Applications, Oxford, GB, vol. 31, No. 1, Jul. 1, 2006, pp. 164-173.

Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.

R. Natarajan et al. "Audio-Based Event Detection in Videos—A Comprehensive Survey", Int. Journal of Engineering and Technology, vol. 6 No. 4 Aug.-Sep. 2014.

Q. Huang et al. "Hierarchical Language Modeling for Audio Events Detection in a Sports Game", IEEE International Conference on Acoustics, Speech and Signal Processing, 2010.

Q. Huang et al. "Inferring the Structure of a Tennis Game Using Audio Information", IEEE Trans. on Audio Speech and Language Proc., Oct. 2011.

M. Baillie et al. "Audio-based Event Detection for Sports Video", International Conference on Image and Video, CIVR 2003.

Y. Rui et al. "Automatically Extracting Highlights for TV Baseball Programs", Proceedings of the eighth ACM International conference on Multimedia, 2000.

D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.

(56) References Cited

OTHER PUBLICATIONS

E. Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevsky et al. "ImageNet Classification with Deep Convolutional Neural Networks", In Proc. NIPS, pp. 1097-1105, 2012.
D. A. Sadlier et al. "Event Detection in Field Sports Video Using Audio—Visual Features and a Support Vector Machine", IEEE Trans. on Circuits and Systems for Video Technology, vol. 15, No. 10, Oct. 2005.
P. F. Felzenszwalb et al. "Efficient Graph-Based Image Segmentation", International Journal of Computer Vision, Sep. 2004, vol. 59, Issue 2, pp. 167-181.
C. J. C. Burges "A Tutorial on Support Vector Machines for Pattern Recognition", Springer, Data Mining and Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 7700, Springer, 2012.
L. Neumann, J. Matas, "Real-Time Scene Text Localization and Recognition", 5th IEEE Conference on Computer Vision and Pattern Recognition, Jun. 2012.
R. Smith "An Overview of the Tesseract OCR Engine", International Conference on Document Analysis and Recognition (ICDAR), 2007.
M. Merler, et al., "The Excitement of Sports: Automatic Highlights Using Audio/Visual Cues", Dec. 31, 2017, pp. 2520-2523.
H. Harb, et al., Highlights Detection in Sports Videos Based on Audio Analysis, pp. 1-4, Sep. 2009.
J. Ye, et al., Audio-Based Sports Highlight Detection by Fourier Local-Auto-Correlations, 11th Annual Conference of the International Speech Communication Association, Sep. 2010, pp. 2198-2201.

\* cited by examiner

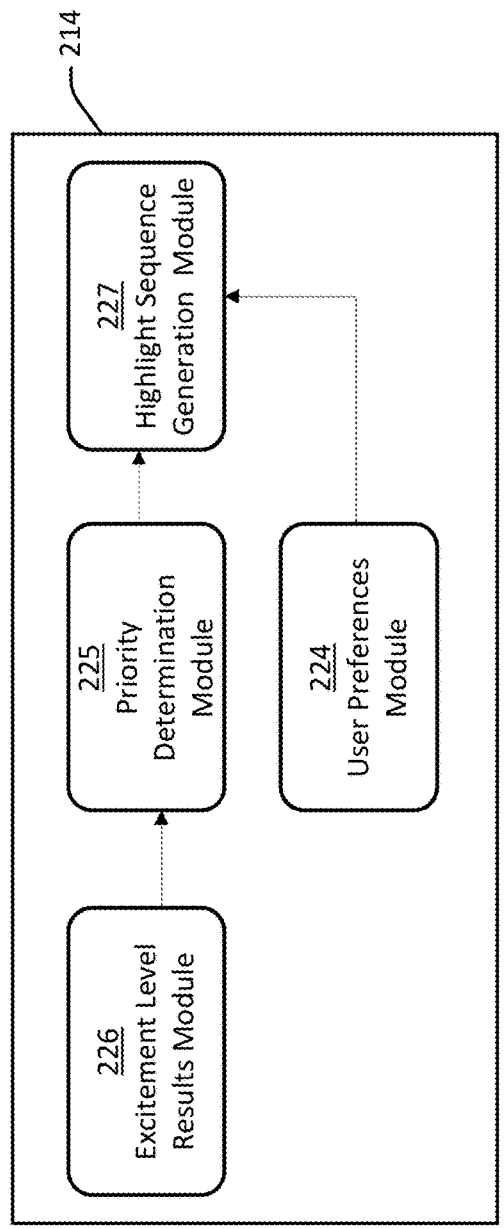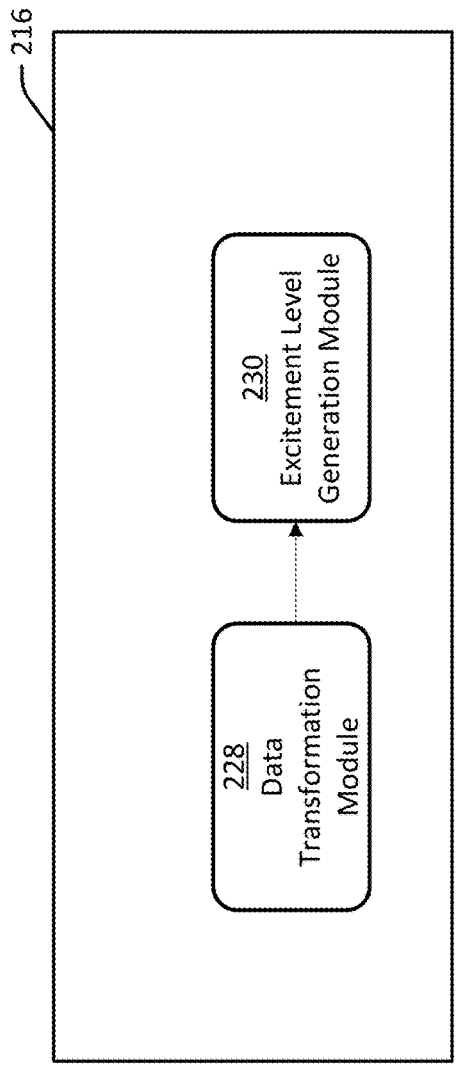
FIG. 2D
FIG. 2E

FIG. 5A

| | 501 | 502 | 503 | 504 | 505 | 506 | 507 | 508 | 509 | 510 | 511 |
|---|---|---|---|---|---|---|---|---|---|---|---|
| | drive_id | team_in_possession | novelty_drive | EO_final | delta EO | delta comeback | nail_biter | score | score change | lead change | possession_priority |
| | 1 | Chiefs | 10.90113 | 68 | -2 | 0 | 0 | 7 -- 0 | 7 | lead change | 4 |
| | 2 | Colts | 8.966667 | 73 | 5 | 0 | 0 | 7 -- 7 | -7 | tie game lead change | 5 |
| | 3 | Chiefs | 9.666667 | 80 | 7 | 0 | 0 | 10 -- 7 | 3 | | 6 |
| | 4 | Colts | 1.416667 | 86 | 6 | 0 | 0 | 10 -- 7 | 0 | | 1 |
| | 5 | Chiefs | 10.4 | 90 | 4 | 0 | 0 | 17 -- 7 | 7 | | 6 |
| | 6 | Colts | 3.7 | 90 | 0 | 0 | 0 | 17 -- 7 | 0 | | 2 |
| | 7 | Chiefs | 4.3376 | 82 | -8 | 0 | 0 | 24 -- 7 | 7 | | 4 |
| | 8 | Colts | 5.462435 | 75 | -7 | 0 | 0 | 24 -- 7 | 0 | | 4 |
| | 9 | Chiefs | 8.994533 | 64 | -11 | 0 | 0 | 31 -- 7 | 7 | | 6 |
| | 10 | Colts | 6.3604 | 58 | -6 | 0 | 0 | 31 -- 10 | -3 | | 1 |
| | 11 | Chiefs | -0.25 | 58 | 0 | 0 | 0 | 31 -- 10 | 7 | | 0 |
| | 12 | Colts | 2.7 | 61 | 3 | 0 | 0 | 31 -- 10 | 0 | | 0 |
| | 13 | Chiefs | 4.55 | 55 | -6 | 0 | 0 | 38 -- 10 | 7 | | 6 |
| | 14 | Colts | 8.606667 | 72 | 17 | 0 | 0 | 38 -- 17 | -7 | | 5 |
| | 15 | Chiefs | 9.366667 | 82 | 10 | 0 | 0 | 38 -- 17 | 0 | | 8 |
| | 16 | Colts | 5.8 | 98 | 16 | 0.071429 | 0 | 38 -- 24 | -7 | | 2 |
| | 17 | Chiefs | 0.2 | 98 | 0 | 0 | 0 | 38 -- 24 | 0 | | 3 |
| | 18 | Colts | 3.05 | 99 | 1 | 0 | 0 | 38 -- 24 | 0 | | 3 |
| | 19 | Chiefs | 1.14286 | 95 | -4 | 0 | 0 | 41 -- 24 | 3 | | 7 |
| | 20 | Colts | 9.354267 | 99 | 4 | 0.071429 | 0 | 41 -- 31 | -7 | | 3 |
| | 21 | Chiefs | 3.0376 | 99 | 0 | 0 | 0 | 41 -- 31 | 0 | | 8 |
| | 22 | Colts | 8.522933 | 100 | 1 | 0 | 23 | 41 -- 38 | 3 | lead change | 7 |
| | 23 | Chiefs | 7.731982 | 100 | 0 | 0.142857 | 0 | 44 -- 38 | -7 | | 0 |
| | 24 | Colts | 14.54842 | 100 | 0 | 0 | 24 | 44 -- 45 | -7 | lead change | 14 |
| | 25 | Chiefs | 6.40525 | 100 | 0 | 0 | 25 | 44 -- 45 | 0 | | 6 |
| | 26 | Colts | -0.02272 | 100 | 0 | 0 | 0 | 44 -- 45 | 0 | | 3 |

500 all_possessions where possession_priority >= 4

| drive_id | team_in_p | novelty_dif | EQ_final | delta_EQ | delta come | nail_biter | score | score chan | lead chang | possession_priority |
|---|---|---|---|---|---|---|---|---|---|---|
| 1 | Chiefs | 10.90119 | 68 | -2 | 0 | | 0 7 - 0 | 7 | | 4 |
| 2 | Colts | 9.966667 | 73 | 5 | 0 | | 0 7 - 7 | -7 | tie game | 5 |
| 3 | Chiefs | 9.666667 | 80 | 7 | 0 | | 0 10 - 7 | 3 | lead chang | 6 |
| 5 | Chiefs | 10.4 | 90 | 4 | 0 | | 0 17 - 7 | 7 | | 6 |
| 7 | Chiefs | 4.3376 | 82 | -8 | 0 | | 0 24 - 7 | 7 | | 4 |
| 8 | Colts | 5.462435 | 75 | -7 | 0 | | 0 24 - 10 | -3 | | 4 |
| 9 | Chiefs | 8.994533 | 64 | -11 | 0 | | 0 31 - 10 | 7 | | 6 |
| 14 | Colts | 8.606667 | 72 | 7 | 0 | | 0 38 - 17 | -7 | | 6 |
| 15 | Chiefs | 9.366667 | 82 | 10 | 0 | | 0 38 - 17 | 0 | | 5 |
| 16 | Colts | 5.8 | 98 | 16 | 0.071429 | | 0 41 - 31 | -7 | | 8 |
| 20 | Colts | 9.354867 | 99 | 1 | 0 | | 0 41 - 38 | -7 | | 7 |
| 22 | Colts | 8.528933 | 100 | 1 | 0.071429 | | 0 41 - 38 | -7 | | 9 |
| 23 | Chiefs | 7.731902 | 100 | 0 | 0 | | 29 44 - 38 | 3 | lead chang | 7 |
| 24 | Colts | 14.54842 | 100 | 0 | 0.142857 | | 24 44 - 45 | -7 | | 14 last_lead of game_winning_posses |
| 25 | Chiefs | 6.49525 | 100 | 0 | 0 | | 25 44 - 45 | 0 | | 6 |

| Fantasy Roster | | | | |
|---|---|---|---|---|
| player | team | game | datetime | game_id |
| Lewis, Ken | KC | 0104.KC.Ir | 1/4/2014 21:35 | 1321956 |
| Martin, Jos | KC | 0104.KC.Ir | 1/4/2014 21:35 | 1321956 |
| McCluster, | KC | 0104.KC.Ir | 1/4/2014 21:35 | 1321956 |
| Parker, Ro | KC | 0104.KC.Ir | 1/4/2014 21:35 | 1321956 |
| Poe, Donta | KC | 0104.KC.Ir | 1/4/2014 21:35 | 1321956 |
| Robinson, | KC | 0104.KC.Ir | 1/4/2014 21:35 | 1321956 |
| Sherman, J | KC | 0104.KC.Ir | 1/4/2014 21:35 | 1321956 |
| Smith, Ale: | KC | 0104.KC.Ir | 1/4/2014 21:35 | 1321956 |
| Smith, Sea | KC | 0104.KC.Ir | 1/4/2014 21:35 | 1321956 |
| Succop, Ry | KC | 0104.KC.Ir | 1/4/2014 21:35 | 1321956 |
| Zombo, Fr | KC | 0104.KC.Ir | 1/4/2014 21:35 | 1321956 |
| Bethea, Ar | Ind | 0104.KC.Ir | 1/4/2014 21:35 | 1321956 |
| Brazill, La\ | Ind | 0104.KC.Ir | 1/4/2014 21:35 | 1321956 |
| Brown, Dor | Ind | 0104.KC.Ir | 1/4/2014 21:35 | 1321956 |
| Brown, Ser | Ind | 0104.KC.Ir | 1/4/2014 21:35 | 1321956 |
| Butler, Dar | Ind | 0104.KC.Ir | 1/4/2014 21:35 | 1321956 |
| Castonzo, | Ind | 0104.KC.Ir | 1/4/2014 21:35 | 1321956 |
| Chapman, | Ind | 0104.KC.Ir | 1/4/2014 21:35 | 1321956 |
| Choice, Ta | Ind | 0104.KC.Ir | 1/4/2014 21:35 | 1321956 |
| Conner, Ks | Ind | 0104.KC.Ir | 1/4/2014 21:35 | 1321956 |
| Davis, Von | Ind | 0104.KC.Ir | 1/4/2014 21:35 | 1321956 |
| Fleener, C | Ind | 0104.KC.Ir | 1/4/2014 21:35 | 1321956 |
| Freeman, . | Ind | 0104.KC.Ir | 1/4/2014 21:35 | 1321956 |
| Gordy, Jos | Ind | 0104.KC.Ir | 1/4/2014 21:35 | 1321956 |
| Havili, Sta | Ind | 0104.KC.Ir | 1/4/2014 21:35 | 1321956 |
| Heyward-B | Ind | 0104.KC.Ir | 1/4/2014 21:35 | 1321956 |
| Hilton, T.Y | Ind | 0104.KC.Ir | 1/4/2014 21:35 | 1321956 |
| Jean Franc | Ind | 0104.KC.Ir | 1/4/2014 21:35 | 1321956 |
| Landry, La | Ind | 0104.KC.Ir | 1/4/2014 21:35 | 1321956 |
| Luck, Andr | Ind | 0104.KC.Ir | 1/4/2014 21:35 | 1321956 |
| Lynch, Cor | Ind | 0104.KC.Ir | 1/4/2014 21:35 | 1321956 |
| Mathews, F | Ind | 0104.KC.Ir | 1/4/2014 21:35 | 1321956 |
| Mathis, Ro | Ind | 0104.KC.Ir | 1/4/2014 21:35 | 1321956 |
| McAfee, P | Ind | 0104.KC.Ir | 1/4/2014 21:35 | 1321956 |
| McNary, Jc | Ind | 0104.KC.Ir | 1/4/2014 21:35 | 1321956 |

GENERATING A CUSTOMIZED HIGHLIGHT SEQUENCE DEPICTING AN EVENT

CROSS-REFERENCE TO RELATED APPLICATIONS

The present application is related to U.S. Utility application Ser. No. 13/601,915 for "Generating Excitement Levels for Live Performances," filed Aug. 31, 2012, which is incorporated by reference herein in its entirety.

The present application is related to U.S. Utility application Ser. No. 13/601,927 for "Generating Alerts for Live Performances," filed Aug. 31, 2012, which is incorporated by reference herein in its entirety.

The present application is related to U.S. Utility application Ser. No. 13/601,933 for "Generating Teasers for Live Performances," filed Aug. 31, 2012 and issued on Nov. 26, 2013 as U.S. Pat. No. 8,595,763, which is incorporated by reference herein in its entirety.

TECHNICAL FIELD

The present document relates to mechanisms for generating and outputting customized highlight sequences for sporting events, entertainment events, news, and/or the like.

DESCRIPTION OF THE RELATED ART

There are many services that provide game highlights, box scores, and commentary for sporting events. Such services include, for example, news programs, sports channels, websites, and the like. In general, however, such services provide highlights based on some generalized determination as to what sporting events are likely to be of interest to the general viewer, and what portions of a sporting event are most likely to be of interest to the general viewer.

In general such services do not take into account the interests and preferences of an individual viewer. What may be of interest to one sports fan may be uninteresting to another sports fan. Currently available services merely broadcast a game's highlights without considering the myriad preferences of individual viewers that can make a sporting event more interesting or less interesting for them. This results in the inefficient use of the sports fans' time, potential loss of viewership, and a concomitant decrease in advertisement revenue.

SUMMARY

Various embodiments of the technology described herein provide mechanisms for generating and outputting customized highlight sequences for sporting events, entertainment events, and/or the like. For example, in the context of sporting events, a determination is made as to what types of sports, teams, leagues, players, plays, style of play, and/or the like are of interest to a particular user. Such a determination can be made based on information explicitly provided by the user, and/or automatically by observing user behavior or extracting such information from an external data source, such as an individual's profile on a social network or the like. Other factors can also be taken into account, such as what the user's friends may be watching, importance or excitement level of the sporting event or of specific portions of the sporting event, external considerations such as rarity of events, and/or the like.

In at least one embodiment, the amount of time available to the user can be obtained, so that the length of the highlight sequence can be tailored to the available time. In at least one other embodiment, the desire for highlight transitions that reveal the outcome of the upcoming segment ("spoiler transitions") vs. transitions that maintain the suspense of the upcoming segment ("discreet transitions") is elicited from the user to further appeal to the user's specific preferences. Once the particular interests of the user have been determined, along with the amount of time available, as well as the user's desire for discreet transitions vs. spoiler transitions, a customized highlight sequence is generated and presented, containing those specific portions of the sporting event that are likely to be of interest, arranged in a manner that is likely to be entertaining to the user and comports with the time restrictions. In at least one embodiment, the customized highlight sequence is generated to present a cohesive narrative, and highlights are automatically selected which tend to support that narrative.

In generating the customized highlight sequence, video and/or audio accounts of the sporting event are obtained from any suitable source. This can include live broadcasts, recorded material, material from online sources, and/or the like. Specific clips depicting events within the sporting event are identified and obtained, and are assembled in a manner so as to generate a highlight sequence that is coherent, possibly relaying a compelling narrative of the desired event, and that reflects the user's interests.

Similar techniques can be used for non-sporting events, for example to provide highlights of a movie, television program, news broadcast, and/or the like. Such techniques can be used for audio programming, audiovisual programming, text-based content, and/or the like.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 2D is a block diagram depicting one embodiment of the software components of an application server according to one embodiment.

FIG. 2E is a block diagram depicting one embodiment of the software components of an analytical server according to one embodiment.

FIG. 5A shows an example of a table including information for a number of possessions during an event in chronological order, in this case a football game, according to one embodiment.

FIG. 5B shows an example of a table including information for those possessions where the possession priority is greater than or equal to 4, according to one embodiment.

FIG. 5C shows an example of a table including information for those occurrences (plays) where the occurrence priority is greater than or equal to 180, according to one embodiment.

FIG. 5E shows an example of a table including information for those occurrences (plays) deemed to be the 15 most exciting occurrences in a game, based on occurrence (play) priority, according to one embodiment.

FIG. 5F shows an example of a table including information for those occurrences (plays) deemed to be the 20 most exciting occurrences in a game, based on occurrence (play) priority, according to one embodiment.

FIG. 5G shows an example of a fantasy roster, according to one embodiment.

FIG. 5H shows an example of a table including information for those occurrences (plays) involving players on a user's fantasy roster, according to one embodiment.

FIGS. 5I, 5J, and 5K show examples of tables including information for occurrences (plays) involving individual players on a user's fantasy roster, according to one embodiment.

FIG. 5L shows an example of a table including information for those occurrences (plays) involving players on a user's fantasy roster where the fantasy priority is greater than or equal to 180, according to one embodiment.

DETAILED DESCRIPTION

Definitions

Figure 1A:
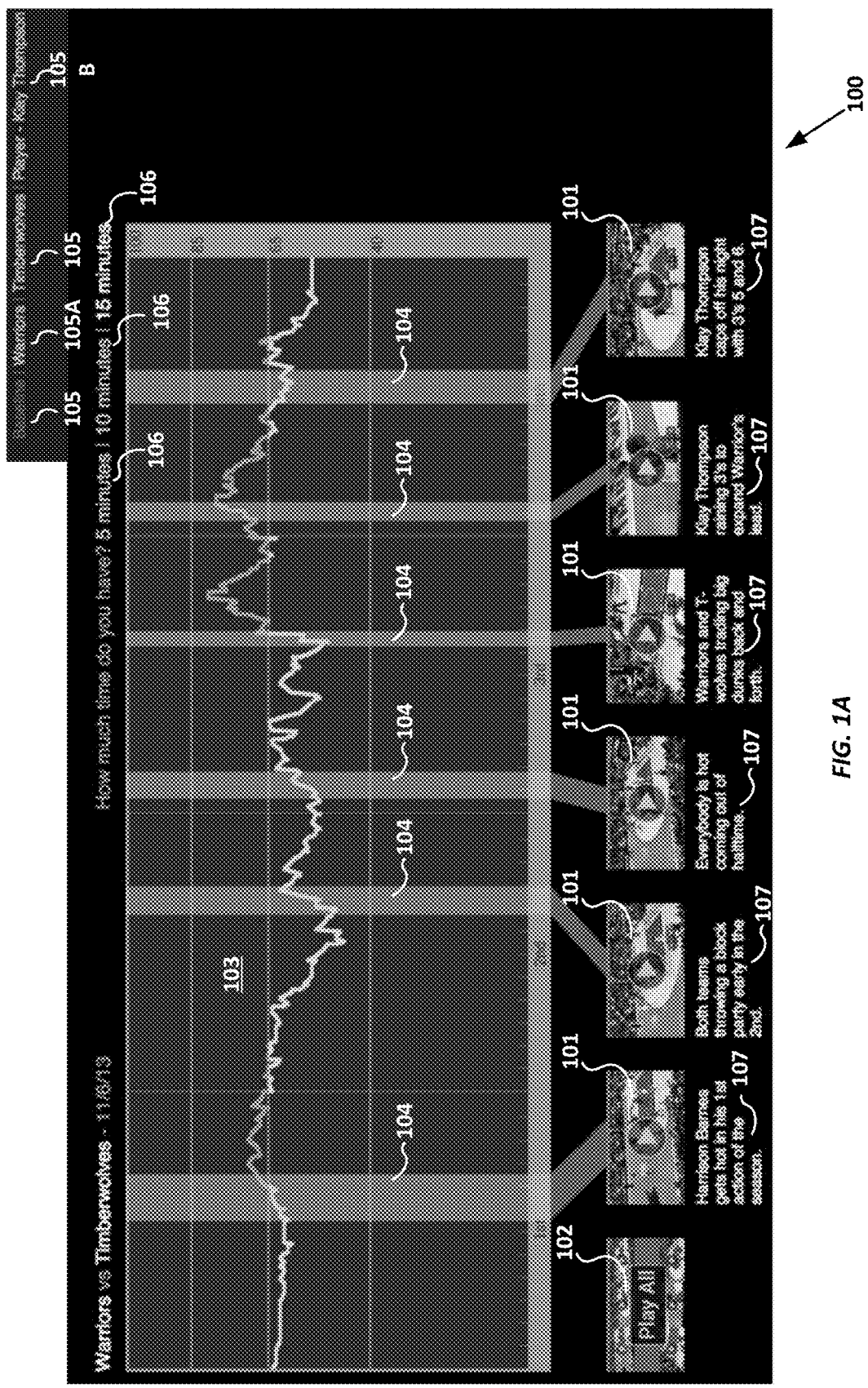
FIG. 1A depicts an example of an interface for presenting a customized highlight sequence, according to one embodiment.

The following definitions are presented for explanatory purposes only, and are not intended to limit scope.

Event: For purposes of the discussion herein, the term "event" refers to a game, session, match, series, performance, program, concert, and/or the like, or portion thereof (such as an act, period, quarter, half, inning, scene, chapter, or the like). An event may be a sporting event, entertainment event, the specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight sequences for any audiovisual, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.

Highlight: The term "highlight" (or "segment" or "highlight segment") refers to an excerpt or portion of an event or of content associated with an event. A highlight can be of any length. In general, the techniques described herein provide mechanisms for generating and presenting customized highlights (which may be selected based on particular characteristics and/or preferences of the user) for any suitable event. For ease of description, the term "highlight" (or "highlight segment") is also used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the video stream depicting the event itself), or retrieved from any number of other sources.

Highlight sequence: This term refers to a set of highlights that are arranged for presentation to a user. The highlight sequence may be presented linearly (such as a video stream), or in a manner that allows the user to select which highlight to view and in which order (for example by clicking on links or thumbnails). Presentation of highlight sequences can be non-interactive or interactive, for example allowing a user to pause, rewind, skip, fast-forward, communicate a preference for or against, and/or the like.

User/viewer: The terms "user" or "viewer" interchangeably refer to an individual, group, or other entity that is watching, listening to, or otherwise experiencing either an event, one or more highlights of an event, or a highlight sequence. The terms "user" or "viewer" can also refer to an individual, group, or other entity that may at some future time watch, listen to, or otherwise experience either an event, one or more highlights of an event, or a highlight sequence. The term "viewer" may be used for descriptive purposes, although the event need not have a visual component, so that the "viewer" may instead be a listener or any other consumer of content.

Occurrence: This term refers to something that takes place during an event. Examples include a goal, a play, a down, a hit, a save, a near-miss, a fight, a beginning or end of a game, quarter, half, period, or inning, a penalty, an injury, a dramatic incident in an entertainment event, a song, a solo, and/or the like. Occurrences can also be unusual, such as a power outage, an incident with an unruly fan, and/or the like. As will be discussed in more detail below, detection of such occurrences can be used as a basis for determining whether or not to include a particular highlight that includes a particular occurrence. Occurrences are also referred to herein as "plays", for ease of nomenclature, although such usage should not be construed to limit scope.

Possession: This term is broadly defined to include some time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, possessions are defined as corresponding to a half-inning. For other types of sporting events as well as for non-sporting events, the term "possession" may be somewhat of a misnomer, but is still used herein for illustrative purposes. One skilled in the art will recognize that the term is intended to apply broadly to any time-delimited portion of an event. Examples in a non-sporting context may include a chapter, scene, act, television segment, or the like. A possession can include any number of occurrences.

Excitement level: As discussed in more detail in the above-cited related U.S. Utility Applications, an excitement level is a measure of how exciting or interesting an event is at a given time within the event. Excitement levels can also be determined with respect to a particular occurrence or player. Various techniques for measuring or assessing excitement level are discussed in the related Applications. As discussed, excitement level can depend on occurrences within the event, as well as other factors such as overall context or importance of the event (playoff game, pennant implications, rivalries, and/or the like). In at least one embodiment, an excitement level can be associated with each possession of an event, based on occurrences that take place within that possession. Excitement level can also be measured differently for different users (e.g. a fan of one team vs. a neutral fan), and can depend on personal characteristics of each user.

Priority: A derived metric indicating an overall score for an occurrence or possession, which score can be used to determine whether to include the occurrence or possession in a customized highlight sequence. In at least one embodiment, priority can be derived from excitement level and/or other factors.

Overview

In at least one embodiment, the technology disclosed herein relates to generating and outputting customized highlight sequences for events, including sporting events, entertainment events, news events, and/or the like.

The technology disclosed herein is able to obtain or extract highlights from any suitable source, whether local or remote, and whether recorded or live. Examples include: live or recorded broadcasts of sporting events; online clips from video-sharing sites such as Vimeo or YouTube; archived video; local media such as a hard drive, optical drive, or magnetic drive; set-top boxes; local or remote servers; mobile computing devices such as smartphones or tablets; cameras; camcorders; or the like. Combinations of any such media can also be used. Source video can include the entire event (such as an entire game), or it can be a pre-curated highlight video from which a customized highlight sequence can be extracted.

Source video and/or other source content can come from any available source, whether linear (such as available via a cable box), or on-demand/IP-enabled (such as available from a website or on-demand service).

In another embodiment, video can be obtained from an online video-sharing website (such as Vimeo or YouTube). Such videos may be identified by title, metadata, and/or other means. In many cases, however, title or metadata for such video-sharing websites may be inaccurate; accordingly, in at least one embodiment, the system analyzes the video coming from such sources and determines correct information from the video analysis before using such video in generating a customized highlight sequence. In at least one embodiment, the system identifies and associates pre-curated, individual highlights with specific occurrences in the event. For example, if the event is a sporting event such as a baseball game, the system can identify a set of videos that are available via a video-sharing website, depicting individual highlight plays of the game. In order to prioritize these highlight videos correctly, the system associates the videos with individual occurrences (such as plays) that took place in the course of the game. In at least one embodiment, this is done by automated analysis of metadata associated with the videos. In at least one embodiment, such analysis is supplemented by additional techniques to improve accuracy, such as natural language processing and/or fuzzy logic; in this manner, each video can be correctly associated with the correct occurrence within the sporting event.

In another embodiment, video for a customized highlight sequence can come from the user's (or another user's) own video capture device, such as a smartphone, camera, or camcorder belonging to someone who attended the event.

In another embodiment, video from different sources can be used, and can be combined to generate the customized highlight sequence. In at least one embodiment, the system may include multiple angles of the same occurrence (such as a particularly remarkable occurrence), which angles may come from different video sources. For example, a customized highlight sequence can include the television feed for a grand slam, followed by a YouTube video of the same grand slam as captured by a fan who attended the game; since the YouTube video captures the occurrence from a different perspective, it may be effective to include it for emphasis and to show the crowd's reaction. In another example, the system can combine the video feed from once source (such as a network broadcast) with the audio feed from another source (such as a local radio commentator for one of the teams); such a combination may be more entertaining or interesting to a fan of that local commentator's team.

In at least one embodiment, the system takes into account what video sources or other content are available to the user. For example, if the user is a subscriber to a premium sports package, he or she may have access to on-demand video for certain sporting events that are not available to a non-subscriber. In at least one embodiment, the described system detects this, and uses such on-demand video (or other content) when available to construct the customized highlight sequence. For non-subscribers, the system looks for other available sources of content.

In order to effectively customize a highlight sequence, the technology disclosed herein is able to ascertain preferences and interests of an individual user (or group of users). This can be done, for example, by any of: querying the user; observing his or her behavior; pulling preferences from a profile such as that collected and maintained by a social network, making inferences based on content viewed by the user, demographics, or other factors; observation of the user's friends or associates; and/or any combination thereof. In short, any suitable mechanism(s) can be used for determining such preferences and interests. In addition, the technology disclosed herein takes into account the amount of time available to the user for viewing a highlight sequence; this can be specified explicitly by the user, or ascertained based on previous viewing habits, industry standards, and/or any other factors. In addition, the technology disclosed herein takes in to account the desire of the user to see spoiler transitions (which reveal outcomes and/or events before they are displayed) vs. discreet transitions (which do not).

In at least one embodiment, the disclosed technology is capable of generating different customized highlight sequences for different users, based on factors that might make particular sporting events (or occurrences within such events) more exciting or less exciting for different categories of users. In at least one embodiment, the disclosed technology takes into account the degree to which a user is likely to be interested in a particular type of performance, team, league, player, division, conference, game, sport, genre or other variable. In one example, different highlight sequences might be generated for home team fans as opposed to visiting team fans or neutral fans. As used herein, a home team fan refers to a subscriber who is a fan of (or otherwise has an affinity for) the team that hosts the event, the visiting team fan refers to a subscriber who is a fan of (or otherwise has an affinity for) the team opposing the home team, and the neutral fan does not have a preference or affinity for the home team or the visiting team. In some embodiments, the event may involve more than two teams and/or one or more individuals. In some embodiments, the customized highlight sequences described herein can be generated separately for home team fans, visiting team fans and neutral fans. When the event involves more than two teams and/or one or more individuals, the customized highlight sequences described herein can be generated separately for fans of each of the multiple teams and/or individuals.

Customized highlight sequences can also be generated for other groups of people. For example, customized highlight sequences can be generated separately for different users based on user's affinity for fast-paced games, games with large momentum swings, games with great historical context or importance, or other categories. For example, a customized highlight sequence can include segments that are of a type that a particular user finds exciting, such as a crash within an auto race or a fight during a hockey game.

In at least one embodiment, customized highlight sequences include segments from a single event. In at least one other embodiment, customized highlight sequences can include segments from more than one event, such as a number of games that took place on a given day or over some other period of time, or that are part of a series, or the like. The particular assembly of segments from the different events is selected based on the user's individual affinities and characteristics.

In at least one embodiment, customized highlight sequences can be automatically constructed to focus on a particular player, team, division, league, playoff series, or the like. Customized highlight sequences can be generated which show highlights for all of a user's favorite players, even if they are on different teams, or for players belonging to a user's fantasy team in a fantasy league. In such an embodiment, the system obtains information about which players are in the user's fantasy team league, so that appropriate selections can be made as to which highlights to include; these selections can be made based on excitement level and/or priority as described below, but can also take into account the degree to which the user's players were involved in each occurrence (play) of the game.

In at least one embodiment, customized highlight sequences can be accompanied by scores, explanatory text, commentary, or other auxiliary content. Such content may be automatically generated, or may be composed by a human author. Such content can take any suitable form, such as audio (spoken commentary or voice-over), text (caption, title, or heading), graphical (icon or symbol on the screen), or the like. An example is a caption that appears at the beginning of a highlight segment, giving a context (such as a score, on-base situation, pitch count, possession, introductory text, or the like) for the highlight segment. Such auxiliary content may appear within the highlight sequence itself (such as before each segment of the sequence), and/or it can appear on a screen that summarizes the overall highlight sequence, such as a navigation screen that allows a user to see individual segments within the highlight sequence, as illustrated in more detail below. Other arrangements are possible.

In at least one embodiment, such contextual information can be derived from any suitable source, and can include items such as the current game situation, the current ball situation, and/or the like. In at least one embodiment, a transition effect can be used between highlight segments; such transition effect can be informational or non-informational.

In at least one embodiment, such contextual information can contain spoilers elucidating what is about to be shown in the upcoming highlight. In an alternative embodiment, such contextual information can be devoid of spoilers and simply help set up the situation at the time the upcoming highlight initiates. In at least one embodiment, a user can specify whether he or she wishes to see spoilers; in another embodiment, the system can make an automatic determination as to whether or not to include spoilers.

In at least one embodiment, the user can interact with a customized highlight sequence as it is being displayed. For example, the user can click on a link or perform some other input operation while a highlight segment is being displayed, to access more information about that portion of the sporting event. Clicking on the link can take the user to a more detailed description of the highlight segment, or to full video of the depicted event, or the like. In this manner, the displayed customized highlight sequence can be used as a mechanism for navigating within a more complete depiction of an event.

Customized highlight sequences can be provided to users via any suitable mechanism. In at least one embodiment, such sequences can be shown via a website, app, set-top box, software application, or the like. Any suitable hardware can be used for presenting customized highlight sequences, including a desktop computer, laptop computer, television, smartphone, tablet, music player, audio device, kiosk, set-top box, game system, wearable device, consumer electronic device, and/or the like. Such devices are generally referred to herein as client devices. Content can be transmitted to client devices via any suitable means, such as for example a computing network, cable network, satellite connection, wireless network, and/or the like. Content, including customized highlight sequences, can be transmitted to a client device from a server, cable provider, on-demand provider, satellite provider, and/or the like. Alternatively, the described technology can be implemented at a stand-alone device, such as a DVR containing a recording of a sporting event, wherein the device generates a customized highlight sequence from such a locally stored recording and presents it to the user. Thus, the technology can be implemented without requiring a connection to a remote server or other source of content.

User Interface

Referring now to FIG. 1A, there is shown an example of an interface 100 for presenting a customized highlight sequence for a particular event, according to one embodiment. In this example, the event is a basketball game between the Warriors and the Timberwolves on Nov. 6, 2013. Graph 103 depicts a dynamic measure of excitement level over the duration of the basketball game, as can be determined using the techniques described in above-referenced U.S. Utility application Ser. No. 13/601,915 for "Generating Excitement Levels for Live Performances," filed Aug. 31, 2012, which is incorporated by reference herein in its entirety.

The visual depiction of excitement level is optional, and is presented here for illustrative purposes. Excitement level is one possible factor that can be considered when determining which portions of the event to include in the customized highlight sequence. Other factors can be used, such as personalized factors that relate to an individual user's affinity for a particular team, player, type of play, and/or the like, and such factors can be combined with the excitement level (or can modify the excitement level) if appropriate to determine which segments to include. In other embodiments, other metrics can be used instead of or in addition to excitement level. In at least one embodiment, a derived metric called "priority" is used to determine which portions of an event to include in the customized highlight sequence; priority can be derived from excitement level and/or other factors, as described in more detail below.

In the example of FIG. 1A, certain segments are identified for inclusion in the customized highlight sequence. Thumbnails 101 corresponding to these segments are shown, allowing the user to watch the individual segments by clicking on the thumbnails 101. Graph 103 also contains vertical indicators 104 to provide graphical representations of where each individual segment appears within the sporting event. "Play all" thumbnail 102 allows the user to see the entire customized highlight sequence.

In at least one embodiment, a summary caption 107 is shown for each thumbnail 101. In at least one embodiment, the user can choose to omit such captions 107 so as to avoid "spoilers".

Interface 100 also contains other controls that can be used to specify parameters for the customized highlight sequence. Buttons 105 allow the user to specify whether he or she is more interested in a baseline (neutral) view, or is a fan of one team or the other, or is a fan of a particular player on one of the teams; different sets of highlights can be selected based on which affinity is specified. Buttons 106 allow the user to specify how long the customized highlight sequence should be; in at least one embodiment, different sets of highlights may be chosen depending on how much time is available. In at least one embodiment, in response to the user clicking on one of buttons 105 or 106, a different customized highlight sequence is dynamically generated; accordingly, graph 103 and thumbnails 101, 102 can be automatically updated in response to such an input operation.

Figure 1B:
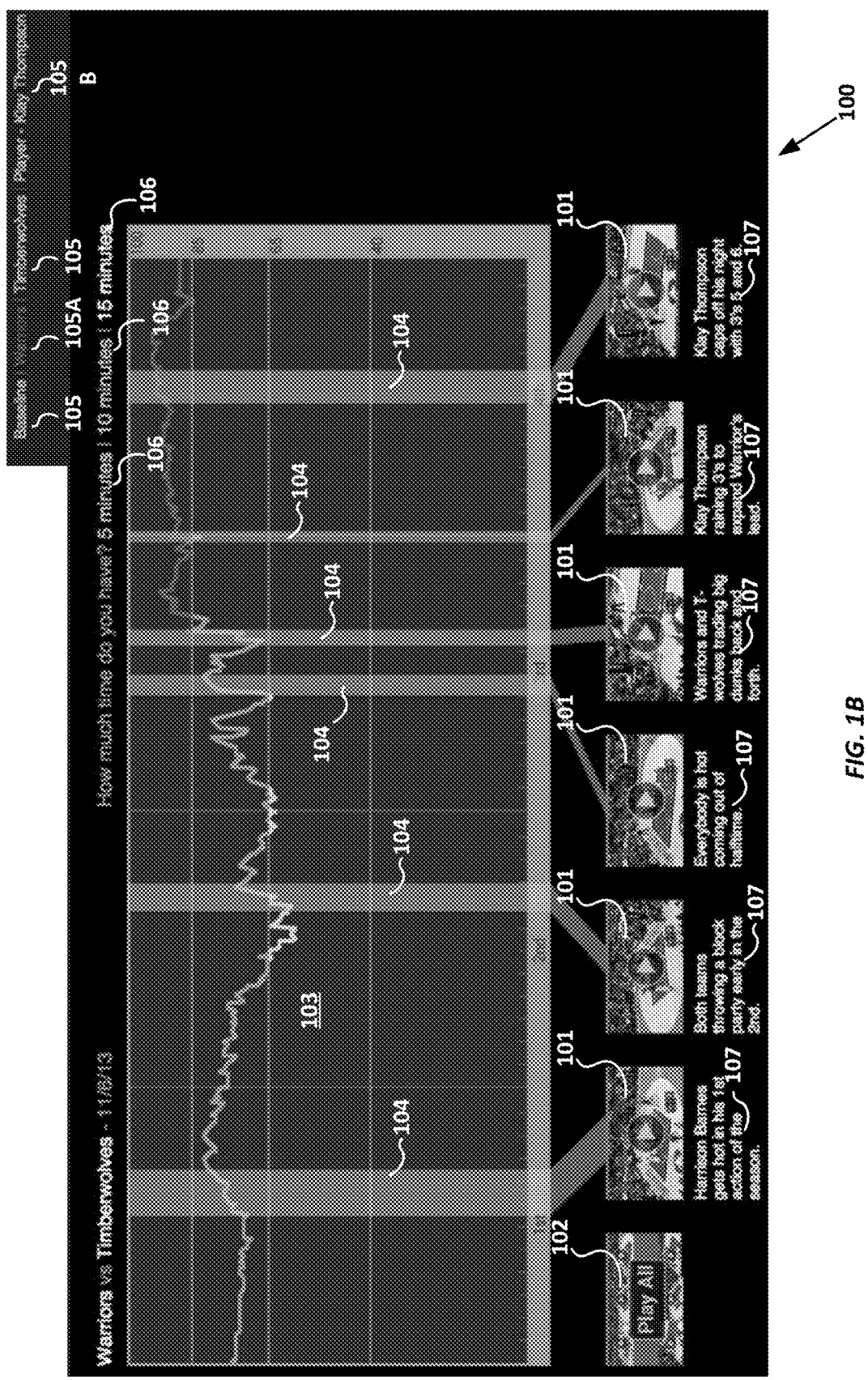
FIG. 1B depicts an example of an interface for presenting a highlight sequence that is customized to suit a fan of one of the competing teams, according to one embodiment.

FIG. 1B depicts an example of an update to interface 100 after the user has clicked on button 105A specifying that he or she is a Warriors fan. In response to such a selection, a customized highlight sequence that emphasizes Warriors plays is generated, as reflected by updated graph 103 and thumbnails 101, 102.

Figure 1C:
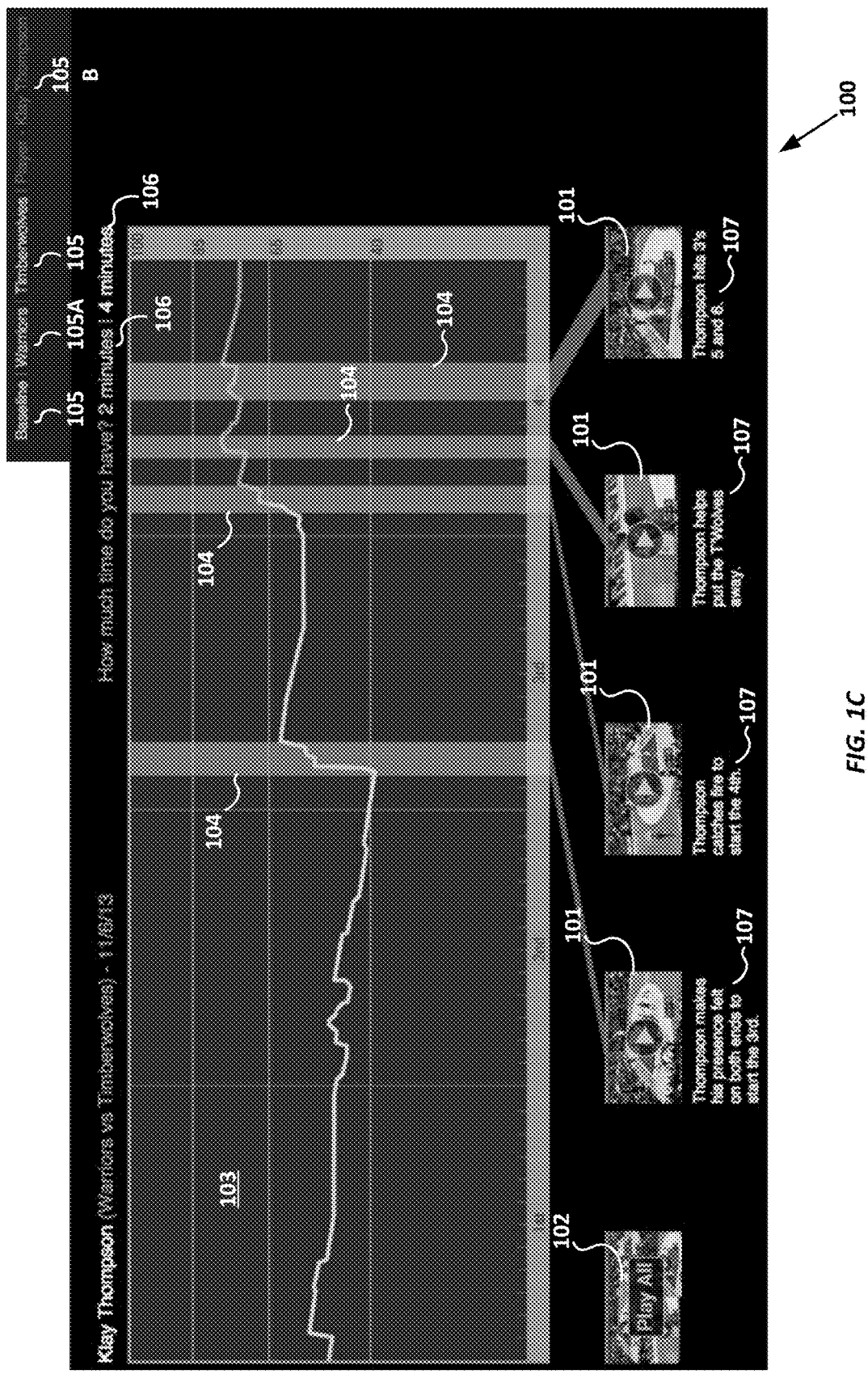
FIG. 1C depicts an example of an interface for presenting a highlight sequence that is customized to suit a fan of one of the competing players, according to one embodiment.

FIG. 1C depicts an example of an update to interface 100 after the user has clicked on button 105B specifying that he or she is a fan of player Klay Thompson. In response to such a selection, a customized highlight sequence that emphasizes Thompson's plays is generated, as reflected by updated graph 103 and thumbnails 101, 102.

In at least one embodiment, a "why was I shown this" link can be provided (not shown in FIGS. 1A through 1C), giving the user access to an explanation of why certain highlights were selected for inclusion in the highlight sequence. The user can also be given an opportunity to adjust any of a number of parameters and thereby change the highlight sequence.

FIGS. 1A through 1C depict presentation of a highlight sequence for a single event, such as a game. In at least one embodiment, the described system is able to generate a highlight sequence that includes any number of events, such as a number of games that took place on a given day, or a number of games for a particular team, or the like. In at least one embodiment, the user can select whether the highlight sequence should include highlights for a single event or multiple events.

FIGS. 1A through 1C depict one particular layout for presenting an interface 100 for viewing a customized highlight sequence and for navigating among different options. One skilled in the art will recognize that many other layouts and arrangements are possible.

In other embodiments, the customized highlight sequence can simply be presented as a video (or audio track), without any graphical representation of levels, and without any indication of a timeline or the like. Such a presentation may be particularly useful in a context where a user is viewing the highlight sequence on a television rather than on a website. Such a presentation can still allow for user navigation and interaction, for example by allowing a user to press a "forward" or "back" button to skip to the next or previous highlight segment within the sequence. Such a presentation can also allow a user to obtain more information or see more detailed highlights (or even switch to a view of the unexpurgated event itself, such as the entire game) by pressing an "Enter" button or the like (or performing some other suitable input operation).

Figure 1D:
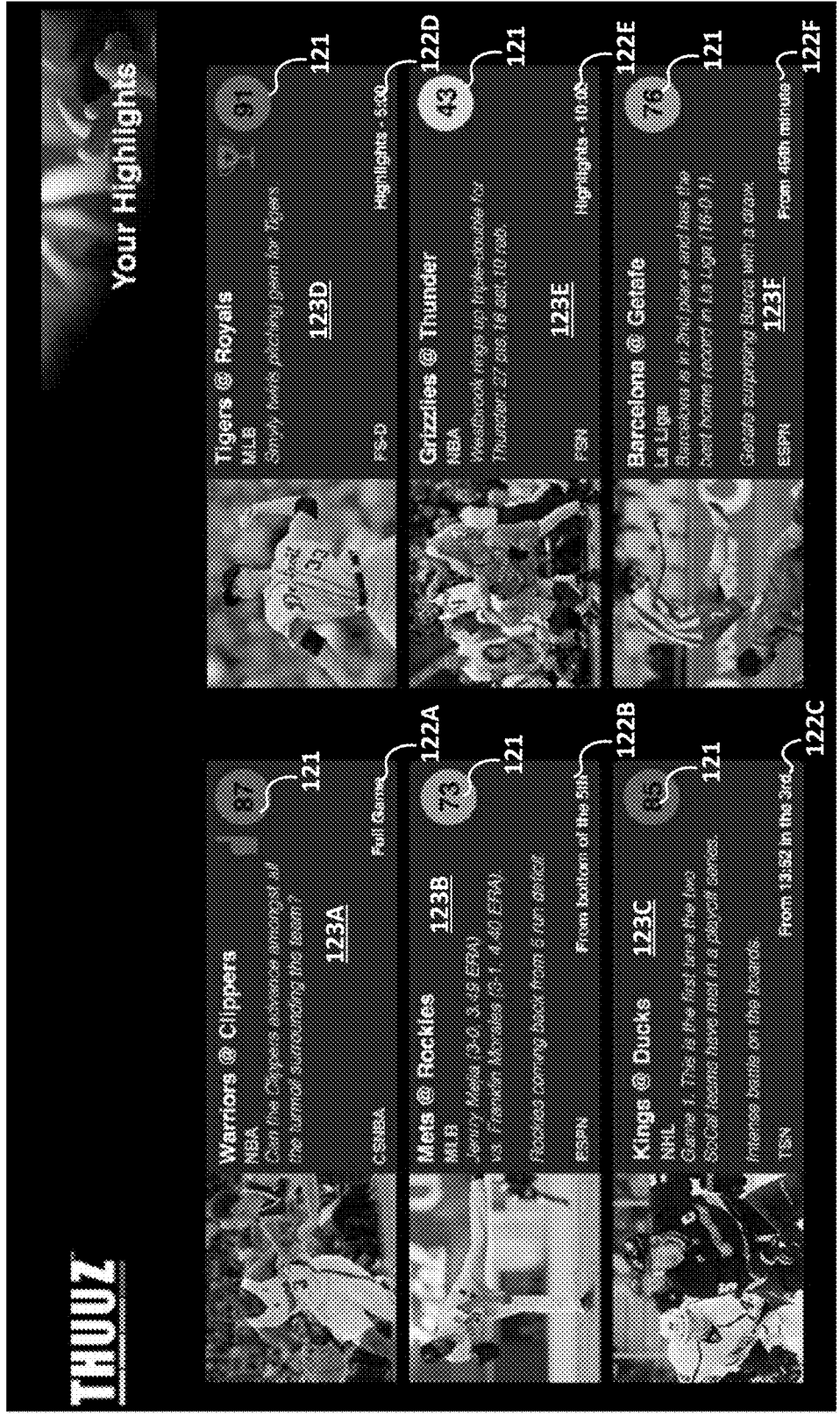
FIG. 1D depicts an example of an interface for navigating to a customized highlight sequence, according to one embodiment.

Referring now to FIG. 1D, there is shown an example of an interface 120 for navigating to a customized highlight sequence, according to one embodiment. Such an interface 120 can be used, for example, in an embodiment where events such as sporting events are stored on a local or server-based DVR. Interface 120 allows the user to navigate to full games, game excerpts, and/or highlight sequences. A set of panels 123 are included, allowing navigation to various representations of games. Each panel 123 includes a title, description of the game, indication of source, overall excitement level 121, and indication 122 as to whether it is a complete game, game excerpt, or highlight sequence (with specified duration). Excitement levels 121 can be customized for that user based on his or her individual characteristics and preferences, as described herein and in the above-cited related U.S. Utility Applications. The user can tap or click on a panel 123, or use a cursor or remote control to select a panel 123, in order to initiate playback of the corresponding game or highlight sequence. In at least one embodiment, this causes the device to start playback using locally stored video content; in another embodiment, it causes the device to retrieve the video content from a remote source (such as a server) and start playback. Retrieval can be by download or on a streaming basis.

In the example of FIG. 1D, panel 123A provides access to a full basketball game. Panels 123 B, 122C, and 122F provide access to game excerpts; in at least one embodiment, the system can select which excerpts to offer based on which portions of the game are the most exciting (for example, using excitement level(s) and/or priority for various portions of the game). Panels 123D and 123E provide access to customized highlight sequences generated according to the techniques described herein.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box, game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Figure 2A:
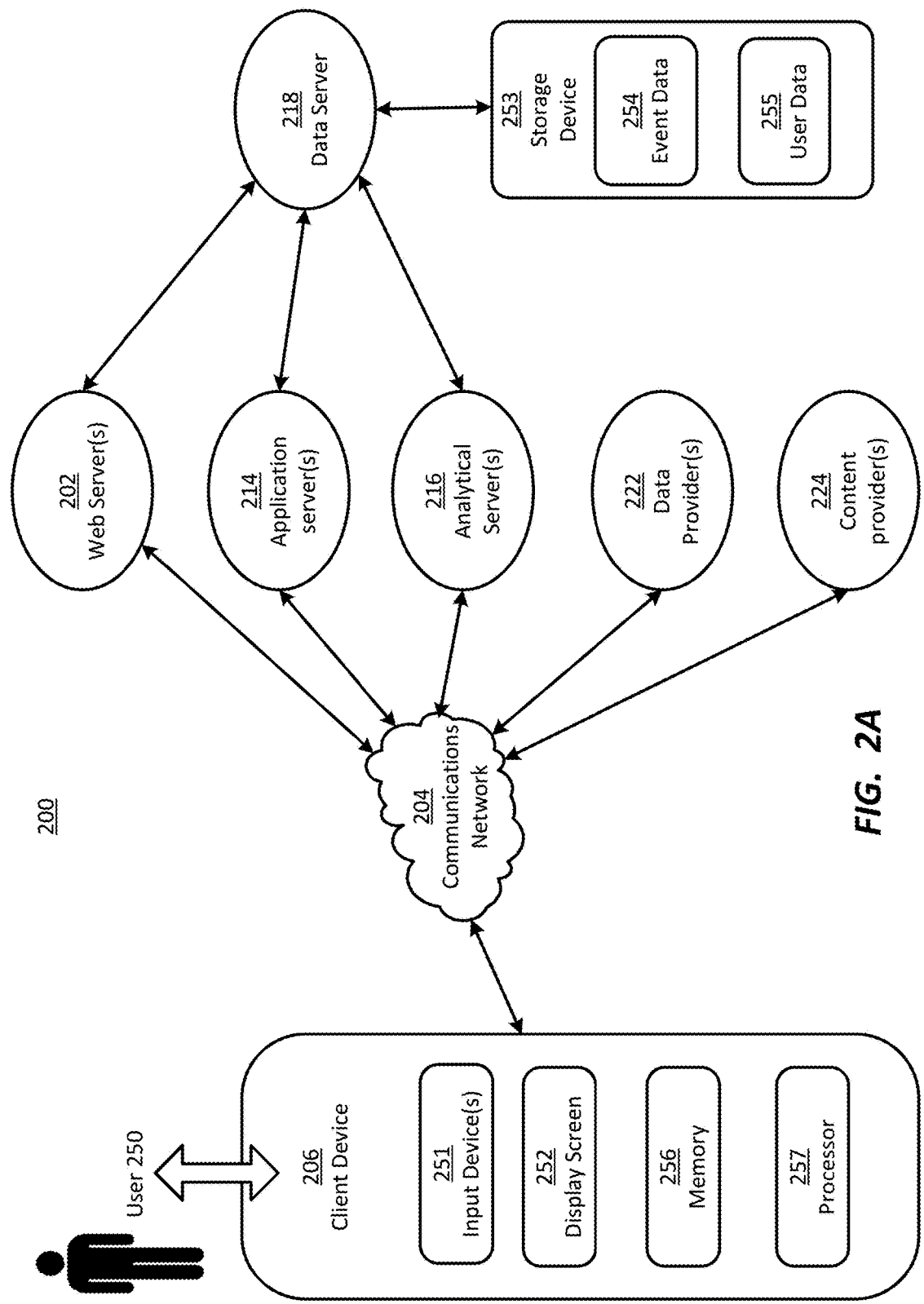
FIG. 2A is a block diagram depicting a hardware architecture according to a client/server embodiment, wherein event content is provided via a network-connected content provider.

Referring now to FIG. 2A, there is shown a block diagram depicting a hardware architecture according to a client/server embodiment, wherein event content is provided via a network-connected content provider 224. An example of such a client/ server embodiment is a web-based implementation, wherein client device 206 runs a browser or app that provides a user interface for interacting with content (such as web pages, video content, and/or the like) from various servers 202, 214, 216, as well as data provider(s) 222 and/or content provider(s) 224, provided to client device 206 via communications network 204. Transmission of content and/or data in response to requests from client device 206 can take using any known protocols and languages, such as Hypertext Markup Language (HTML), Java, Objective C, Python, JavaScript, and/or the like.

Client device 206 can be any electronic device, such as a desktop computer, laptop computer, television, smartphone, tablet, music player, audio device, kiosk, set-top box, game system, wearable device, consumer electronic device, and/or the like. In at least one embodiment, client device 206 has a number of hardware components well known to those skilled in the art. Input device(s) 251 can be any element(s) that receive input from user 250, including, for example, a keyboard, mouse, stylus, touch-sensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 252 can be any element that graphically displays information, video, content, and/or the like, including depictions of events, highlights, and/or the like. Such output may also include, for example, audiovisual content, data visualizations, navigational elements, graphical elements, queries requesting information and/or parameters for selection of content, or the like. Additionally or alternatively, display screen 252 may display status information in a wide variety of formats, including but not limited to status reports, summary reports, comparative reports, and the like. In at least one embodiment where only some of the desired output is presented at a time, a dynamic control, such as a scrolling mechanism, may be available via input device(s) 251 to change which information is currently displayed, and/or to alter the manner in which the information is displayed.

Processor 257 can be a conventional microprocessor for performing operations on data under the direction of software, according to well-known techniques. Memory 256 can be random-access memory, having a structure and architecture as are known in the art, for use by processor 257 in the course of running software for performing the operations described herein. Client device can also include local storage (not shown), which may be a hard drive, flash drive, optical or magnetic storage device, web-based (cloud-based) storage, and/or the like.

Any suitable type of communications network 204, such as the Internet, can be used as the mechanism for transmitting data between client device 206 and various server(s) 202, 214, 216 and/or content provider(s) 224 and/or data provider(s) 222, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 206 transmits requests for data and/or content via communications network 204, and receives responses from server(s) 202, 214, 216 containing the requested data and/or content.

In at least one embodiment, the system of FIG. 2A generates customized highlight sequences for sporting events; however, as mentioned above, the teachings herein apply to non-sporting events as well, and it is to be appreciated that the technology described herein is not limited to application to sporting events. For example, the technology described herein can be utilized to generate customized highlight sequences for a television show, movie, news event, game show, political action, business show, drama, and/or other episodic content, or for more than one such event.

In at least one embodiment, system 200 generates customized highlight sequences by analyzing live feeds and/or recordings of events, including any or all of video content, audio content, play-by-play statistics and metrics, or any other available data related to the event.

In one embodiment, system 200 includes one or more web server(s) 202 coupled via a network 204 to one or more client devices 206. Network 204 may be a public network, a private network, or a combination of public and private networks such as the Internet. Network 204 can be a LAN, WAN, wired, wireless and/ or combination of the above. Client device 206 is, in at least one embodiment, capable of connecting to network 204, either via a wired or wireless connection. In at least one embodiment, client device may also include a recording device capable of receiving and recording events, such as a DVR, PVR, or other media recording device. Such recording device can be part of client device 206, or can be external; in other embodiments, such recording device can be omitted. Although FIG. 2A shows one client device 206, system 200 can be implemented with any number of client device(s) 206 of a single type or multiple types.

Web server(s) 202 include one or more physical computing devices and/or software that can receive requests from client device(s) 206 and respond to those requests with data, as well as send out unsolicited alerts and other messages. Web server(s) 202 may employ various strategies for fault tolerance and scalability such as load balancing, caching and clustering. In at least one embodiment, web server(s) 202 may include caching technology, as known in the art, for storing client requests and information related to events.

Web server(s) 202 maintain, or otherwise designate, one or more application server(s) 214 to respond to requests received from client device(s) 206. In at least one embodiment, application server(s) 214 provide access to business logic for use by client application programs in client device(s) 206. Application server(s) 214 may be co-located, co-owned, or co-managed with web server(s) 202. Application server(s) 214 may also be remote from web server(s) 202. In at least one embodiment, application server(s) 214 interact with one or more analytical server(s) 216 and one or more data server(s) 218 to perform one or more operations of the disclosed technology.

In an exemplary operation of system 200, one or more users 250 of client devices 206 make a request to view a customized highlight sequence for an event or set of events, which may include sporting event(s) or non-sporting event(s). In another embodiment, such customized highlight sequence can be presented to user 250 without a specific request having been made by user 250. In one embodiment, user 250 can specify, via input device(s) 251 at client device 206, certain parameters for the customized highlight sequence (such as, for example, what event/games/teams to include, how much time the user 250 has available to view the highlight sequence, and/or any other parameters). User preferences can also be extracted from storage, such as from user data 255 stored in storage device 253, so as to customize the highlight sequence without necessarily requiring user 250 to specify preferences. User preferences can be determined based on observed behavior and actions of user 250 (for example, by observing website visitation patterns, television watching patterns, music listening patterns, online purchases, and/or the like); in addition or alternatively, user preference can be retrieved from previously stored preferences that were provided by user 250. Such user preferences may indicate which teams, sports, players, and/or types of events are of interest to user 250, and can therefore be used to guide selections of highlights for highlight sequences.

Analytical server(s) 216, which may include one or more computing devices, analyze live or recorded feeds of play-by-play statistics related to one or more events from data provider(s) 222. Examples of data provider(s) 222 may include, but are not limited to, providers of real-time sports information such as STATS™, OPTA™ and Sports Direct™. In one embodiment, analytical server(s) 216 generate different sets of excitement levels for events; such excitement levels can then be used (possibly in combination with other data) for selecting highlights according to the techniques described herein. The operations performed by analytical server(s) 216 are described in more detail in the above-cited related U.S. Utility Applications.

Application server(s) 214 receive the different sets of excitement levels generated by analytical server(s) 216, and use such data to generate customized highlight sequences for user 250 according to the techniques described herein. In at least one embodiment, application server(s) 214 derive a priority metric for each possession, occurrence, or other portion of events; the priority metric can be derived from the excitement level and/or from other information. The priority metric can then be used to select highlights for inclusion in a customized highlight sequence. In other embodiments, application server(s) 214 use excitement level alone, and do not generate a priority.

Content for highlight sequences can come from any suitable source, including from content provider(s) 224 (which may include websites such as YouTube, MLB.com, and the like; sports data providers; television stations; client- or server-based DVRs; and/or the like). Alternatively, content can come from a local source such as a DVR or other recording device associated with (or built into) client device 206. In at least one embodiment, application server(s) 214 makes the customized highlight sequence available to user 250, either as a download, or streaming content, or on-demand content, or by some other means. In another embodiment, application server(s) 214 sends information to client device 206 to identify specific highlights for a highlight sequence, and client device 206 then retrieves or obtains the identified highlights for presentation to user 250. Such an embodiment avoids the need for video content or other high-bandwidth content to be transmitted via network 204 unnecessarily, particularly if such content is already available at client device 206.

Figure 2B:
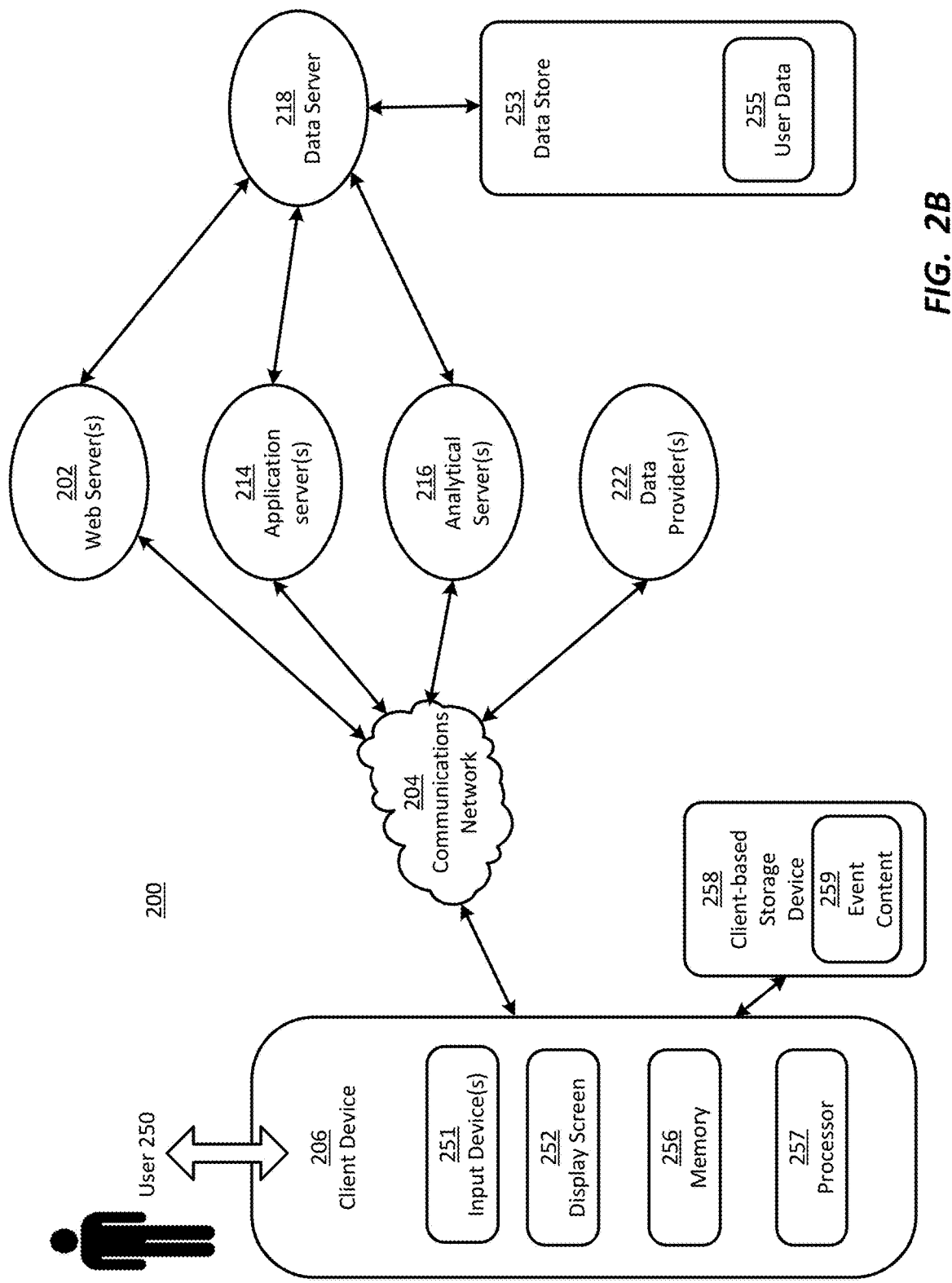
FIG. 2B is a block diagram depicting a hardware architecture according to another client/server embodiment, wherein event content is stored at a client-based storage device.

For example, referring now to FIG. 2B, there is shown an example of an embodiment wherein event content 259 is stored at client-based storage device 258, which may be any form of local storage device available to client device 206. An example is a DVR on which events may be recorded, such as for example video content for a complete sporting event. Alternatively, device 258 can be any magnetic, optical, or electronic storage device for data in digital form; examples include flash memory, magnetic hard drive, CD-ROM, DVD-ROM, or other device integrated with device 206 or communicatively coupled with device 206. Based on the information provided by application server(s) 214, client device 206 is able to extract highlights from event content 259 stored at client-based storage device 258, and thereby present a customized highlight sequence to user 250 without having to retrieve video content from a content provider 224 or other remote source. Such an arrangement can save bandwidth, and can usefully leverage existing hardware that may already be available to client device 206.

Returning to FIG. 2A, in at least one embodiment, application server(s) 214 may generate different customized highlight sequences for different users 250, depending on individual user preferences and/or other parameters. The operations performed by application server(s) 214 are described in more detail below. In at least one embodiment, the customized highlight sequences may be presented to user 250 via any suitable output device, such as display screen 252 at client device 206. User 250 can, in at least one embodiment, interact with displayed highlight sequences via input device(s) 251, for example to select particular highlight segments for display, as well as to pause, rewind, fast-forward, and/or perform other actions.

In at least one embodiment, one more data server(s) 218 are provided. Data server(s) 218 respond to requests for data from any of server(s) 202, 214, 216, for example to obtain event data 254 and/or user data 255. In at least one embodiment, such information can be stored at any suitable storage device 253 accessible by data server 218, and can come from any suitable source, such as from client device 206 itself, content provider(s) 224, data provider(s) 222, and/or the like. Event data 254 can include any information describing any number of events, as well as occurrences, excitement levels, and/or other information. User data 255 can include any information describing users 250, including for example, demographics, purchasing behavior, web viewing behavior, interests, preferences, and/or the like.

Figure 2C:
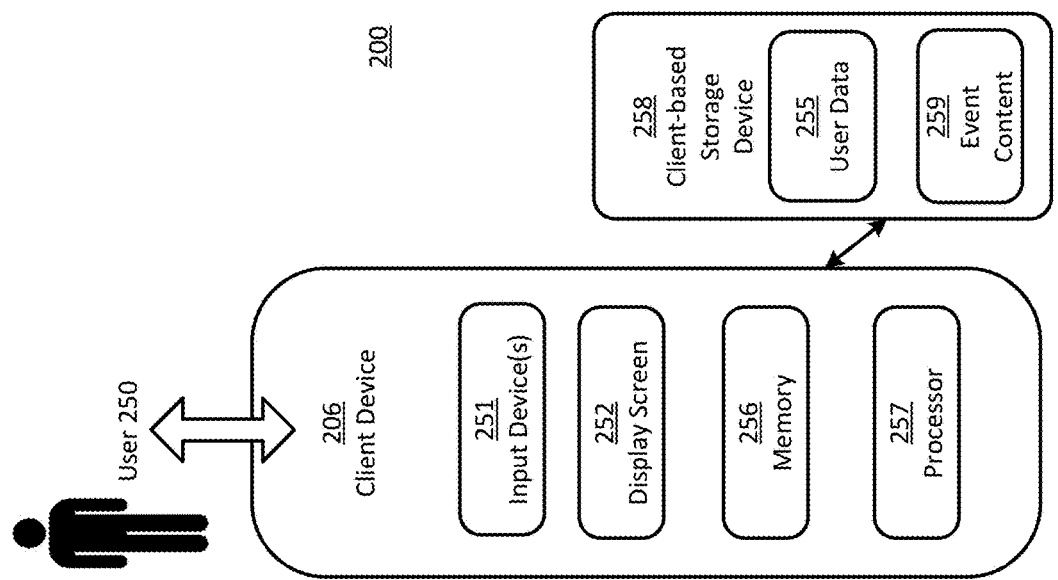
FIG. 2C is a block diagram depicting a hardware architecture according to a standalone embodiment.

Referring now to FIG. 2C, there is shown an alternative embodiment wherein system 200 is implemented in a standalone environment. As with the embodiment shown in FIG. 2B, event content 259 is stored at a client-based storage device 258, such as a DVR or the like. Alternatively, device 258 can be flash memory or a hard drive, or other device integrated with device 206 or communicatively coupled with device 206. User data 255, such as preferences and interests of user 250, can also be stored on device 258. Based on such user data 255, system 200 is able to identify particular highlights within event content 259 and thereby present a customized highlight sequence to user 250 in the manner described herein.

The specific hardware architectures depicted in FIGS. 2A, 2B, and 2C are merely exemplary. One skilled in the art will recognize that the techniques described herein can be implemented using other architectures.

In one embodiment, the system can be implemented as software written in any suitable computer programming language, whether in a standalone or client/server architecture. Alternatively, it may be implemented and/or embedded in hardware.

Referring now to FIG. 2D, there is shown a block diagram depicting one embodiment of the software components of application server(s) 214. In at least one embodiment, application server(s) 214 include a user preferences module 224, an excitement level results module 226, and a priority determination module 225. User preferences module 224 receives user preferences for user(s) 250. In various embodiments, such preferences can include, for example, a list of user's 250 favorite sports, favorite teams, favorite players, fantasy team roster, and/or the like.

In at least one embodiment, excitement level results module 226 receives different sets of excitement levels related to one or more events, from excitement level generation module 230 of analytical server 216 (described below). Priority determination module 225 uses data from excitement level results module 226, along with other data concerning possessions or occurrences within the event, to generate priority metrics for each possession or occurrence. In at least one embodiment, based on the priority metrics generated by priority determination module 225, along with user preferences obtained by user preferences module 224, highlight sequence generation module 227 generates customized highlight sequence(s) for presentation to user 250, according to the techniques described herein. In another embodiment, priority determination module 225 can be omitted, and highlight sequence generation module 227 generates customized highlight sequence(s) based on excitement levels received from excitement level results module 226, along with user preferences obtained by user preferences module 224.

Referring now to FIG. 2E, there is shown a block diagram depicting one embodiment of the software components of analytical server(s) 216. In at least one embodiment, analytical server 216 includes data transformation module 228 and excitement level generation module 230. Data transformation module 228 receives and analyzes data concerning events from one or more data provider(s) 222. Excitement level generation module 230 generates different excitement levels for different categories of users based on the analysis performed by data transformation module 228. Further details concerning the operation of these components are provided the above-cited related U.S. Utility Patent Applications.

Figure 3:
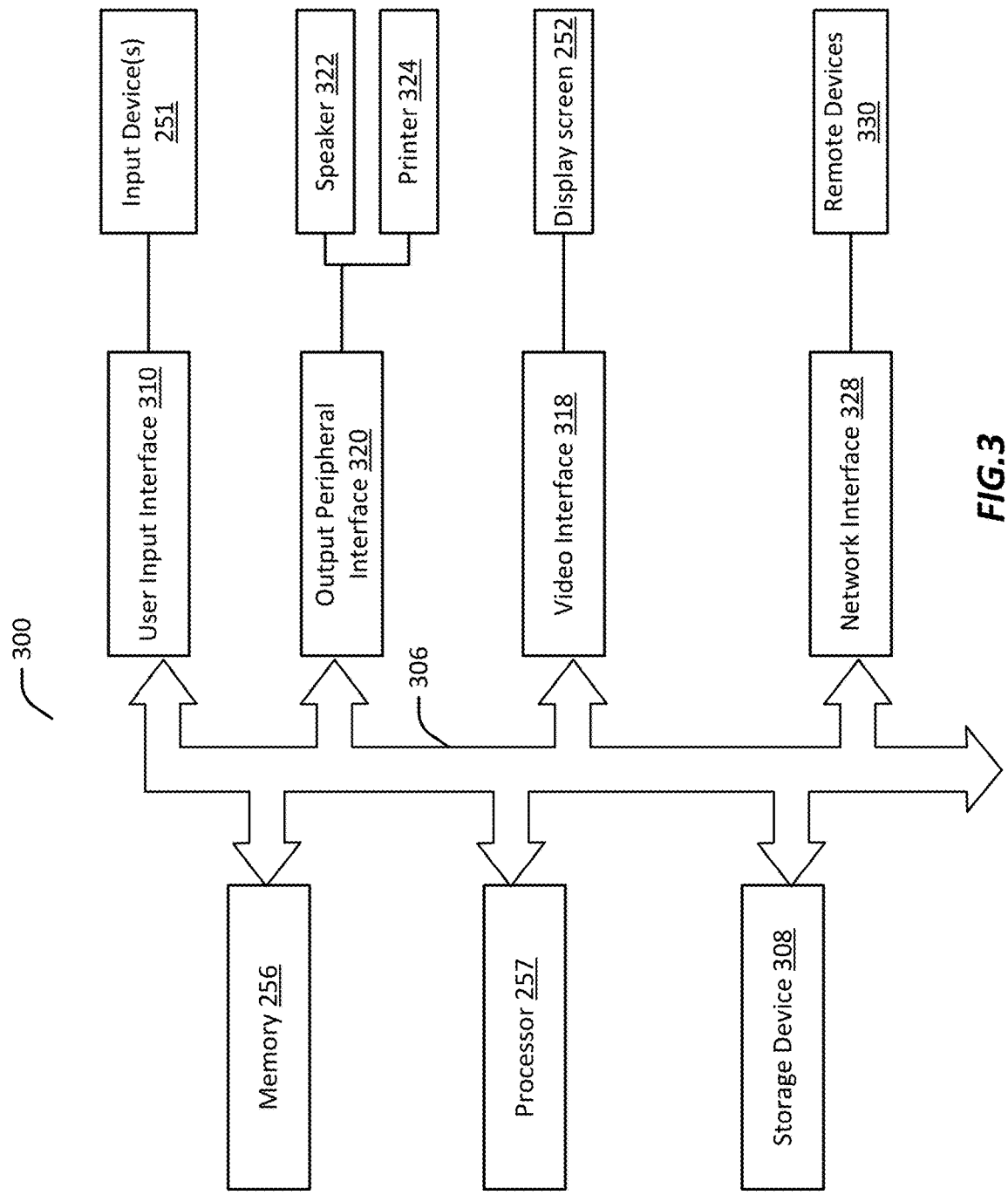
FIG. 3 is a block diagram depicting a general purpose computing device that can be used to implement any of the computing devices shown in FIGS. 2A through 2C.

Referring now to FIG. 3, there is shown a block diagram depicting a general purpose computing device, mobile device, and/or other electronic device that can be used to implement any of the computing devices shown in FIGS. 2A through 2 C. For example, the general purpose computing device depicted in FIG. 3 can be used to implement computing devices in the web server(s) 202, application server(s) 214, analytical server(s) 216, and/or client device 206.

In at least one embodiment, device 300 includes memory 256, a processor 257, and a system bus 306 that couples various system components including memory 256 to processor 257. System bus 306 may be any of several types of bus structures including a memory bus or memory controller, a peripheral bus, and a local bus using any of a variety of bus architectures.

Memory 256 stores, in part, instructions and data for execution by processor 257 in order to perform the process described herein. Memory 256 includes computer storage media in the form of volatile and/or nonvolatile memory such as read only memory (ROM) and random access memory (RAM). A basic input/output system (BIOS), containing the basic routines that help to transfer information between elements within device 300, such as during start-up, is typically stored in the ROM. RAM typically contains data and/or program modules that are immediately accessible to and/or presently being operated on by processor 257.

Device 300 further includes a mass storage device 308. Storage device 308, which may be implemented with a magnetic disk drive, an optical disk drive or flash memory, or the like, is a non-volatile storage device for storing data and instructions for use by processor 257. In one embodiment, storage device 308 stores the system software for implementing the processes described herein for purposes of loading to memory 256. Storage device 308 may be internal or external to device 300.

A user (such as user 250) may enter commands and information into device 300 through any suitable input device(s) 251. Input device(s) 251 can be any element that receives input from user 250, including, for example, a keyboard, mouse, stylus, touch-sensitive screen (touchscreen), touchpad, trackball, accelerometer, five-way switch, microphone, remote control, or the like. Input can be provided via any suitable mode, including for example, one or more of: pointing, tapping, typing, dragging, gesturing, tilting, shaking, and/or speech. These and other input devices are often connected to processor 257 through a user input interface 310 that is coupled to system bus 306, but may be connected by other interface and bus structures, such as a parallel port, game port or a universal serial bus (USB). A display screen 252 and/or other type of output device are also connected to system bus 306 via an interface, such as a video interface 318. Display screen 252 can be any element that graphically displays information, video, content, and/or the like, including depictions of events, highlights, and/or the like. In at least one embodiment, in addition to or instead of display screen 252, device 300 may also include other output devices such as speakers 322, printer 324, which may be connected through an output peripheral interface 320 or other suitable interface.

Device 300 may operate in a networked environment using logical connections to one or more remote devices 330. Remote devices 330 may be a desktop computer, laptop computer, television, smartphone, tablet, music player, audio device, kiosk, set-top box, game system, wearable device, consumer electronic device, and/or the like, and/or other common network node, and typically includes many or all of the elements described above relative to the device 300. In at least one embodiment, when used in a networking environment, device 300 is connected to a remote network (such as network 204) through a network interface or adapter 328.

The components contained in the device of FIG. 3 are those typically found in electronic devices suitable for use with the technology described herein, and are intended to represent a broad category of such components that are well known in the art. Thus, the device of FIG. 3 can be a desktop computer, laptop computer, television, smartphone, tablet, music player, audio device, kiosk, settop box, game system, wearable device, consumer electronic device, and/or the like. The device can also include different bus configurations, networked platforms, multi-processor platforms, etc. Various operating systems can be used.

Conceptual Architecture

In various embodiments, customized highlight sequences can be generated in different ways. In general, as described in more detail below, the techniques involve identifying a number of highlights for an event, determining start/end times for the identified highlights, and presenting a customized highlight sequence to a user including the identified highlights. In some embodiments, the full representation of the event (for example, an audiovisual recording of a sporting event) can be stored at a server; in other embodiments, it is stored at a client or at another location. Further details on the method are provided below.

FIGS. 6A through 6F depict various conceptual architectures for implementing the techniques described herein, wherein different components (either server-based or client-based) perform the various functions and operations involved in generating a customized highlight sequence. For clarity, certain hardware components are omitted from these Figures.

Figure 6A:
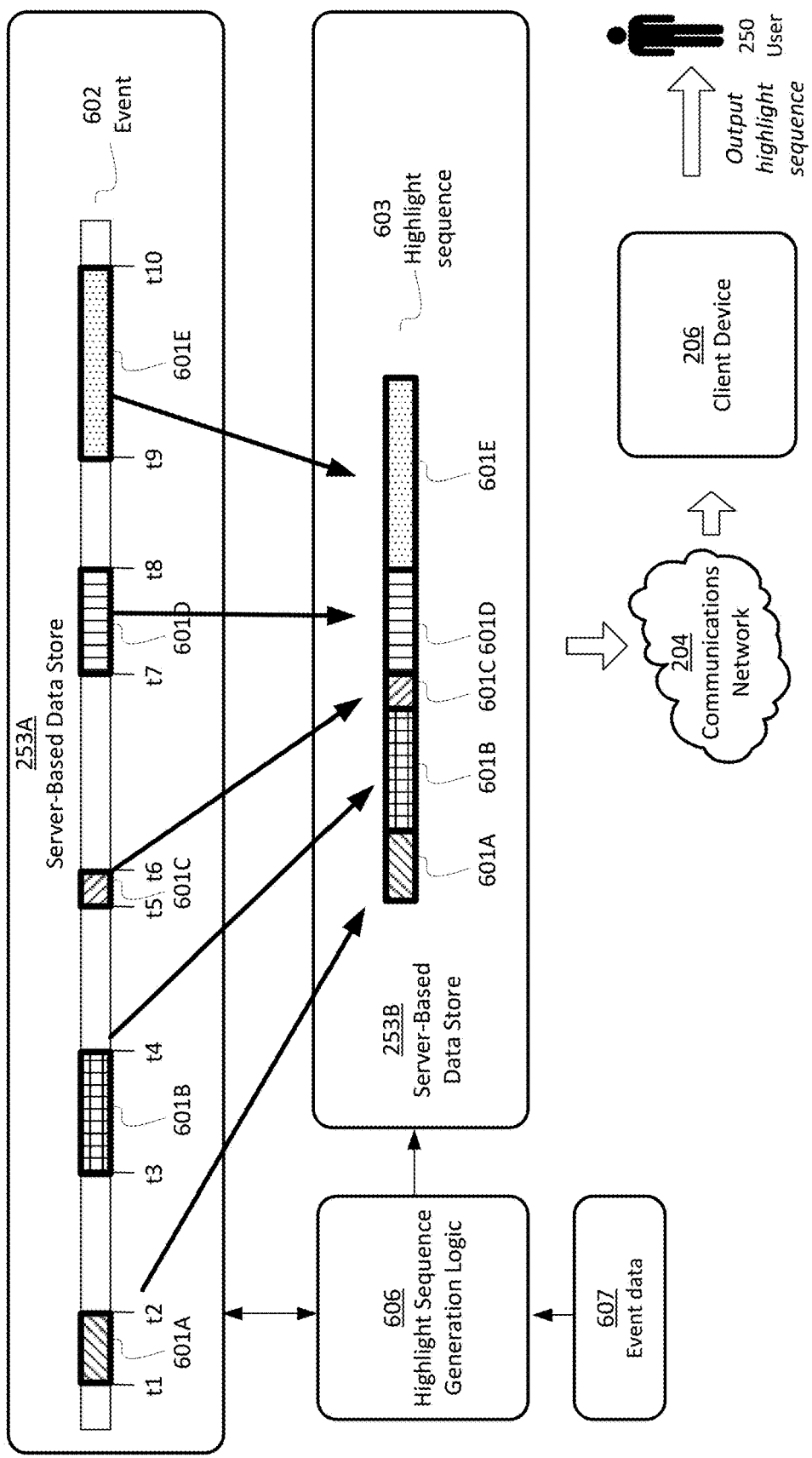
FIG. 6A is a block diagram depicting a conceptual architecture wherein a highlight sequence is generated at a server and transmitted to a client device for presentation to a user, according to one embodiment.

Referring now to FIG. 6A, there is shown a block diagram depicting a conceptual architecture wherein a highlight sequence is generated at a server and transmitted to a client device 206 for presentation to a user 250, according to one embodiment. A representation (such as a recording) of the event is stored at server-based data store 253A; for ease of nomenclature, this representation of the event is referred to simply as "event 602". Highlight sequence generation logic 606, which may be located at a server, uses descriptive data 607 about event 602 (such as information about occurrences that took place during event 602) to identify highlights 601 of event 602. Event data 607 can come from any suitable source, such as for example, data provider 222. The identification of highlights 601 can take into account factors such as particular characteristics of user 250, amount of time available for the highlight sequence, fan affiliation, and/or the like, as described in more detail below.

Highlight sequence generation logic 606 identifies highlights 601 by specifying start/end times for each highlight 601. In at least one embodiment, such start/end times are measured with respect to a video clock, which measures the actual elapsed time since the beginning of an event. In other embodiments, start/end times may be measured with respect to other timekeeping measures. Further descriptions of the video clock, along with other timekeeping measures such as a game clock, are provided below.

In the example of FIG. 6A, identified highlight 601A has a start time indicated by time code t1 and an end time indicated by time code t2; other highlights 601B through 601E have corresponding start/end times as indicated. Start/end times can be indicated by any suitable encoding scheme; for example, start/end time codes can simply indicate an elapsed time since the beginning of event 602. Alternatively, each end time can be replaced by a duration of the highlight 601, i.e., the elapsed time since the corresponding start time. Other encoding schemes are possible, whether with respect to a video clock, game clock, or other timekeeping measure.

In the embodiment shown in FIG. 6A, highlight sequence 603 is assembled and stored at server-based data store 253B, which may be the same data store as 253A or may be a different data store, either in the same location or in a different location. Highlight sequence 603, including highlights 601A through 601E, can be stored in any suitable format, including for example as a video file. Once highlight sequence 603 has been assembled and stored, it can be retrieved and/or played back in any suitable manner. For example, in response to a request, highlight sequence 603 can be transmitted over communications network 204 to client device 206 for playback to user 250.

Figure 6B:
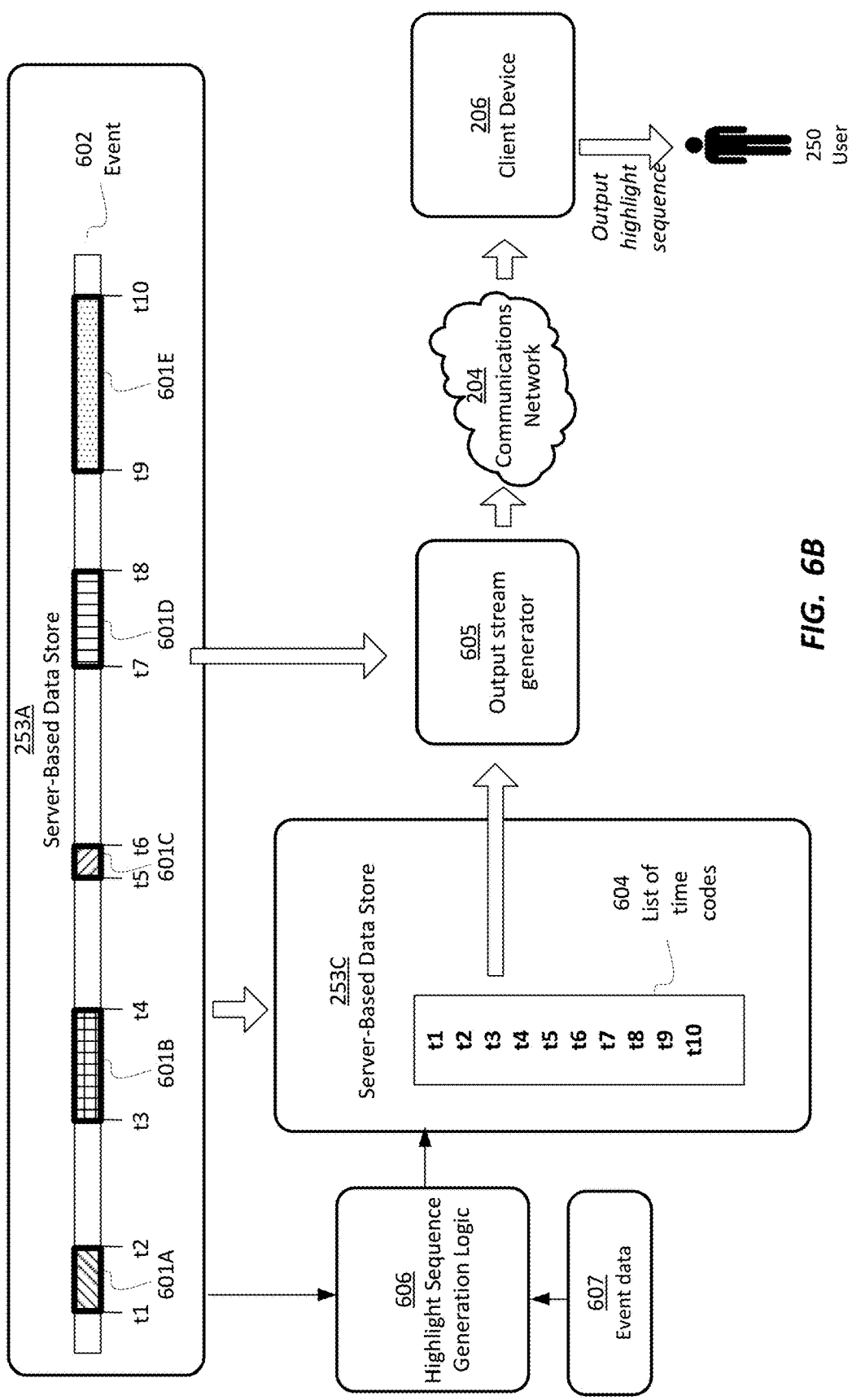
FIG. 6B is a block diagram depicting a conceptual architecture wherein highlight sequence generation logic generates time codes for generating a highlight sequence, and wherein such time codes are stored in a server-based data store, according to one embodiment.

Referring now to FIG. 6B, there is shown a block diagram depicting a conceptual architecture wherein highlight sequence generation logic 606 uses event data 607 to generate time codes 604 for generating a highlight sequence, and wherein such time codes 604 are stored in a server-based data store 253C, according to one embodiment. In this embodiment, rather than generating a video file including highlights 601A through 601E, logic 606 uses event data 607 to generate a list of time codes 604. Storing time codes 604 rather than the finished highlight sequence can save storage space and processing power, particularly if the original recording of event 602 is readily available. Once time codes 604 have been stored, a highlight sequence can be assembled and played on-the-fly, by retrieving and playing those portions of event 602 identified by the time codes 604. For example, in response to a request, output stream generator 605 (which may be located at a server or at client device 206) can retrieve time codes 604, and generate streamed output by retrieving the identified portions of event 602. The streamed output is then provided via network 204 to client device 206 for presentation to user 250.

Figure 6C:
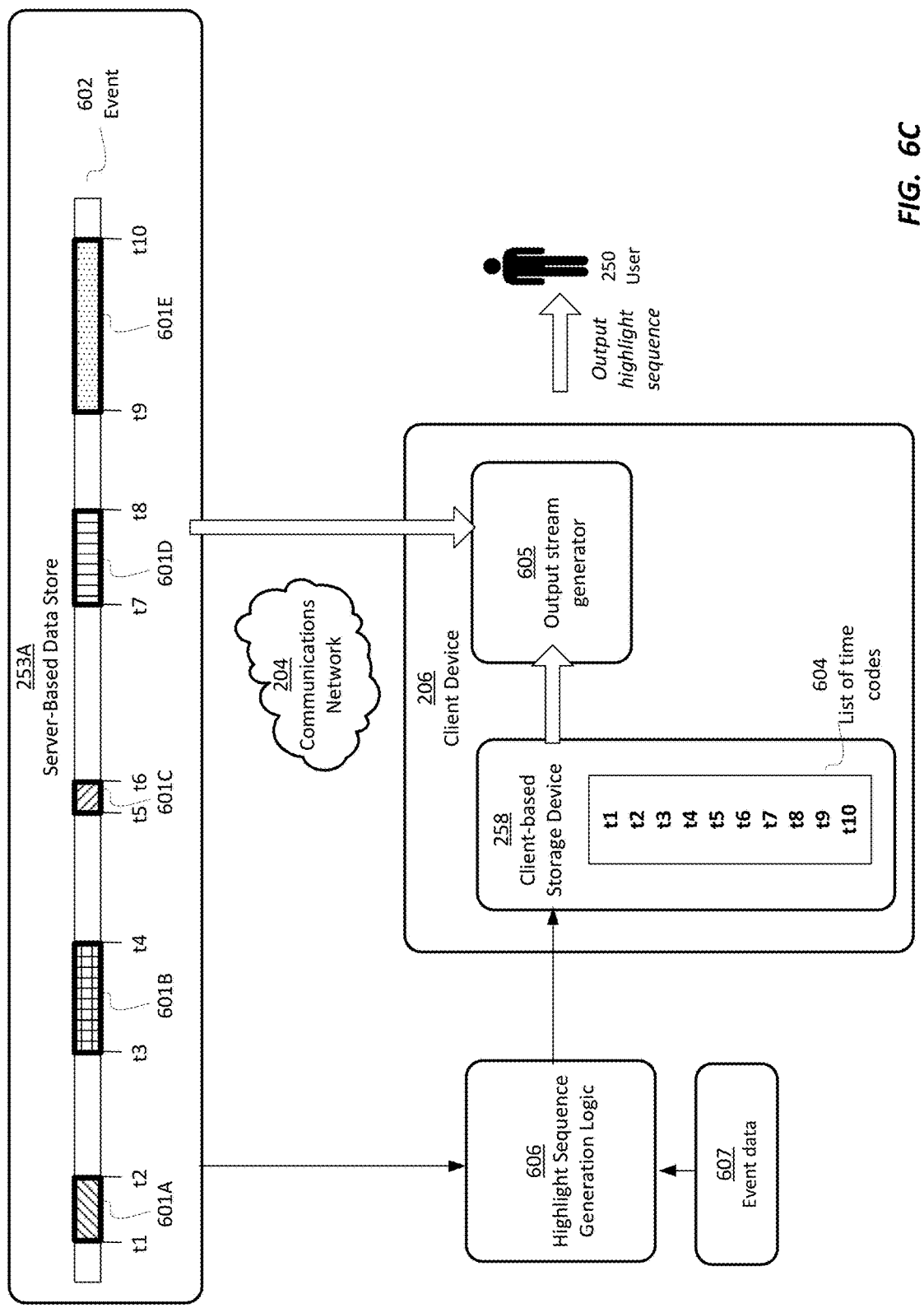
FIG. 6C is a block diagram depicting a conceptual architecture wherein highlight sequence generation logic generates time codes for generating a highlight sequence, and wherein such time codes are stored in a client-based storage device, according to one embodiment.

Referring now to FIG. 6C, there is shown a block diagram depicting another embodiment. This embodiment is similar to that of FIG. 6B, except that time codes 604 are stored in client-based storage device 258 instead of at server-based storage. Also, in FIG. 6C, output stream generator 605 is implemented at client device 206. Thus, upon request, output stream generator 605 retrieves time codes 604 from client-based storage device 258, obtains the identified highlights 601E of event 602 from server-based data store 253A (based on the time codes 604), and generates a highlight sequence for presentation to user 250.

Figure 6D:
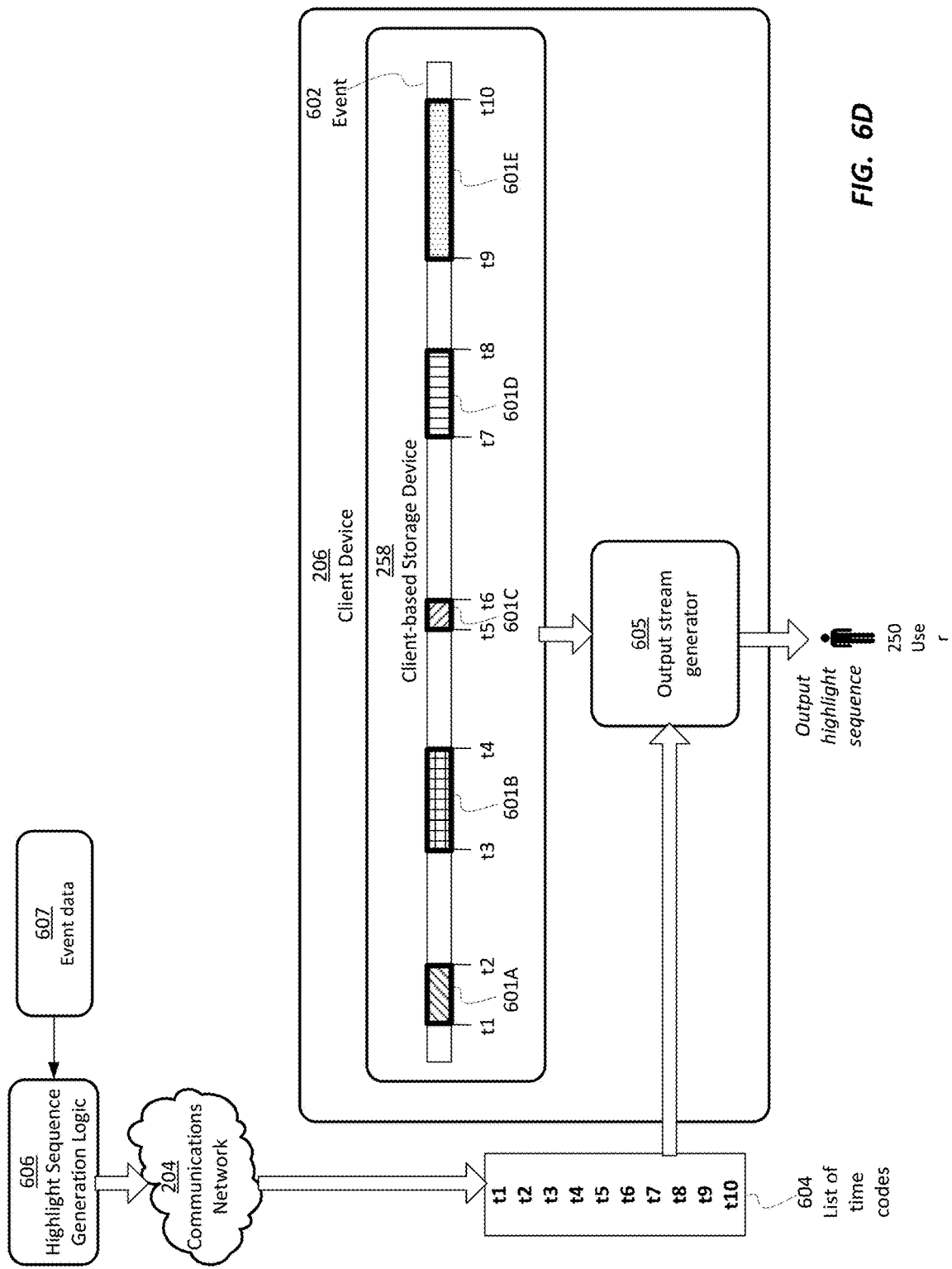
FIG. 6D is a block diagram depicting a conceptual architecture wherein an event is stored in a client-based storage device, and wherein server-based highlight sequence generation logic generates time codes for generating a highlight sequence.

Referring now to FIG. 6D, there is shown a block diagram depicting a conceptual architecture wherein event 602 is stored in a client-based storage device 258, and server-based highlight sequence generation logic 606 generates time codes 604 for generating a highlight sequence. For example, client-based storage device 258 may be a local digital video recorder (DVR) or set-top box on which event 602 has been recorded. Highlight sequence generation logic 606 uses event data 607 to generate list of time codes 604 for use in generating a highlight sequence. As before, highlight sequence generation logic 606 can take into account personal characteristics of user 250, as well as other factors, to generate a customized highlight sequence. Once the list of time codes 604 has been generated, output stream generator 605 at client device 206 can play back those portions of event 602 identified by the list of time codes 604, to form the highlight sequence.

Figure 6E:
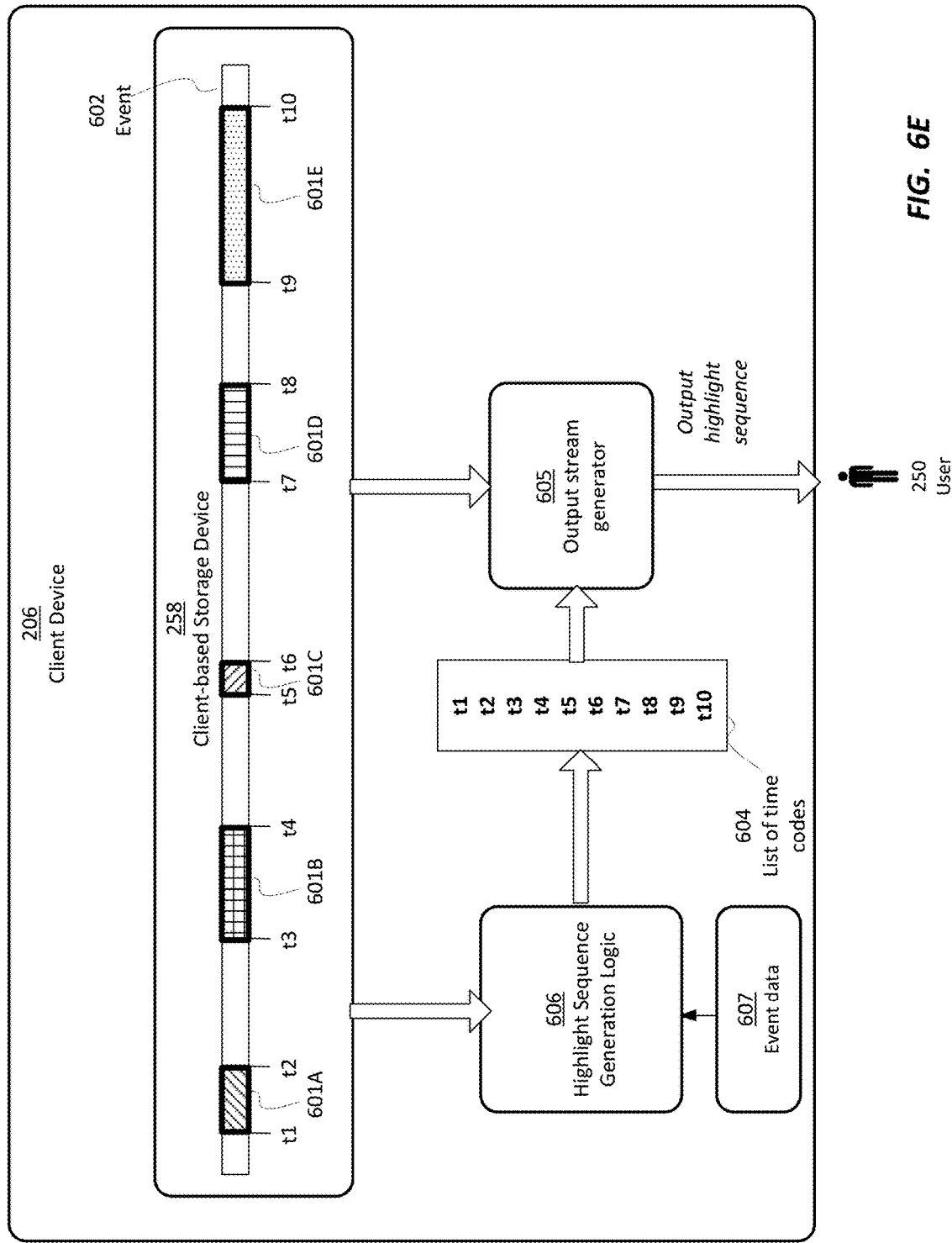
FIG. 6E is a block diagram depicting a conceptual architecture for a stand-alone embodiment, wherein an event is stored in a client-based storage device, and client-based highlight sequence generation logic generates time codes for generating a highlight sequence.

Referring now to FIG. 6E, there is shown a block diagram depicting a conceptual architecture for a stand-alone embodiment, wherein event storage, highlight sequence generation, time codes, and output stream generation all take place at a single device such as client device 206. Event 602 is stored in client-based storage device 258, and client-based highlight sequence generation logic 606 generates time codes 604 for generating a highlight sequence. Event data 607 can be sourced locally as shown, or can come from a remote source such as data provider(s) 222. For example, client-based storage device 258 may be a local DVR or set-top box on which event 602 has been recorded. Highlight sequence generation logic 606 uses event data 607 to generate list of time codes 604 for use in generating a highlight sequence. As before, highlight sequence generation logic 606 can take into account personal characteristics of user 250, as well as other factors, to generate a customized highlight sequence. Once the list of time codes 604 has been generated, output stream generator 605 at client device 206 can play back those portions of event 602 identified by the list of time codes 604, to form the highlight sequence. In at least one embodiment, output stream generator 605 includes segment transitions which can include contextual information about each highlight sequence; such transitions can include spoilers or can be spoiler-free, as described above. Segment transitions can include text, voice-overs, video, audio, graphics, and/ or any combination thereof. In another embodiment, transitions may be omitted or may be optional or skippable.

Method

Figure 4A:
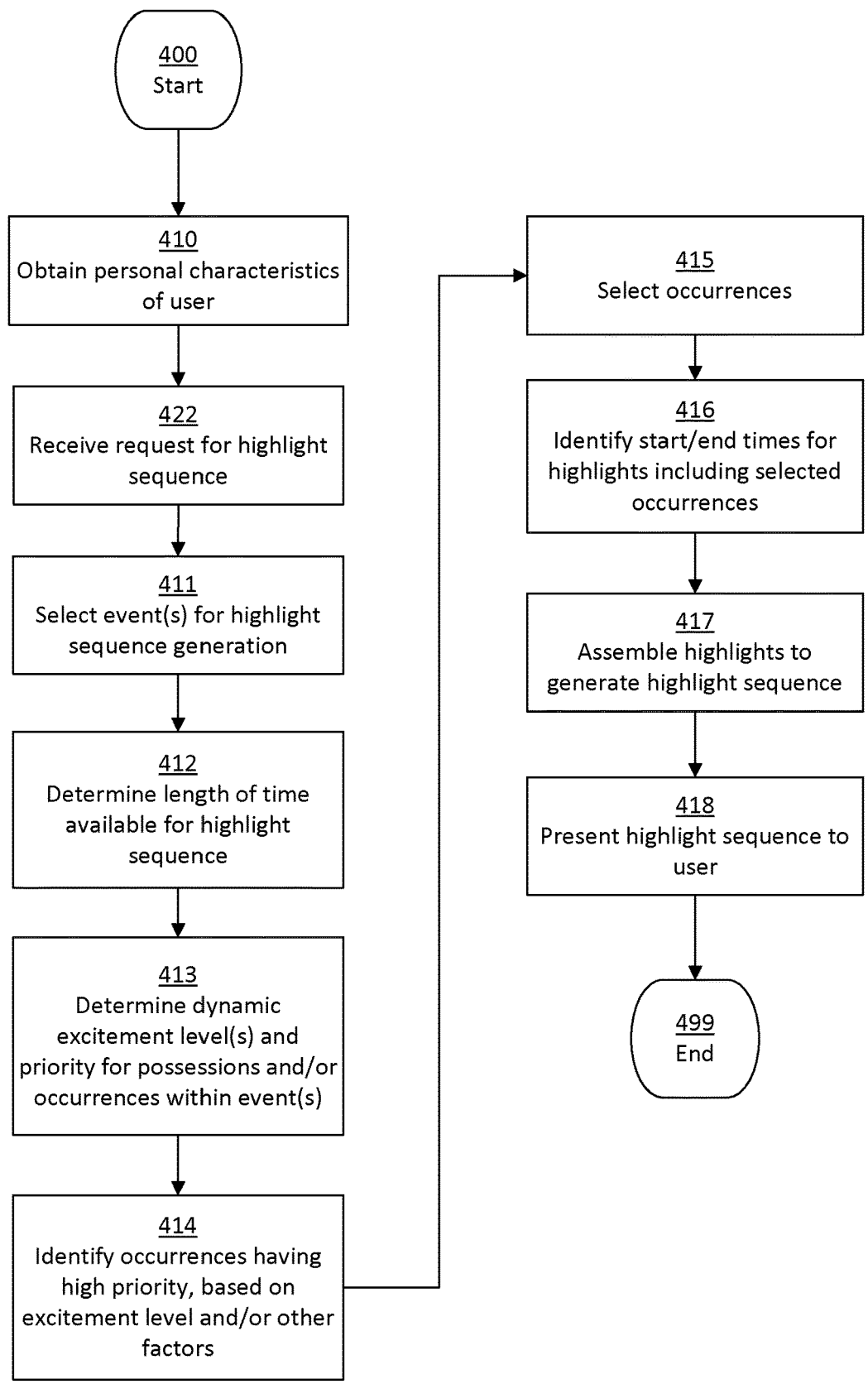
FIG. 4A is a flowchart depicting a method of generating a customized highlight sequence, according to one embodiment.
Figure 4B:
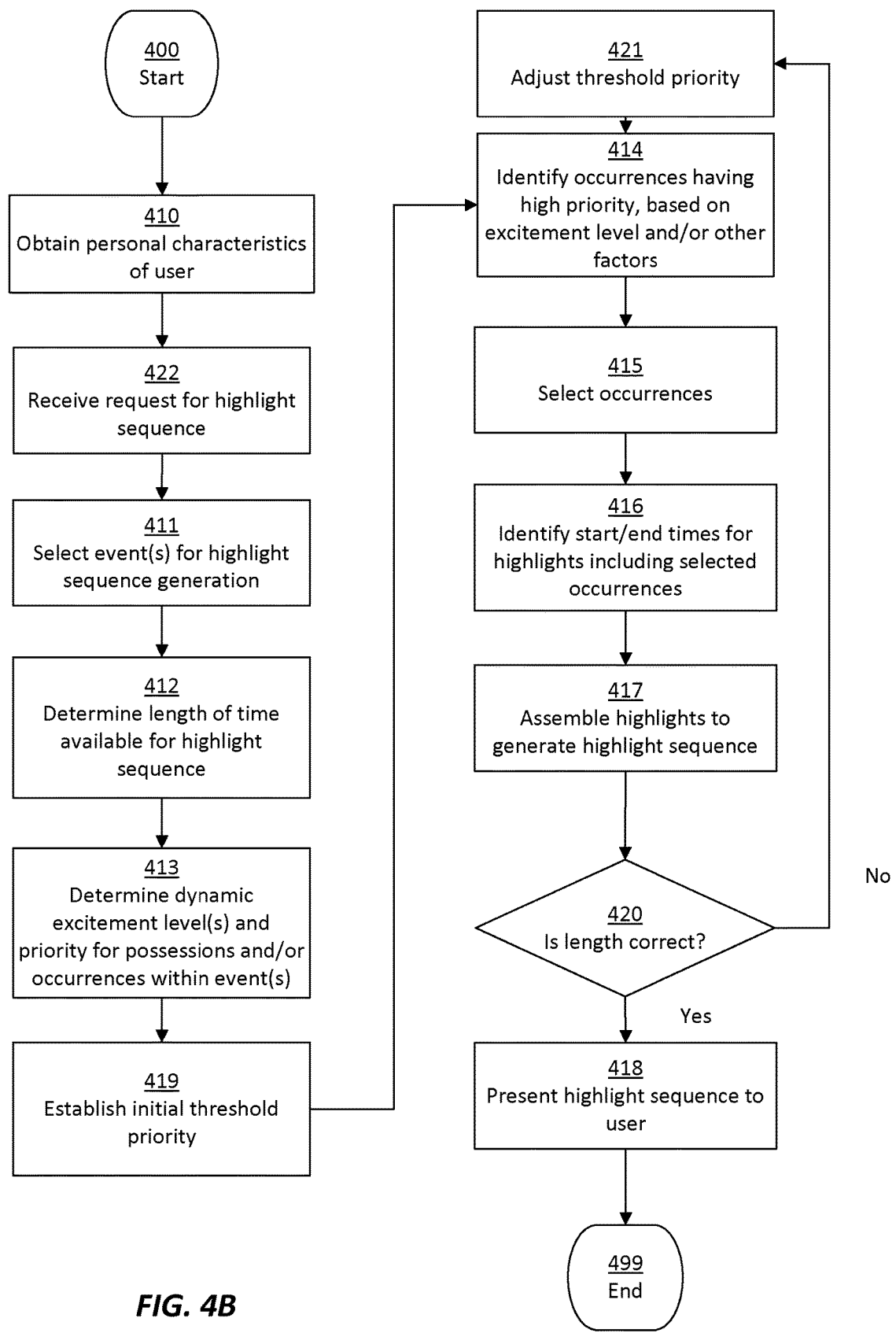
FIG. 4B is a flowchart depicting an iterative method of generating a customized highlight sequence, according to one embodiment.

Referring now to FIG. 4A, there is shown a flowchart depicting a method of generating a customized highlight sequence, according to one embodiment. Referring now to FIG. 4B, there is shown a flowchart depicting an iterative method of generating a customized highlight sequence, according to one embodiment. The steps shown in FIG. 4A or 4B can be implemented using any of the components shown in FIGS. 2A through 2E, either singly or in any combination. Alternatively, the steps shown in FIG. 4A or 4B can be implemented using any other suitable hardware architecture and/ or software architecture, either in a stand-alone or client/server environment, or in a distributed computing environment. The steps shown in FIG. 4A or 4B can be performed in any suitable order, and are not limited to the order depicted.

As shown in FIG. 4A, in at least one embodiment, personal characteristics of user 250 are obtained 410. Personal characteristics can be used to determine what teams, sports, leagues, players, games, television programs, online content streams, other relevant digital assets, etc. user 250 may be interested in, so as to provide a customized highlight sequence according to such interests. Personal characteristics can also take into account which programs user 250 has available to him or her; for example, the system may make a determination as to whether a user has subscribed to a particular premium channel that makes certain content available to him or her. Any suitable mechanism can be use for obtaining or inferring such personal characteristics, including for example:

Querying user 250 (e.g. by prompting the user to fill out a profile or online form to indicate teams, players, etc. of interest);

Tracking behavior, such as for example website visitation patterns, viewing patterns, purchasing patterns, movement/travel, communications (inbound and/or outbound), and/or the like;

Identifying team, player, and sport affinity from profiles of user 250, such as from a profile created and maintained by a social network or other third-party source;

Determining characteristics of friends or other entities with whom user 250 may have an affinity or relationship (e.g. determining that many of user's 250 Facebook friends are fans of a particular team);

Determining geographic location of user 250 by GPS tracking, IP address, or other location-tracking technology (making it more likely that user 250 is a fan of a local team);

Determining demographics of user 250.

In at least one embodiment, user 250 may be prompted to approve or decline such attempts to automatically obtain information about him or her.

User information may be obtained at any suitable time. If such information is obtained in advance (for example, when registering upon initial use of the system), such information can be stored, for example in user data 255 of server-based storage device 253. Alternatively, such information can be stored locally at client device 206. Stored user information can be updated as appropriate when new or additional information becomes available (for example, if additional tracking information is available, or if the user updates his or her profile). Alternatively, user information can be obtained at the time that user 250 requests a customized highlight sequence; in such a case, step 410 can take place after step 422. In at least one embodiment, no user information is collected, and the system generates the highlight sequence automatically without taking into account personal characteristics of the user.

A request is received 422 for a customized highlight sequence. In at least one embodiment, web server 202 receives the request, and passes the request to application server(s) 214 for processing, although in other embodiments, any suitable component can receive the request. The request can be made by user 250, for example at a website or by activating an app on device 206, or by any suitable means. The request may be for a highlight sequence for a particular event, or for any number of events. For example, in at least one embodiment, the described system generates a customized highlight sequence that includes a number of sporting events that took place on a given day; in such an embodiment, user 250 may request a "daily roundup" of sporting events that are determined to be of interest to him or her. Alternatively, user 250 may request a customized highlight sequence for a particular sport, such as baseball, causing the system to generate a customized highlight sequence for that sport, including those highlights of that sport that are likely to be of interest. Alternatively, user 250 may request a customized highlight sequence for a particular series, such as a playoff series, causing the system to generate a customized highlight sequence for that series, including those highlights of that series that are likely to be of interest. Alternatively, user 250 may request a customized highlight sequence for a single game, portion of a game, or other event. Alternatively, user 250 may request a customized highlight sequence for a single player, across a number of games, for a single game, or for a portion of a game. Highlights can also include non-event coverage for a given event, which may include, for example, pre-game, in-game, and post-game interviews, analysis, commentary, and/or the like. These segments can be appended to an overall highlight reel in much the same way that individual event segments from within a specific event are.

In another embodiment, wherein "push" technology is enabled, a customized highlight sequence can be provided to user 250 without user 250 having specifically requested it. For example, the system can be configured to make a customized highlight sequence available to user 250 on a periodic basis (such as daily, weekly, or according to some other schedule), or automatically at the conclusion of any game that user 250 is likely to be interested in, or in response to some other trigger event. The customized highlight sequence can be transmitted to user 250 for immediate viewing, or placed on device 206 for viewing at user's 250 convenience. Alternatively, an email message or other message can be transmitted to user 250 with a link that permits viewing of the highlight sequence. User 250 may sign up in advance for such customized highlight sequences to be provided; alternatively, in at least one embodiment, user 250 may be automatically enrolled based on a determination that user 250 would likely be interested in such customized highlight sequences (for example, based on viewing or purchasing behaviors). As with the on-request mechanisms described above, such "push"-based highlight sequences can be for a single event or any number of events.

The length of time available for the customized highlight sequence is determined 412. In at least one embodiment, user 250 can click on a button or link to select a length of time (as shown in FIGS. 1A through 1C), or can enter a value in a field. In another embodiment, a default length can be pre-selected. In yet another embodiment, an initial length can be selected, but the length can be adjusted based on the number of highlights of interest. For example, a threshold priority or excitement level can be determined: if an event has too few or too many highlights that reach the threshold to fill the allotted time, then the length of the highlight sequence can be adjusted downwards or upwards accordingly. In at least one embodiment, user 250 can be prompted to indicate whether the allotted time should be adjusted in this manner, or if the system should simply use the specified length for the customized highlight sequence, regardless of any threshold priority or excitement level.

Dynamic excitement level(s) for the selected event(s) is/are determined 413. In at least one embodiment, this step includes generating excitement levels for possessions and/or occurrences within the event(s), so that the excitement level rises and falls during the course of the event(s). In at least one additional embodiment, this step includes generating excitement levels for interviews, analysis, and/or commentary before, during, and after a given event. The dynamic excitement level(s) can be combined with an excitement level for the event as a whole, which may be based on a determination of how interested a particular user 250 would be in that event. The dynamic excitement level(s) can further be combined with an outline of a storyline or narrative that upwardly adjusts the potential interest level for those occurrences, analysis, and interviews that contribute best to the communicating the drama, intrigue, suspense, and excitement of the given event(s). The result of such combination, which may also take into account other available information about the possession or event, is a priority value. Additional details concerning generation of priority values are provided below.

Techniques for determining excitement levels are described in the above-cited related U.S. Utility Applications. In at least one embodiment, the excitement level(s) are determined based on personal characteristics of user 250 as obtained in step 410; for example, if user 250 is a fan of a particular team or player, occurrences involving scoring by that team or player may be deemed to have a higher excitement level for user 250 than occurrences involving scoring by the other team or other players. In embodiments where the customized highlight sequence includes highlights from multiple events, the selection of which events to draw highlights from may depend on whether user's 250 teams are involved in one event or another. Thus, step 413 may involve determining that the overall excitement level for an event may be higher if user 250 is a fan of one of the teams involved in the event.

Some events may have high levels of excitement even for non-fans of one of the teams. For example, if an event is a World Series game, the game may be of interest because of the importance of the game, even if user 250 is not a fan of either team competing in the event.

One skilled in the art will recognize that priority is merely one possible metric for determining which highlights should be included in a particular highlight sequence. Other metrics can also be used, either instead of or in addition to priority. In at least one embodiment, for example, excitement level alone is used, without taking into account other factors.

Occurrences having high priority (based on excitement level and/or other factors) are then identified 414 and selected 415. These steps may be performed by, for example, setting a threshold priority and determining which occurrences in the selected event(s) have a priority (for user 250) that meets or exceeds the threshold. The threshold priority can be selected in such a manner as to ensure that the generated highlight sequence is of the correct length. Alternatively, the steps may be performed by, for example, selecting a certain number of occurrences in the selected event(s) that have the highest priorities (for user 250).

Once occurrences have been selected 415, a determination is made 416 as to the start/end times for highlights that include the selected occurrences. For example, if an occurrence is a goal, the few seconds or minutes preceding the goal, wherein the play is set up, may be included in the highlight, and a few seconds or minutes of celebration after the goal may also be included. The determination as to when the highlight should stop and start can be made based on any suitable factors, including for example a determination of when the particular possession began, or when the play began, or the most recent clock stoppage, inning, at-bat, video analysis of camera cuts or angle changes, or any other suitable demarcation. A change in excitement level may be used to determine suitable start/end points for the highlight. In at least one embodiment, start/end times for highlights are chosen based on the duration of a possession, or on some portion of a possession. Where appropriate, an instant replay of the occurrence may be included, which may show a different angle than the primary angle, or may be in slow motion; such instant replay may be extracted from the event content in the same manner as primary content. In addition, where appropriate, independent analysis of a given occurrence or one or more relevant interviews of a player, coach, analyst, fan, etc. may be included.

In at least one embodiment, such demarcations of segments that include occurrences may be made in advance. For example, a video of a sporting event may be available, along with start/end times for various possessions, plays, occurrences, innings, time-outs, and the like. Such data can be available from any suitable source, such as for example data provider(s) 222. Such data can be generated manually or in an automated fashion. In at least one embodiment, data available from data provider(s) 222 can be supplemented with derived data. For example, if data from data provider(s) 222 includes raw data such as descriptions, event text, event identifiers, and the like, additional information can be derived by applying natural language processing or other automated techniques to event text and/or descriptions.

In at least one embodiment, in some situations, the system adjusts start/end times based on the available time for the customized highlight sequence. For example, if it is determined that a particular occurrence has very high priority, but the start/end times of the occurrence are too long to reasonably fit in the allotted time for the customized highlight sequence, a shorter excerpt of the event (still including the occurrence but having shorter duration than the specified start/end times indicate) may be included in the customized highlight sequence. Conversely, start/end times can be adjusted to lengthen the highlight segment if more time is needed to fill the allotted time for the customized highlight sequence.

Further details and variations concerning the determination of start/end times for segments are described below.

Highlights are then assembled 417 to generate the highlight sequence. In at least one embodiment, highlights are assembled in chronological order, although in certain situations it may be preferable to use a different order. The highlight sequence can be supplemented, for example with automatically or manually generated segment transition sequences, and/or with captions, titles, descriptions, voice-overs, contextual information, and/or the like, for example to indicate the score, possession, game situation, or the like. Such supplemental information can be visual, text-based, graphical, audio, spoken word, or any combination thereof. User 250 may have the option to turn on or off such supplemental information. Spoiler and spoiler-free supplemental information can be provided, giving user 250 a choice as to which he or she prefers.

The highlight sequence is presented 418 to user 250. In at least one embodiment, this is done by displaying a video (with accompanying audio) to user 250, containing the highlight sequence. In another embodiment, user 250 may be presented with a screen that allows him or her to navigate to individual highlights or to see the entire sequence via a "play all" function; examples of such screens are shown in FIGS. 1A, 1B, and 1C. Any other suitable explanatory or contextual information can be displayed on such screen, if desired, and user 250 can be given an option to turn on or off the display of such information. In at least one embodiment, as shown in FIGS. 1A, 1B, and 1C, user 250 can adjust the customized highlight sequence by clicking on links, for example to change the team affinity or length of the sequence or turn on or off spoilers; this can cause any or all of steps 412 through 418 to be repeated in response to such changes.

The method then ends 499.

In at least one embodiment, as depicted in FIG. 4B, an iterative process is performed. Steps 410, 422, 411, 412, and 413 are performed as described above. An initial threshold priority is established 419, and steps 414 through 417 are performed as described above. Once the highlight sequence has been assembled 417, its length is checked 420 to determine whether it comports with the length of time available for the highlight sequence, as determined in step 412. As described above, in certain situations, this determined length of time can be adjusted upwards or downwards. Also, in a least one embodiment, a tolerance may be established, wherein the assembled highlight sequence may deviate from the specified length by up to some predetermined amount.

If, despite any adjustments and/or tolerances, the generated highlight sequence is not of the correct length, the threshold priority is adjusted 421, and steps 414 through 417, along with step 420, are repeated with the new threshold priority. In this manner, an iterative process is performed and, if necessary, repeated until a highlight sequence of acceptable length has been assembled.

Additional details are provided below.

In at least one embodiment, the system provides a mechanism by which a single highlight segment is presented. For example, based on a determination of user interests, excitement levels, event analysis, and the like, the system determines a recommended excerpt of an event (or multiple events). The recommended excerpt may be defined, for example, in terms of start and end times (measured according to a video clock or other clock), or in terms of a start time and playing through to the end of the event. The system can then present the recommended excerpt to the user, either as a selectable clip or in connection with other excerpts for other events. In at least one embodiment, such a technique allows the system to present a particularly exciting or interesting set of occurrences that take place within an event.

Possessions

In at least one embodiment, step 416 of the above-described method involves identifying start/end times for highlights to be included in the highlight sequence. In at least one embodiment, an event is subdivided into a series of possessions, wherein the term "possession" is broadly defined to include some portion of an event. Each possession can be defined as beginning with a specific action within an event and ending with another specific action; this definition yields a start and end time for the possession. Demarcation of start/end times of possessions can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, possessions are clearly defined as corresponding to a half-inning. For other types of sporting events as well as for non-sporting events, the term "possession" may be somewhat of a misnomer, but is still used herein for illustrative purposes. One skilled in the art will recognize that the term is intended to apply broadly to any time-delimited portion of an event. Examples in a non-sporting context may include a chapter, scene, act, television segment, or the like. A possession can include any number of occurrences.

For illustrative purposes, the following are examples of ways in which a possession can be defined for various types of sporting events:

Baseball: Each half-inning is a possession.
Football: A sequence of downs where a single team is in offensive possession of the ball. A possession can end with a score, turnover, punt, end of half, end of regulation, or end of overtime.
Basketball: A sequence of plays where a single team is predominantly in offensive possession of the ball and the opposing team is not in possession of the ball. For clarity, this means that a jump ball (no possession) in the middle of a possession that is received by the offensive team keeps the prior possession going. In addition, the defensive team is not acknowledged to have possession of the ball until a first defensive team member controlling the ball has maintained control of the ball for at least two seconds (or some other period of time), or a second defensive player has received or played the ball in receipt from the first. In other words, a defensive player poking the ball away from an offensive player straight into another offensive player does not constitute a change of possession.
Hockey: Same as basketball, except with reference to a puck rather than a ball.
Soccer: Same as basketball.
Rugby: Same as basketball.
Cricket: Each over is a possession.
Tennis: Each game is a possession.
Golf: Each hole is a possession Identification of possessions can help construct a narrative in the context of generating a customized highlight sequence. Excitement levels and priorities can be determined for possessions, and such excitement levels and priorities (which may be customized for a particular user 250) can be used as a factor in selecting which occurrences or highlights to include in the customized highlight sequence. Thus, in an embodiment where excitement levels can be determined for entire events (such as games), possessions, and/or individual occurrences, and wherein such excitement levels can be customized for a particular user 250), a more coherent narrative that is more likely to be interesting to user 250 can be constructed.

For example, in some situations, a less exciting occurrence may be selected for inclusion because it is part of a possession that is judged, on the whole, to have a high level of excitement. Such a methodology facilitates improved narrative cohesion, for example by showing a number of plays (occurrences) that led up to an exciting scoring opportunity at the end of a possession. The individual plays may not individually have high excitement levels, but they are included because they lead up to an exciting conclusion of the possession. In at least one embodiment, the priority value takes into account such situations, as described in more detail below.

In at least one embodiment, possessions are used as the time unit by which excitement levels and priorities are assessed and compared. For example, step 414 described above, in which occurrences having high priority are identified, can be performed by ranking possessions to identify those possessions having the highest priority; then selecting individual occurrences within those identified possessions, based on priority of the occurrences. Other techniques can be used for combining priority for possessions with priority for occurrences.

Referring now to FIG. 5A, there is shown an example of a table 500 including information for a number of possessions during an event in chronological order, in this case a football game. Table 500 is an example of the output of step 413 according to at least one embodiment, and includes the following columns:

Drive ID 501: an identifier of each possession, in this case corresponding to a drive of the football game.
Team in possession 502: an indication of which team has possession for this drive.
Novelty drive 503: a metric that indicates how interesting or novel the drive was.
EQ final 504: the excitement level for the possession. In this example, the excitement level is given as a score from 0 to 100. The excitement level may or may not be customized to a particular user 250.
Delta EQ 505: the change in excitement level from the previous possession.
Delta comeback 506: a metric that indicates the likelihood that a comeback is in progress and the magnitude of said comeback.
Nail biter 507: a metric that indicates the tension level in the game, based for example on how close the score is, how close to the end of the game we are, excitement level, and/or the like.
Score 508: Current score of the game during this possession.
Score change 509: Change in score since the previous possession.
Lead change 510: An annotation indicating that the lead changed during this possession.
Possession priority 511: An overall indication of how important this possession is to the over-arching narrative of the event. In at least one embodiment, possession priority 511 is derived from other values for this possession. In at least one embodiment, possession priority 511 is used in determining which highlight segments to include in a customized highlight sequence.

Data such as that shown in FIG. 5A can be obtained from any suitable source. In at least one embodiment, such data is obtained from provider(s) 222 of real-time sports information such as STATS™, OPTA™ and Sports Direct™. Some or all of the data shown in FIG. 5A can be derived from such data obtained from provider(s) 222.

Excitement Level

Any suitable mechanism can be used for determining excitement level for an event, possession, or occurrence. In at least one embodiment, techniques as described in the above-cited related U.S. Utility application Ser. No. 13/601, 915 for "Generating Excitement Levels for Live Performances," filed Aug. 31, 2012, are used. In general, in order to customize the generation of highlight sequences for a user 250, the described system determines excitement levels based on particular characteristics of that user 250.

In at least one embodiment, various factors are considered when determining excitement level. Such factors, may include, for example:

Pace of the event: for example, this may include a determination of the energy level of the play in a sporting event.
Parity: A measure of how close the teams are. Overall score of the game may be taken into account, as well as time of possession, yards/ down, and the like.

Novelty: a measure of how unusual an occurrence, possession or game was, and/or whether any particularly interesting events took place during the possession or game.

Momentum: an indication as to whether a shift in balance or control has taken place as a result of a specific occurrence or during the possession or game.

Context: takes into account factors such as whether the teams are rivals, possible impact on playoffs or standing, series score for a playoff game, leaderboard, and the like.

Social: a measure of activity in social networks concerning the game, for example by detecting spikes in Twitter activity or the like.

Any or all of the above factors can be used, singly or in any suitable combination, to determine excitement level for an occurrence, possession, or overall event.

One skilled in the art will recognize that there are many ways to calculate priorities. Thus, the particular methodologies described below are intended to be illustrative, but not limiting of scope. Additional methodologies can be derived to suit different situations or individual preference profiles.

Possession Priority

Possession priority refers to a priority, or rank, for a given possession within an event such as a game. In at least one embodiment, this priority can be generated from the perspective of a neutral fan, but can be adjusted based on user affinity to one or other of the teams involved. The following is an example of a possession priority calculation for football:

Possession priority is the sum of a number of individual bonus elements that are set by specific possession stats calculated by the main game excitement algorithms:

| Stat | Description | Possession Bonus |
|---|---|---|
| novelty_drive | novelty of the current drive | +1 if novelty_drive >=5, +2 if novelty_drive >=8 |
| EQ_neutral | current game excitement rating | +1 if game EQ >=75, +2 if EQ >=90, +3 if EQ >=99 |
| abs(delta EQ) | change in excitement from prior drive | +1 for delta EQ >=7, +2 if delta EQ >=10 |
| delta comeback | change in comeback novelty | +1 for a comeback >=0.05, +2 if comeback >=0.10 |
| nail_biter | close game near end of regulation | +2 for any nail_biter |
| lead change/new tie | | +1 for any lead change or new tie |
| abs(score change) | | +1 for any field goal, +2 for all other score changes |

Priority

In various embodiments, priority can be determined for possessions and/or occurrences (such as plays), and can be used by components of the described system to determine which highlights to include in a customized highlight sequence. Any suitable and available data can be used for deriving priority, including for example data available from data provider(s) 222.

At a high level, priorities for occurrences are a function of the novelty of a specific occurrence, the novelty and excitement level of the possession in which the occurrence took place, the excitement level of the event (for example, from the perspective of a neutral fan) at the time that the occurrence took place, and the contribution of the specific occurrence to the overall narrative of the event.

Priority for possessions and/or occurrences can be modified by the overall excitement level of the event as a whole. For example, in the context of sporting events, priority for possessions and/or occurrences can be modified by the excitement level of the game at the time that the occurrences took place. Such modifications can take into account a particular team or player as well as an affinity for that team or player on the part of user 250. For specific teams, priority can be modified based on the effect of the occurrence or possession on that team. For specific players, priority can be modified by the contribution of the player to a particular occurrence.

In some embodiments, other types of priority can also be used, including team priority, player priority, and/or fantasy priority. Each of these different categories of priorities is discussed in turn.

Thus, in this example, possession priority is calculated as:

possession_priority=Sum(Possession Bonus)

Referring again to FIG. 5A, there is shown table 500 which includes these elements for various possessions in columns 504 through 510, and also shows derived possession priority in column 511.

In at least one embodiment, possession priority can be used for generating customized highlight sequences, without necessarily computing occurrence priority (see below). For example, a customized highlight sequence can be generated by applying one or more of the following parameters:

all occurrences in all possessions where Possession Priority>Possession Priority Threshold all occurrences in all possessions where the aggregate time of these plays is<=Time Allowance all occurrences with an Occurrence Novelty >Novelty Threshold where Possession Priority>Possession Priority Threshold all occurrences with an Occurrence Novelty>Novelty Threshold where the aggregate time of these occurrences is equal to a given Time Allowance Occurrence Priority (or Play Priority)

Occurrence priority refers to a priority, or rank, for a given occurrence, such as a play within a sporting event. In at least one embodiment, this priority can be generated from the perspective of a neutral fan. In at least one embodiment, occurrence priority is generated for the following:

those occurrences that take place within possessions that exceed a threshold possession priority; and those occurrences that have a novelty value exceeding a predetermined novelty threshold, regardless of the possession priority.

In at least one embodiment, if an occurrence qualifies in both categories, the highlight bonus values assigned to this individual occurrence within each qualifying category are added together to produce an aggregate bonus value for the occurrence. This aggregate bonus value is then multiplied by the current excitement rating (EQ) of the game to generate an occurrence priority value. This particular calculation is merely exemplary; one skilled in the art will recognize that occurrence priority can be calculated in other ways.

In at least one embodiment, the bonus value for each occurrence is the sum of the occurrence's calculated novelty value, plus any bonus modifier an occurrence might receive from being within a key possession. For occurrences that are not in a key possession, a bonus value is not calculated unless the individual occurrence novelty is greater than or equal to 2.

In summary:
Bonus Modifier for occurrences within possessions where possession_priority>=4 (Key Possessions):
Bonus Modifier=+4 for the scoring occurrence in drives that result in the last lead change or the game winning score.
Bonus Modifier=+2 for all other occurrences in drives that result in either the last lead change or the game winning score.
Bonus Modifier=+1 for occurrences in all other key possessions.

Thus, in this example, occurrence priority (also referred to as play priority) is calculated as:

play_priority=(Bonus Value+Bonus Modifier)*$EQ\_neutral$

In at least one embodiment, occurrence priority can be used for generating customized highlight sequences, once occurrence priority has been calculated. For example, a customized highlight sequence can be generated by applying one or more of the following parameters:
  all occurrences where Occurrence Priority>Occurrence Priority Threshold
  all occurrences with a Occurrence Priority>Occurrence Priority Threshold where Possession Priority>Priority Threshold
  all occurrences with a Occurrence Priority>Occurrence Priority Threshold where the aggregate time of these occurrences is equal to a given Time Allowance Team Priority Team priority refers to a priority, or rank, for a given occurrence or possession within an event from the perspective of a fan of one or the other teams playing. In other words, the priority takes into account user affinity to one or other of the teams involved. In at least one embodiment, team priority is calculated in the same manner as occurrence priority or possession priority, except that a fan perspective excitement rating (referred to as EQ_away or EQ_home) is used to compute occurrence priority and possession priority, rather than neutral perspective statistic, EQ_neutral. Further adjustments can also be made; for example, in at least one embodiment, a +2 Possession_Bonus is added to any score by the fan's favorite team.

The following is an example of a team possession priority calculation for football:

Team possession priority is the sum of a number of individual bonus elements that are set by specific possession stats calculated by the main game excitement algorithms:

| Stat | Description | Possession Bonus |
|---|---|---|
| novelty_drive | novelty of the current drive | +1 if novelty_drive >=5, +2 if novelty_drive >=8 |
| EQ_team | current game excitement rating from perspective of _away or _home team | +1 if team EQ >=75, +2 if EQ >=90, +3 if EQ >=99 |
| abs(delta EQ_team) | change in excitement from prior drive | +1 for delta EQ >=7, +2 if delta EQ >=10 |
| delta comeback | change in comeback novelty | +1 for a comeback >=0.05, +2 if comeback >=0.10 |
| nail_biter | close game near end of regulation | +2 for any nail_biter |
| lead change/new tie | | +1 for any lead change or new tie |
| abs(score change) | | +1 for any field goal and +2 for all other score changes by opposing team; +3 for any field goal and +4 for all other score changes by favorite team |

Thus, in this example, team possession priority is calculated as:

possession_priority=Sum(Possession Bonus)

In at least one embodiment, team occurrence priority is generated for the following:
  those occurrences that take place within possessions that exceed a threshold team possession priority; and
  those occurrences that have a team novelty value exceeding a predetermined novelty threshold, regardless of the possession priority.

In at least one embodiment, if an occurrence qualifies in both categories, the highlight bonus values assigned to this individual occurrence within each qualifying category are added together to produce an aggregate bonus value for the occurrence. This aggregate bonus value is then multiplied by the current excitement rating (EQ) of the game to generate a team occurrence priority value. This particular calculation is merely exemplary; one skilled in the art will recognize that team occurrence priority can be calculated in other ways.

In at least one embodiment, the bonus value for each occurrence is the sum of the occurrence's calculated novelty value, plus any bonus modifier an occurrence might receive from being within a key possession (team_possession_priority>=4). For occurrences that are not in a key possession, a bonus value is not calculated unless the individual occurrence novelty is greater than or equal to 2.

In summary:
Bonus Modifier for occurrences within possessions where team_possession_priority>=4 (Key Possessions):
  Bonus Modifier=+4 for the scoring occurrence in drives that result in the last lead change or the game winning score.

Bonus Modifier=+2 for all other occurrences in drives that result in either the last lead change or the game winning score.

Bonus Modifier=+2 for key possessions that result in a favorite team score

Bonus Modifier=+1 for occurrences in all other key possessions.

Thus, in this example, occurrence priority (also referred to as play priority) is calculated as:

$$team\_play\_priority = (Bonus\ Value + Bonus\ Modifier) * EQ\_team$$

In at least one embodiment, team occurrence priority can be used for generating customized highlight sequences based on team occurrences, once occurrence priority has been calculated. For example, a customized highlight sequence based on specific team occurrence priorities can be generated by applying one or more of the following parameters:

all occurrences where Team Occurrence Priority>Occurrence Priority Threshold all occurrences with a Team Occurrence Priority>Occurrence Priority Threshold where Possession Priority>Priority Threshold all occurrences with a Team Occurrence Priority>Occurrence Priority Threshold where the aggregate time of these occurrences is equal to a given Time Allowance Player Priority Player priority refers to a priority, or rank, for a given occurrence or possession within an event involving a specific player from the perspective of a fan of the player's team or a neutral fan, i.e., a user who is a fan of a specific player but not the team on which the player plays. In other words, the priority can take into account user affinity for the player's team, if that preference happens to be relevant. In at least one embodiment, player priority is calculated as the product of player novelty (novelty_player_offense or novelty_player_defense) and the current team excitement rating (EQ_away, EQ_home, or EQ_neutral), as follows:

$$player\_priority = novelty\_player * EQ\_team$$

In at least one embodiment, player priority can be used for generating customized highlight sequences, once player priority has been calculated. For example, a customized highlight sequence based on specific player priorities can be generated by applying one or more of the following parameters:

all occurrences involving specific players of interest all occurrences where Player Priority>Player Priority Threshold all occurrences with a Player Priority>Player Priority Threshold where the aggregate time of these occurrences is equal to a given Time Allowance Fantasy Priority Fantasy priority refers to a priority, or rank, for a given occurrence or possession within an event involving a specific fantasy player (i.e. a player belong to a user's team in a fantasy league), from the perspective of a fan of the player's team or a neutral fan. In at least one embodiment, fantasy priority is calculated as the product of abs(player priority) and occurrence priority (i.e. play priority) divided by 100, as follows:

$$fantasy\_priority = [abs(player\_priority) * play\_priority] / 100.0$$

In at least one embodiment, fantasy priority can be used for generating customized highlight sequences for a specific roster of fantasy players, once fantasy priority has been calculated. For example, a customized highlight sequence based on specific fantasy priorities can be generated by applying one or more of the following parameters:

all occurrences involving fantasy players on a given roster all occurrences where Fantasy Priority>Fantasy Priority Threshold all occurrences with a Fantasy Priority>Fantasy Priority Threshold where the aggregate time of these occurrences is equal to a given Time Allowance Similar rules can be applied to fantasy players on the opponent's team roster to create a fantasy highlight reel that includes occurrences from both teams and yields a highlight reel of a virtual fantasy game.

In various embodiments, any or all of the above types of priority can be used to determine which highlights to include in a highlight sequence. FIGS. 5B through 5F provide various examples of tables resulting from filtering and ranking possessions and occurrences in various ways. These examples refer to the same event (game) that was summarized by the table 500 in FIG. 5A.

Referring now to FIG. 5B, there is shown an example of a table 520 including information for those possessions where the possession priority is greater than or equal to 4. This example illustrates the process of filtering possessions to only include those of high priority.

Figure 5C:
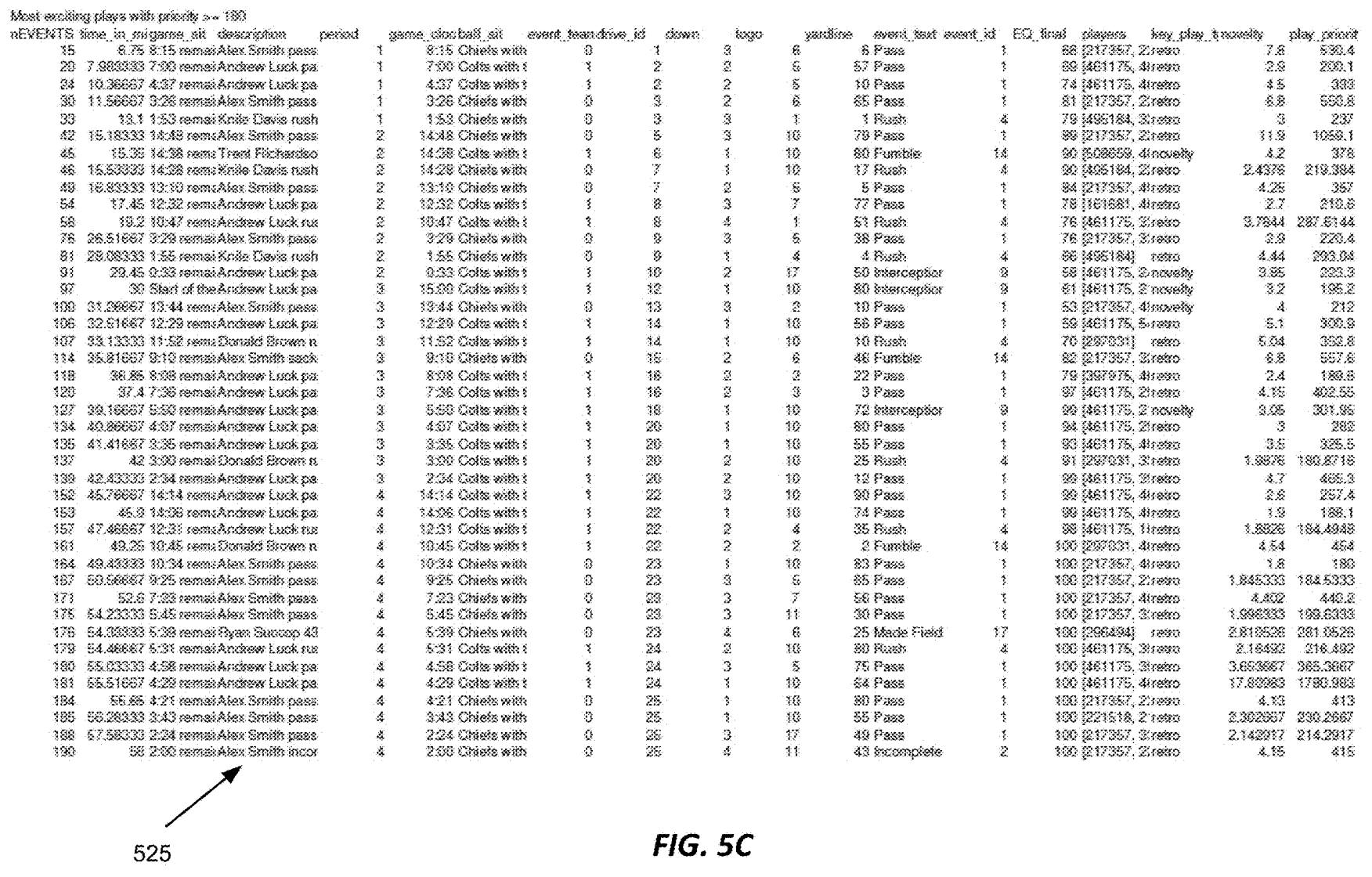

Referring now to FIG. 5C, there is shown an example of a table 525 including information for those occurrences (plays) where the occurrence priority is greater than or equal to 180. This example illustrates the process of filtering occurrences to only include those of high priority.

Figure 5D:
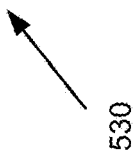
FIG. 5D shows an example of a table including information for those occurrences (plays) deemed to be the 10 most exciting occurrences in a game, based on occurrence (play) priority, according to one embodiment.
Figure 5E:
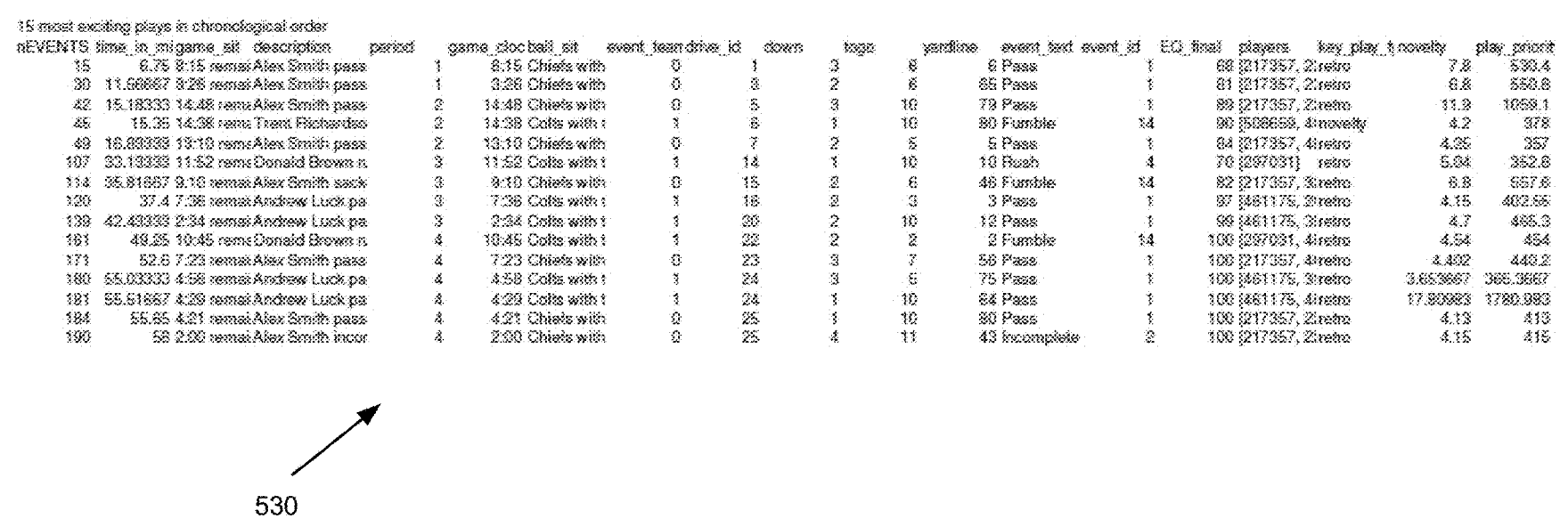
Figure 5F:
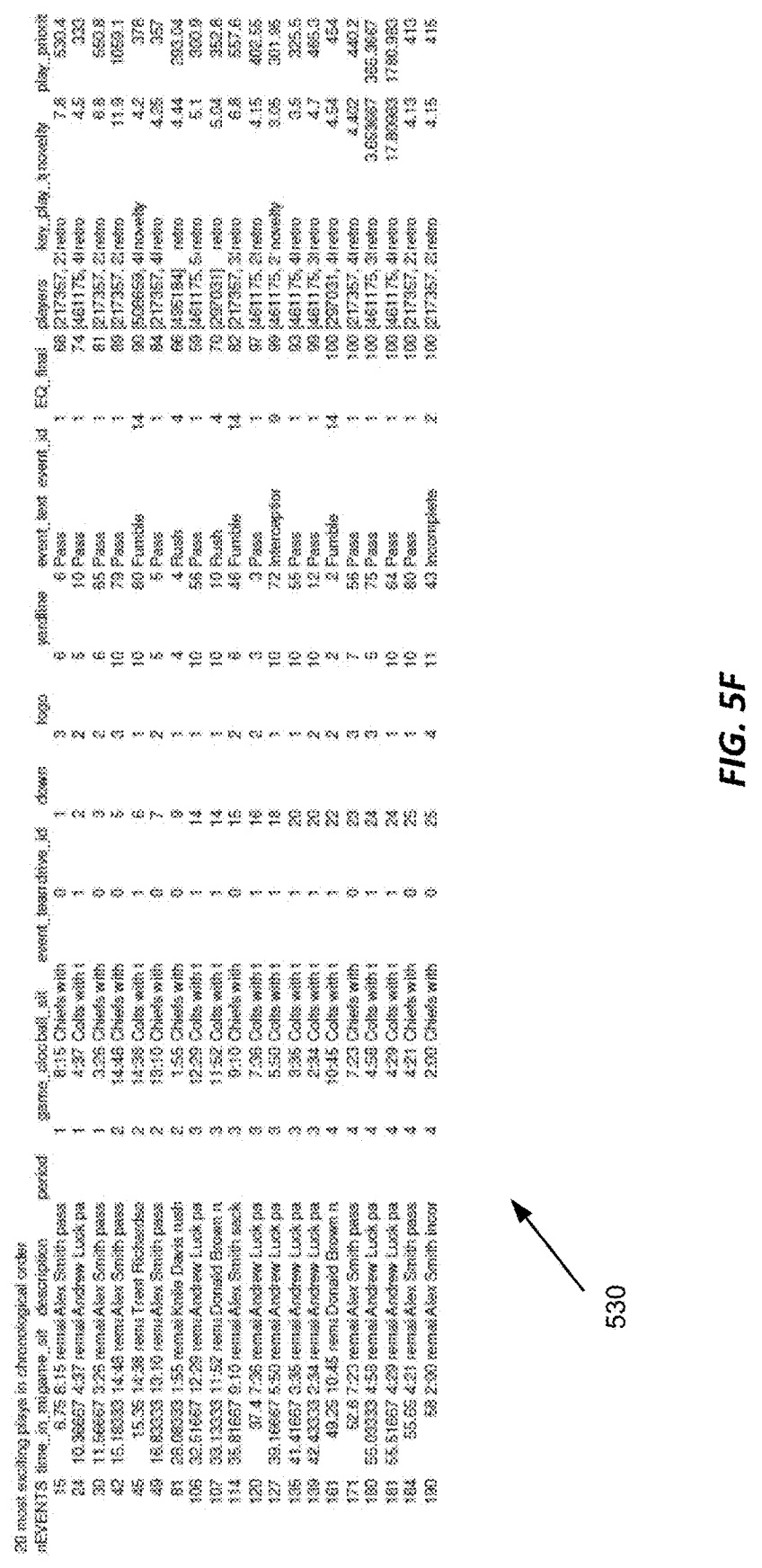

In at least one embodiment, rather than using a threshold priority to determine which highlights to include, the system may select the N most exciting occurrences (plays) for inclusion in a highlight sequence, based on occurrence priority, possession priority, or any other priority. Referring now to FIGS. 5D, 5E, and 5F there are shown examples of tables 530 including information for those occurrences (plays) deemed to be the 10, 15, or 20 most exciting occurrences in the game, based on occurrence (play) priority.

Figure 5H:
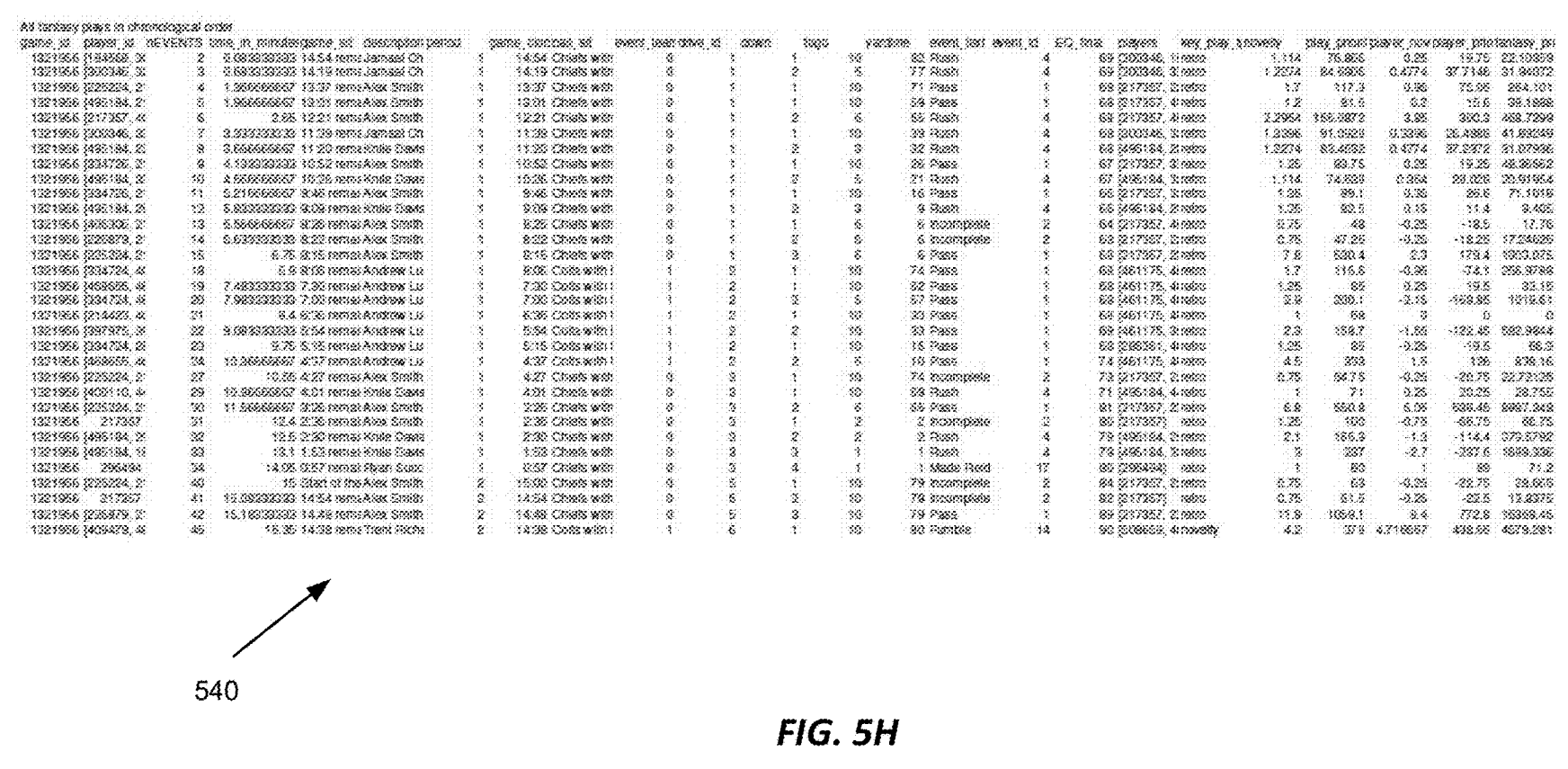
Figure 5J:
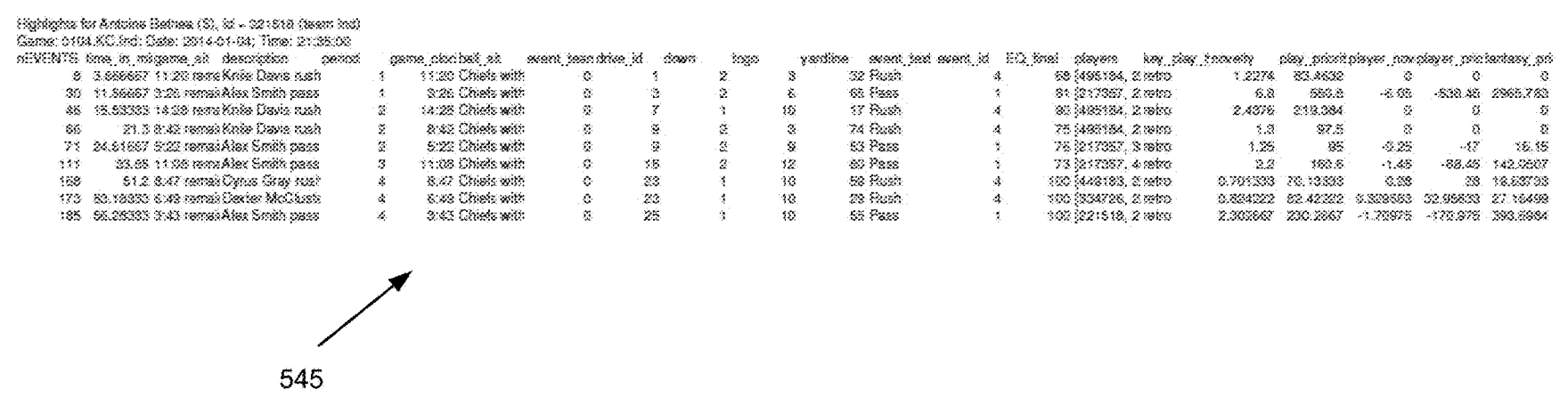
Figure 5K:
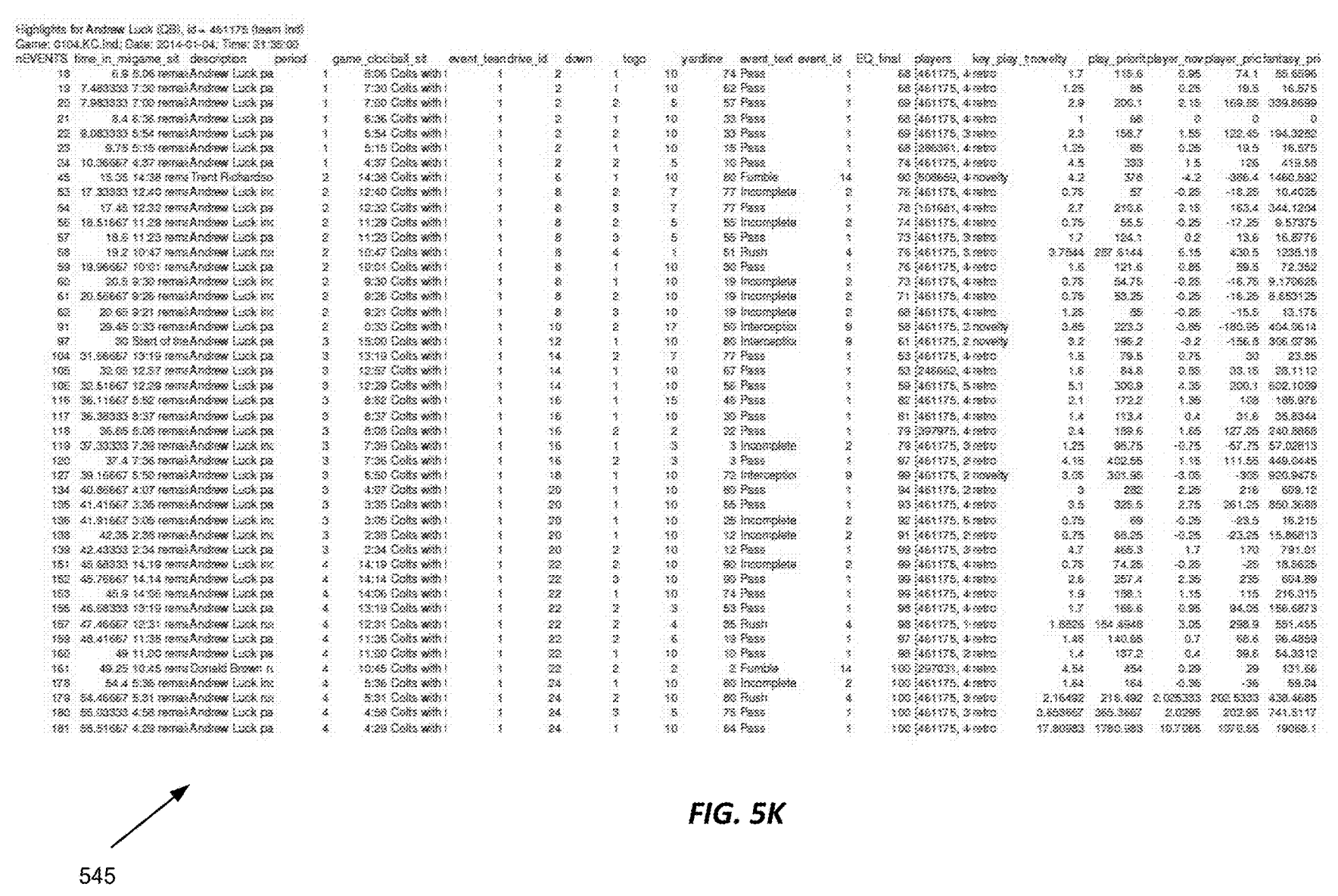

As described above, the system can use fantasy priority to determine which highlights to include. A fantasy roster can be consulted or generated, indicating which players are included in a user's fantasy league team. An example of an excerpt of such a roster is shown in table 535 of FIG. 5G. Referring now to FIG. 5H, there is shown an example of a table 540 including information for occurrences (plays) involving players on the fantasy roster; fantasy priority is included in table 540, allowing occurrences to be filtered accordingly. Tables can also be constructed for individual players on the fantasy roster, as shown in the example tables 545 of FIGS. 5I, 5J, and 5K.

Figure 5L:
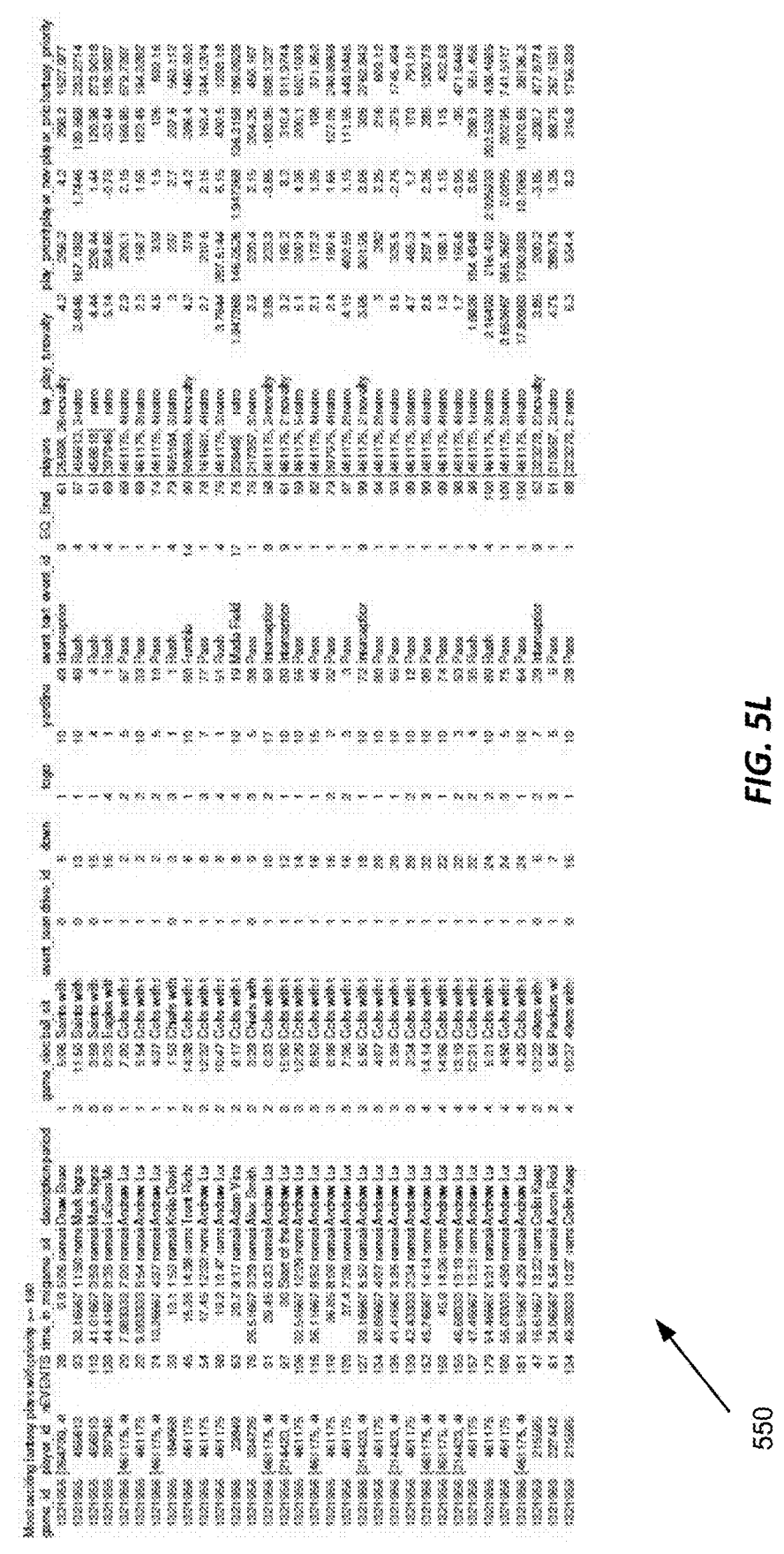

Referring now to FIG. 5L, there is shown an example of a table 550 including information for those occurrences (plays) involving players on a user's fantasy roster where the fantasy priority is greater than or equal to 180, according to one embodiment. This example illustrates the process of filtering occurrences to only include those of high fantasy priority. Although the occurrences on table 550 involve multiple players on multiple actual teams, they can be assembled into a single highlight sequence customized to a particular user 250 who has a fantasy team including these players.

Narrative and Theme

In at least one embodiment, the system constructs the customized highlight sequence so that it provides a cohesive narrative depicting an event (or set of events). The narrative provides a structural framework for presenting highlights in a manner that navigates from a beginning to a middle to an end. For example, the narrative can follow a journey from introduction to storyline development to suspenseful challenge(s) to challenge resolution(s) to closure with any number of "surprising developments" layered throughout. Such narrative can be automatically or manually constructed, and can be based, for example, on availability of particular highlights, external factors, historical context, and/or the like. Individual highlights are automatically selected so that they support the narrative; in at least one embodiment, a determination as to whether to include a particular highlight is based, at least in part, on its ability to support the narrative.

In at least one embodiment, the system identifies those occurrences, such as possessions or plays, that precede an exciting occurrence or possession and are part of the set-up to that exciting occurrence or possession. An example is a baseball player who gets walked immediately before a home run. These precedent plays may not necessarily be exciting in-and-of-themselves, but they may be included in the customized highlight sequence based on a determination that they contribute to the narrative of the overall sporting event, and in particular are precursors to an exciting event such as a home run. Accordingly, in at least one embodiment, the system described herein takes into account such narrative contributions by making associations between exciting occurrences and those occurrences that precede the exciting occurrence and are part of the narrative that leads up to the exciting occurrence.

Various techniques can be used for improving and enhancing the narrative quality of the customized highlight sequence. One approach is to take into account a notion of theme when constructing the highlight sequence. For example, a theme may emerge when a particular type of play appears several times within a single sporting event, or if a player has a particularly good game, or if some unusual event or coincidence occurs. Such identification of a theme can affect the selection of highlights for the highlight sequence: for example, if a player has a particularly good game, the highlight sequence may be constructed so that it includes several occurrences (plays) involving that player. In at least one embodiment, this is accomplished by adjusting priorities for occurrences that reinforce the identified theme.

In at least one embodiment, theme can be identified in an automated way, by analyzing statistics associated with the event. Alternatively, theme can be specified manually. Unusual or remarkable patterns can be identified by virtue of their divergence from normally expected statistical distributions. Once a theme has been identified, priorities are automatically adjusted to emphasize the theme.

In at least one embodiment, the determination as to whether an identifiable theme should be used in constructing a highlight sequence can depend on any of several factors. For example, if the specified allotted time for the highlight sequence is insufficient to effectively construct a narrative including a theme, the theme can be abandoned for that highlight sequence.

Game Clock and Video Clock

As described above, in at least one embodiment, start/end times for highlight segments can be defined in terms of elapsed time since the beginning of an event. Such a measure is referred to herein as a "video clock", although it can also be referred to as a "real-time clock". Such video clock, which measures actual elapsed time since the beginning of an event, is in contrast to a game clock. Many sports (such as basketball, hockey, or football) have a game clock that indicates the time remaining in the game, but such a game clock does not correspond to real elapsed time because of stoppages, time-outs, intermissions, and/or the like. In other sports, such as baseball, there is no game clock.

In many situations, event data from sources such as data provider(s) 222 is specified in terms of game time (for sports such as basketball, hockey, soccer, or football), or in terms of inning (for baseball). It is beneficial, therefore, to develop a correlation between such identifications of game time or inning with actual elapsed time, so that start/end times for highlight segments can accurately be determined. Any of a number of techniques can be used for determining such correlations, including the following, either singly or in any combination:

In some situations, data provider(s) 222 may provide a time-stamp indicating actual elapsed time for each occurrence.

Video analysis and/or optical character recognition can be applied to the real-time or recorded video or digital stream of an event, particularly if an on-screen game clock is present. The on-screen clock can thus be reconciled with elapsed time.

Audio or closed-caption analysis can be applied to the real-time or recorded video or digital stream of an event, leveraging natural language processing to take cues from the spoken word to synchronize the game clock with the video clock.

Detection of when actual play is taking place as opposed to a stoppage, for example by analysis to detect motion on the playing surface, commercials or time-outs, or the like.

Determination of elapsed time based on when data became available from data provider(s) 222, on the assumption that data becomes available just after each occurrence takes place. If there is a delay in receiving such data, but such delay is consistent, then a determination of elapsed time in this manner can still be relatively accurate.

Real-Time Catch-up

In at least one embodiment, the described system provides a mechanism by which a user can watch highlights of an event while the event is still in progress. For example, a user may be interested in watching a sporting event that is currently in progress. However, instead of watching the event live, the user may wish to start watching highlights of the first part of the event, and then catch up to the live event, so that he or she can watch the latter part of the event live. This format allows the user to view important occurrences from the first part of the event, which he or she would otherwise have missed had he or she merely started watching live.

In at least one embodiment, the described system provides an option for real-time catch-up viewing, wherein a highlight sequence is presented for a first part of an event, transitioning to a full (unexpurgated) version from a certain point until the end of the event. The user selects an event to watch. If the event is currently in progress, the system generates and displays a customized highlight sequence for the event up to that point in time, using any or all of the techniques described above. Upon conclusion of the highlight sequence, a transition may be presented and the system can then begin showing the unedited event from that point on, either live or delayed/recorded.

As described above, the user can be prompted to specify a total length of time for the highlight sequence; alternatively, the system can automatically select the length of time based on any suitable factors, such as for example the amount of time remaining in the live event.

Additional occurrences may take place in the event while the user is still watching the highlight sequence. In at least one embodiment, the system can dynamically add highlights depicting such additional occurrences to the highlight sequence, even as the highlight sequence is being viewed. In at least one embodiment, the system continues to analyze occurrences as they take place to determine whether highlights depicting such occurrences should be added to the highlight sequence. Dynamically adding such highlights extends the length of the highlight sequence; thus, in at least one embodiment, newly added highlights can replace previously selected highlights that are deemed to be of less interest (assuming the previously selected highlights have not yet been shown to the user). Alternatively, the user can be prompted as to whether he or she would like the highlight sequence to be extended by the dynamic addition of selected highlights.

Such an embodiment allows a user to watch a condensed version of a game or other event to a certain point, and then to see the remainder of the event live. Such a technique can be used even if the event is not currently in progress: the user can watch the highlight sequence that covers the event to a certain point, and can then transition to an unedited version of the event from that point on, whether in a live format or in a delayed/recorded format.

In at least one embodiment, the user can be presented with multiple highlight sequences for events in progress. For example, he or she can choose to see a highlight sequence for every game that is currently available for him or her to watch, or every game within a particular sport or league, or for teams in a particular geographic area. Then, after viewing some or all of the highlight sequences, the user can make a decision as to which game to watch live. Other variations are possible.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/ or the like), and/ or network connectivity, according to techniques that are well known in the art. Such an electronic device may be portable or nonportable. Examples of electronic devices that may be used for implementing the described system and method include: a desktop computer, laptop computer, television, smartphone, tablet, music player, audio device, kiosk, set-top box, game system, wearable device, consumer electronic device, server computer, and/ or the like. An electronic device may use any operating system such as, for example and without limitation: Linux; Microsoft Windows, available from Microsoft Corporation of Redmond, Washington; Mac OS X, available from Apple Inc. of Cupertino, Calif.; iOS, available from Apple Inc. of Cupertino, Calif.; Android, available from Google, Inc. of Mountain View, Calif.; and/ or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for generating a highlight sequence customized for presentation to a particular user, comprising:
    at a web server, receiving a request for the customized highlight sequence from a client device and passing the request to an application server;
    at a hardware processor of the application server, receiving an electronic signal comprising source content representing a sporting event;
    at the hardware processor of the application server, determining, based on available metadata, which sport of a plurality of sports is depicted in the source content, wherein each sport in the plurality has a stored play definition, the play definition including criteria for determining play start time and play end time for that sport;
    at the hardware processor of the application server, identifying the play definition for the sport depicted in the source content;
    at the hardware processor of the application server, automatically determining at least one characteristic of the user;
    at at least one of the hardware processor of the application server and a hardware processor of an analytical server, based on the identified play definition for the sport depicted in the source content and based on the available metadata, performing an analysis to identify individual plays within the sporting event;
    at the hardware processor of at least one of the application server and the analytical server, performing video analysis on a video component of the source content to establish at least one of a suitable start and end time for each identified individual play;
    at the hardware processor of at least one of the application server and the analytical server, automatically generating a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;
    at the hardware processor of at least one of the application server and the analytical server, automatically determining an excitement level for each of at least a subset of the identified plays;
    at the hardware processor of at least one of the application server and the analytical server, identifying at least one of:
        a narrative that provides a coherent story that links a set of segments relating to at least one of a participant, team, story, and play associated with the sporting event; and
        a theme relating to at least one of a participant, team, story, and play associated with the sporting event;
    at the hardware processor of at least one of the application server and the analytical server, automatically prioritizing the identified plays based on criteria, wherein the criteria comprise at least:
        the at least one characteristic of the user;
        the determined excitement levels; and
        the degree to which each identified play supports the at least one of an identified narrative and an identified theme;
    at the hardware processor of at least one of the application server and the analytical server, automatically and based on both the prioritization and the at least one characteristic of the user, selecting a subset of the identified plays for inclusion in the customized highlight sequence;
    at the hardware processor of at least one of the application server and the analytical server, automatically adjusting at least one of the start and end times of at least one of the segments corresponding to at least one of the selected plays;
    at the hardware processor of the application server, automatically assembling segments corresponding to the selected subset of plays, using at least one of the adjusted start and end times, to create the customized highlight sequence;
    transmitting the customized highlight sequence from the application server to the client device; and
    at an output device of the client device, outputting the customized highlight sequence comprising the automatically assembled segments.

2. The computer-implemented method of claim 1, wherein automatically determining the at least one characteristic of the user comprises determining at least one selected from the group consisting of:

a geographic characteristic;
a demographic characteristic; and
a social network profile.

3. The computer-implemented method of claim 1, wherein automatically determining the at least one characteristic of the user comprises automatically determining the user's affinity for at least one of a team, sport, player, and league.

4. The computer-implemented method of claim 1, wherein automatically determining the at least one characteristic of the user comprises automatically identifying players belonging to a fantasy team associated with the user, and wherein automatically selecting the subset of the identified plays comprises automatically identifying plays associated with at least one of the identified players.

5. The computer-implemented method of claim 1, wherein automatically prioritizing the identified plays comprises automatically determining priorities based at least in part on the excitement level that takes into account the at least one determined characteristic of the user.

6. The computer-implemented method of claim 1, wherein automatically generating the plurality of segments from the representation of the sporting event comprises automatically identifying possessions within the sporting event, wherein each of the identified possessions corresponds to at least one of the identified plays, the method further comprising:
at the hardware processor of at least one of the application server and the analytical server, automatically determining a priority for each identified possession;
and wherein automatically selecting the subset of the identified plays comprises automatically selecting plays based at least in part on the determined priority for a possession corresponding to a play.

7. The computer-implemented method of claim 6, wherein automatically determining the priority for each identified possession comprises automatically determining the priority based on the determined excitement levels.

8. The computer-implemented method of claim 6, wherein automatically determining the priority for each identified possession comprises automatically determining the priority based on the determined excitement levels, and wherein the determined excitement levels take into account the at least one determined characteristic of the user.

9. The computer-implemented method of claim 6, wherein automatically selecting plays comprises:
automatically identifying a subset of the plays having a priority exceeding a predetermining threshold;
automatically determining a priority for each play corresponding to one of the possessions in the subset; and
automatically selecting plays from the identified subset of plays, based on the determined priorities.

10. The computer-implemented method of claim 1, wherein automatically determining the at least one characteristic of the user comprises automatically identifying players belonging to a fantasy team associated with the user, and wherein automatically selecting the subset of the identified plays comprises, for each identified player:
automatically determining a player priority for each play, wherein the player priority takes into account the degree to which the identified player is associated with the play; and
automatically selecting plays based on the determined player priorities.

11. The computer-implemented method of claim 1, wherein automatically determining the at least one characteristic of the user comprises automatically identifying players for whom the user has an affinity, and wherein automatically selecting the subset of the identified plays comprises automatically identifying plays associated with at least one of the identified players.

12. The computer-implemented method of claim 1, wherein automatically determining the at least one characteristic of the user comprises automatically identifying players for whom the user has an affinity, and wherein automatically selecting the subset of the identified plays comprises, for each identified player:
automatically determining a player priority for each play, wherein the player priority takes into account the degree to which the identified player is associated with the play; and
automatically selecting plays based on the determined player priorities.

13. The computer-implemented method of claim 1, further comprising:
at the hardware processor of at least one of the application server and the analytical server, receiving an indication of available time for the customized highlight sequence;
and wherein automatically selecting the subset of the identified plays comprises automatically selecting plays so that the customized highlight sequence is of a length that comports with the indicated available time.

14. The computer-implemented method of claim 1, further comprising:
at the hardware processor of the application server, receiving an indication of available time for the customized highlight sequence;
and wherein automatically selecting the subset of the identified plays comprises automatically selecting plays so that the customized highlight sequence is of a length that comports with the indicated available time;
and wherein automatically adjusting at least one of the start and end times of at least one of the segments comprises automatically adjusting at least one of the start and end times of at least one of the segments so that the total length of the segments corresponding to the selected subset of plays comports with the indicated available time.

15. The computer-implemented method of claim 1, further comprising:
at the hardware processor of the application server, receiving an indication of a perspective associated with the user;
and wherein automatically prioritizing the identified plays based on one or more criteria comprises automatically determining which plays are likely to be of interest to the user based on the perspective of the user.

16. The computer-implemented method of claim 1, wherein:
identifying at least one of a narrative and a theme comprises identifying a narrative for the customized highlight sequence; and
the criteria for automatically prioritizing the identified plays comprise at least the degree to which they support the identified narrative.

17. The computer-implemented method of claim 1, wherein:
identifying at least one of a narrative and a theme comprises identifying a theme for the customized highlight sequence; and
the criteria for automatically prioritizing the identified plays comprise at least the degree to which they support the identified theme.

18. The computer-implemented method of claim 1, wherein outputting the customized highlight sequence comprises displaying video of the customized highlight sequence on a display device of the client device.

19. The computer-implemented method of claim 1, wherein outputting the customized highlight sequence comprises outputting audio of the customized highlight sequence of the client device.

20. The computer-implemented method of claim 1, wherein automatically selecting the subset of the identified plays for inclusion in the customized highlight sequence comprises automatically generating a list of time codes corresponding to start and end times for segments to be included in the customized highlight sequence.

21. The computer-implemented method of claim 20, wherein:
transmitting the customized highlight sequence from the application server to the client device comprises transmitting the generated list of time codes from the application server to the client device.

22. The computer-implemented method of claim 21, further comprising:
storing the generated list of time codes at a storage device associated with the client device;
and wherein outputting the customized highlight sequence comprises:
at the client, automatically generating the customized highlight sequence by retrieving content from a content server according to the generated time codes.

23. The computer-implemented method of claim 21, wherein the source content is stored at a local storage device associated with the client device;
and wherein outputting the customized highlight sequence comprises automatically generating the customized highlight sequence by retrieving, from the local storage device, content according to the generated time codes.

24. The computer-implemented method of claim 1, wherein outputting the customized highlight sequence comprises outputting transitions between the automatically selected subset of plays.

25. The computer-implemented method of claim 1, wherein outputting the customized highlight sequence comprises outputting descriptive information prior to each of the automatically selected subset of plays.

26. The computer-implemented method of claim 25, wherein outputting descriptive information comprises at least one selected from the group consisting of:
outputting a score;
outputting explanatory text;
outputting commentary;
outputting a narrative; and
outputting audio.

27. The computer-implemented method of claim 25, wherein outputting descriptive information comprises at least one selected from the group consisting of:
outputting visual descriptive information;
outputting text; and
outputting audio descriptive information.

28. The computer-implemented method of claim 25, further comprising:
at the hardware processor of the application server, determining whether spoilers should be included in descriptive information;
and wherein outputting descriptive information comprises:
responsive to a determination that spoilers should be included, outputting descriptive information that reveals at least one play that takes place within an upcoming highlight;
responsive to a determination that spoilers should not be included, outputting descriptive information that does not reveal any plays that take place within an upcoming highlight.

29. The computer-implemented method of claim 28, wherein determining whether spoilers should be included in descriptive information comprises receiving user input, at an input device, to indicate whether spoilers should be included in descriptive information.

30. The computer-implemented method of claim 1, wherein outputting the customized highlight sequence comprises outputting additional content associated with the sporting event.

31. The computer-implemented method of claim 30, wherein the additional content associated with the sporting event comprises at least one selected from the group consisting of:
pre-game content for the sporting event;
post-game content for the sporting event;
analysis of the sporting event;
commentary concerning the sporting event; and
at least one interview concerning the sporting event.

32. The computer-implemented method of claim 1, wherein outputting the customized highlight sequence comprises outputting a video stream comprising the customized highlight sequence.

33. The computer-implemented method of claim 1, wherein outputting the customized highlight sequence comprises:
presenting a user interface allowing user selection among a plurality of segments, each segment corresponding to one of the selected plays; and
responsive to user selection of one of the segments, outputting the segment.

34. The computer-implemented method of claim 33, wherein presenting a user interface allowing user selection among a plurality of segments comprises displaying a plurality of thumbnail images, each thumbnail image corresponding to a segment.

35. The computer-implemented method of claim 1, wherein receiving the electronic signal comprising source content representing the sporting event comprises obtaining source content selected from the group consisting of:
a live broadcast;
a recorded broadcast;
a video archive;
content from a website;
content from a video-sharing site;
content stored on a content server;
content stored on a mobile computing device;
content stored on a camera;
on-demand content;
content stored locally;
content captured by a device associated with the user; and
pre-curated content.

36. The computer-implemented method of claim 1, wherein automatically determining the at least one characteristic of the user comprises tracking user behavior.

37. The computer-implemented method of claim 1, wherein automatically determining the at least one characteristic of the user comprises querying the user.

38. The computer-implemented method of claim 1, wherein the customized highlight sequence contains highlights from a first portion of the sporting event, the method further comprising:
at the output device, subsequent to outputting the customized highlight sequence, outputting an unedited representation of a second portion of the sporting event not included in the first portion.

39. The computer-implemented method of claim 38, wherein outputting the unedited representation of the second portion of the sporting event comprises outputting a real-time representation of the second portion of the sporting event.

40. The computer-implemented method of claim 38, wherein outputting the unedited representation of the second portion of the sporting event comprises outputting a live representation of the second portion of the sporting event.

41. At least one non-transitory computer-readable medium for generating a highlight sequence customized for presentation to a particular user, comprising instructions stored thereon, that when executed by at least one processor, perform the steps of:
at a web server, receiving a request for the customized highlight sequence from a client device and passing the request to an application server;
at the application server, receiving an electronic signal comprising source content representing a sporting event;
at the application server, determining, based on available metadata, which sport of a plurality of sports is depicted in the source content, wherein each sport in the plurality has a stored play definition, the play definition including criteria for determining play start time and play end time for that sport;
at the application server, identifying the play definition for the sport depicted in the source content;
at the application server, automatically determining at least one characteristic of the user;
at at least one of the application server and an analytical server, based on the identified play definition for the sport depicted in the source content and based on the available metadata, performing an analysis to identify individual plays within the sporting event;
at at least one of the application server and the analytical server, performing video analysis on a video component of the source content to establish at least one of a suitable start and end time for each identified individual play;
at at least one of the application server and the analytical server, automatically generating a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;
at at least one of the application server and the analytical server, automatically determining an excitement level for each of at least a subset of the identified plays;
at at least one of the application server and the analytical server, identifying at least one of:
a narrative that provides a coherent story that links a set of segments relating to at least one of a participant, team, story, and play associated with the sporting event; and
a theme relating to at least one of a participant, team, story, and play associated with the sporting event;
at at least one of the application server and the analytical server, automatically prioritizing the identified plays based on criteria, wherein the criteria comprise at least:
the at least one characteristic of the user;
the determined excitement levels; and
the degree to which each identified play supports the at least one of an identified narrative and an identified theme;
at at least one of the application server and the analytical server, automatically and based on both the prioritization and the at least one characteristic of the user, selecting a subset of the identified plays for inclusion in the customized highlight sequence;
at at least one of the application server and the analytical server, automatically adjusting at least one of the start and end times of at least one of the segments corresponding to at least one of the selected plays;
at the application server, automatically assembling segments corresponding to the selected subset of plays, using at least one of the adjusted start and end times, to create the customized highlight sequence;
transmitting the customized highlight sequence from the application server to the client device; and
causing an output device of the client device to output the customized highlight sequence comprising the automatically assembled segments.

42. The at least one non-transitory computer-readable medium of claim 41, further comprising instructions stored thereon, that when executed by at least one processor, perform the step of:
receiving an indication of available time for the customized highlight sequence;
and wherein automatically selecting the subset of the identified plays comprises automatically selecting plays so that the customized highlight sequence is of a length that comports with the indicated available time;
and wherein automatically adjusting at least one of the start and end times of at least one of the segments comprises automatically adjusting at least one of the start and end times of at least one of the segments so that the total length of the segments corresponding to the selected subset of plays comports with the indicated available time.

43. The at least one non-transitory computer-readable medium of claim 41, wherein causing the output device to output the customized highlight sequence comprises causing the output device to output a video stream comprising the customized highlight sequence.

44. The at least one non-transitory computer-readable medium of claim 41, wherein causing the output device to output the customized highlight sequence comprises:
causing the output device to present a user interface allowing user selection among a plurality of segments, each segment corresponding to one of the selected plays; and
causing the output device to, responsive to user selection of one of the segments, output the segment.

45. A system for generating a highlight sequence customized for presentation to a particular user, comprising:
a web server, configured to receive a request for the customized highlight sequence from a client device and to pass the request to an application server;
the application server, communicatively coupled to the web server, comprising a hardware processor, configured to:

receive an electronic signal comprising source content representing a sporting event;

determine, based on available metadata, which sport of a plurality of sports is depicted in the source content, wherein each sport in the plurality has a stored play definition, the play definition including criteria for determining play start time and play end time for that sport;

identify the play definition for the sport depicted in the source content; and automatically determine at least one characteristic of the user; and an analytical server, communicatively coupled to the application server, comprising a hardware processor configured to:

based on the identified play definition for the sport depicted in the source content and based on the available metadata, perform an analysis to identify individual plays within the sporting event;

perform video analysis on a video component of the source content to establish at least one of a suitable start and end time for each identified individual play;

automatically generate a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;

automatically determine an excitement level for each of at least a subset of the identified plays;

identify at least one of:
a narrative that provides a coherent story that links a set of segments relating to at least one of a participant, team, story, and play associated with the sporting event; and
a theme relating to at least one of a participant, team, story, and play associated with the sporting event;

automatically prioritize the identified plays based on criteria, wherein the criteria comprise at least:
the at least one characteristic of the user;
the determined excitement levels; and
the degree to which each identified play supports the at least one of an identified narrative and an identified theme;

automatically and based on both the prioritization and the at least one characteristic of the user, select a subset of the identified plays for inclusion in the customized highlight sequence; and automatically adjust at least one of the start and end times of at least one of the segments corresponding to at least one of the selected plays;

wherein the hardware processor of the application server is further configured to:

automatically assemble segments corresponding to the selected subset of plays, using at least one of the adjusted start and end times, to create the customized highlight sequence; and transmit the customized highlight sequence from the application server to the client device for output thereon.

46. The system of claim 45, wherein the hardware processor of the analytical server is configured to automatically prioritize the identified plays by determining priorities based at least in part on the excitement level that takes into account the at least one determined characteristic of the user.

47. The system of claim 45, wherein the hardware processor of the analytical server is further configured to receive an indication of available time for the customized highlight sequence;

and wherein the hardware processor of the analytical server is configured to automatically select the subset of the identified plays so that the customized highlight sequence is of a length that comports with the indicated available time;

and wherein automatically adjusting at least one of the start and end times of at least one of the segments comprises automatically adjusting at least one of the start and end times of at least one of the segments so that the total length of the segments corresponding to the selected subset of plays comports with the indicated available time.

48. The system of claim 45, wherein transmitting the customized highlight sequence comprises transmitting the customized highlight sequence as a video stream.

49. The system of claim 45, further comprising:
an input device at the client device, configured to receive user input; and
an output device at the client device, configured to:
present a user interface allowing user selection among the plurality of segments, each segment corresponding to one of the selected plays; and
responsive to user selection of one of the segments via the input device, output the segment.

50. The computer-implemented method of claim 1, wherein:
identifying at least one of a narrative and a theme comprises identifying a narrative for the customized highlight sequence; and
the criteria for automatically prioritizing the identified plays comprise at least the degree to which they support the identified narrative.

51. The computer-implemented method of claim 1, wherein:
identifying at least one of a narrative and a theme comprises identifying a theme for the customized highlight sequence; and
the criteria for automatically prioritizing the identified plays comprise at least the degree to which they support the identified theme.

52. The at least one non-transitory computer-readable medium of claim 41, wherein:
identifying at least one of a narrative and a theme comprises identifying a narrative for the customized highlight sequence; and
the criteria for automatically prioritizing the identified plays comprise at least the degree to which they support the identified narrative.

53. The at least one non-transitory computer-readable medium of claim 41, wherein:
identifying at least one of a narrative and a theme comprises identifying a theme for the customized highlight sequence; and
the criteria for automatically prioritizing the identified plays comprise at least the degree to which they support the identified theme.

54. The system of claim 45, wherein:
the hardware processor of the analytical server is configured to identify at least one of a narrative and a theme by identifying a narrative for the customized highlight sequence; and the criteria for automatically prioritizing the identified plays comprise at least the degree to which they support the identified narrative.

55. The system of claim 45, wherein:
the hardware processor of the analytical server is configured to identify at least one of a narrative and a theme by identifying a theme for the customized highlight sequence; and
the criteria for automatically prioritizing the identified plays comprise at least the degree to which they support the identified theme.

56. The computer-implemented method of claim 1, wherein:
establishing at least one of a suitable start and end time for each individual play comprises determining a plurality of alternative start times and a plurality of alternative end times for each individual play; and
automatically adjusting at least one of the start and end times comprises:
selecting a start time from the plurality of alternative start times; and
selecting an end time from the plurality of alternative end times.

57. The at least one non-transitory computer-readable medium of claim 41, wherein:
establishing at least one of a suitable start and end time for each individual play comprises determining a plurality of alternative start times and a plurality of alternative end times for each individual play; and
automatically adjusting at least one of the start and end times comprises:
selecting a start time from the plurality of alternative start times; and
selecting an end time from the plurality of alternative end times.

58. The system of claim 45, wherein:
establishing at least one of a suitable start and end time for each individual play comprises determining a plurality of alternative start times and a plurality of alternative end times for each individual play; and
automatically adjusting at least one of the start and end times comprises:
selecting a start time from the plurality of alternative start times; and
selecting an end time from the plurality of alternative end times.

59. A computer-implemented method for generating a highlight sequence customized for presentation to a particular user, comprising:
at a web server, receiving a request for the customized highlight sequence from a client device and passing the request to an application server;
at a hardware processor of the application server, receiving an electronic signal comprising source content representing a sporting event;
at the hardware processor of the application server, determining, based on available metadata, which sport of a plurality of sports is depicted in the source content, wherein each sport in the plurality has a stored play definition, the play definition including criteria for determining play start time and play end time for that sport;
at the hardware processor of the application server, identifying the play definition for the sport depicted in the source content;
at the hardware processor of the application server, automatically determining at least one characteristic of the user;
at at least one of the hardware processor of the application server and a hardware processor of an analytical server, based on the identified play definition for the sport depicted in the source content and based on the available metadata, performing an analysis to identify individual plays within the sporting event;
at the hardware processor of at least one of the application server and the analytical server, performing video analysis on a video component of the source content to establish at least one of a suitable start and end time for each identified individual play, wherein the video analysis comprises analysis of a video component representing a game clock;
at the hardware processor of at least one of the application server and the analytical server, automatically generating a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;
at the hardware processor of at least one of the application server and the analytical server, automatically determining an excitement level for each of at least a subset of the identified plays;
at the hardware processor of at least one of the application server and the analytical server, identifying at least one of:
a narrative that provides a coherent story that links a set of segments relating to at least one of a participant, team, story, and play associated with the sporting event; and
a theme relating to at least one of a participant, team, story, and play associated with the sporting event;
at the hardware processor of at least one of the application server and the analytical server, automatically prioritizing the identified plays based on criteria, wherein the criteria comprise at least:
the at least one characteristic of the user;
the determined excitement levels; and
the degree to which each identified play supports the at least one of an identified narrative and an identified theme;
at the hardware processor of at least one of the application server and the analytical server, automatically and based on both the prioritization and the at least one characteristic of the user, selecting a subset of the identified plays for inclusion in the customized highlight sequence;
at the hardware processor of the application server, automatically assembling segments corresponding to the selected subset of plays, using at least one of the established suitable start and end times, to create the customized highlight sequence;
transmitting the customized highlight sequence from the application server to the client device; and
at an output device of the client device, outputting the customized highlight sequence comprising the automatically assembled segments.

60. At least one non-transitory computer-readable medium for generating a highlight sequence customized for presentation to a particular user, comprising instructions stored thereon, that when executed by at least one processor, perform the steps of:
- at a web server, receiving a request for the customized highlight sequence from a client device and passing the request to an application server;
- at the application server, receiving an electronic signal comprising source content representing a sporting event;
- at the application server, determining, based on available metadata, which sport of a plurality of sports is depicted in the source content, wherein each sport in the plurality has a stored play definition, the play definition including criteria for determining play start time and play end time for that sport;
- at the application server, identifying the play definition for the sport depicted in the source content;
- at the application server, automatically determining at least one characteristic of the user;
- at at least one of the application server and an analytical server, based on the identified play definition for the sport depicted in the source content and based on the available metadata, performing an analysis to identify individual plays within the sporting event;
- at at least one of the application server and the analytical server, performing video analysis on a video component of the source content to establish at least one of a suitable start and end time for each identified individual play, wherein the video analysis comprises analysis of a video component representing a game clock;
- at at least one of the application server and the analytical server, automatically generating a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;
- at at least one of the application server and the analytical server, automatically determining an excitement level for each of at least a subset of the identified plays;
- at at least one of the application server and the analytical server, identifying at least one of:
  - a narrative that provides a coherent story that links a set of segments relating to at least one of a participant, team, story, and play associated with the sporting event; and
  - a theme relating to at least one of a participant, team, story, and play associated with the sporting event;
- at at least one of the application server and the analytical server, automatically prioritizing the identified plays based on criteria, wherein the criteria comprise at least:
  - the at least one characteristic of the user;
  - the determined excitement levels; and
  - the degree to which each identified play supports the at least one of an identified narrative and an identified theme;
- at at least one of the application server and the analytical server, automatically and based on both the prioritization and the at least one characteristic of the user, selecting a subset of the identified plays for inclusion in the customized highlight sequence;
- at at least one of the application server and the analytical server, automatically adjusting at least one of the start and end times of at least one of the segments corresponding to at least one of the selected plays;
- at the application server, automatically assembling segments corresponding to the selected subset of plays, using at least one of the established suitable start and end times, to create the customized highlight sequence;
- transmitting the customized highlight sequence from the application server to the client device; and
- causing an output device of the client device to output the customized highlight sequence comprising the automatically assembled segments.

61. A system for generating a highlight sequence customized for presentation to a particular user, comprising:
- a web server, configured to receive a request for the customized highlight sequence from a client device and to pass the request to an application server;
- the application server, communicatively coupled to the web server, comprising a hardware processor, configured to:
  - receive an electronic signal comprising source content representing a sporting event;
  - determine, based on available metadata, which sport of a plurality of sports is depicted in the source content, wherein each sport in the plurality has a stored play definition, the play definition including criteria for determining play start time and play end time for that sport;
  - identify the play definition for the sport depicted in the source content; and
  - automatically determine at least one characteristic of the user; and
- an analytical server, communicatively coupled to the application server, comprising a hardware processor configured to:
  - based on the identified play definition for the sport depicted in the source content and based on the available metadata, perform an analysis to identify individual plays within the sporting event;
  - perform video analysis on a video component of the source content to establish at least one of a suitable start and end time for each identified individual play, wherein the video analysis comprises analysis of a video component representing a game clock;
  - automatically generate a plurality of segments from the representation of the sporting event, each segment having a start time and an end time, and each segment corresponding to at least one of the identified individual plays within the sporting event, wherein, for each generated segment, at least one of the start and end times is selected based on at least one of the established suitable start and end times;
  - automatically determine an excitement level for each of at least a subset of the identified plays;
  - identify at least one of:
    - a narrative that provides a coherent story that links a set of segments relating to at least one of a participant, team, story, and play associated with the sporting event; and
    - a theme relating to at least one of a participant, team, story, and play associated with the sporting event;
  - automatically prioritize the identified plays based on criteria, wherein the criteria comprise at least:
    - the at least one characteristic of the user;
    - the determined excitement levels; and
    - the degree to which each identified play supports the at least one of an identified narrative and an identified theme;
  - automatically and based on both the prioritization and the at least one characteristic of the user, select a subset of the identified plays for inclusion in the customized highlight sequence; and automatically adjust at least one of the start and end times of at least one of the segments corresponding to at least one of the selected plays;

wherein the hardware processor of the application server is further configured to:

automatically assemble segments corresponding to the selected subset of plays, using at least one of the established suitable start and end times, to create the customized highlight sequence; and transmit the customized highlight sequence from the application server to the client device for output thereon.

* * * * *